United States Patent
Lim et al.

(10) Patent No.: US 10,939,791 B2
(45) Date of Patent: Mar. 9, 2021

(54) MOBILE ROBOT AND MOBILE ROBOT CONTROL METHOD

(71) Applicant: LG ELECTRONICS INC., Seoul (KR)

(72) Inventors: Seungwook Lim, Seoul (KR); Taekyeong Lee, Seoul (KR); Dongki Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 109 days.

(21) Appl. No.: 16/096,604

(22) PCT Filed: Apr. 25, 2017

(86) PCT No.: PCT/KR2017/004388
§ 371 (c)(1),
(2) Date: Oct. 25, 2018

(87) PCT Pub. No.: WO2017/188706
PCT Pub. Date: Nov. 2, 2017

(65) Prior Publication Data
US 2019/0133396 A1 May 9, 2019

(30) Foreign Application Priority Data
Apr. 25, 2016 (KR) .................. 10-2016-0050210

(51) Int. Cl.
*A47L 9/28* (2006.01)
*B25J 11/00* (2006.01)
(Continued)

(52) U.S. Cl.
CPC .............. *A47L 9/2852* (2013.01); *A47L 5/12* (2013.01); *A47L 9/28* (2013.01); *A47L 9/2826* (2013.01);
(Continued)

(58) Field of Classification Search
CPC . A47L 9/2852; A47L 5/12; A47L 9/28; A47L 9/2826; A47L 9/2894;
(Continued)

(56) References Cited

U.S. PATENT DOCUMENTS

2009/0312871 A1* 12/2009 Lee ...................... G05D 1/0272
700/259
2010/0070125 A1* 3/2010 Lee .......................... G06T 7/73
701/28
(Continued)

FOREIGN PATENT DOCUMENTS

EP     1 898 291       1/2011
JP     2007-316799    12/2007
(Continued)

OTHER PUBLICATIONS

German Office Action dated Apr. 23, 2019 issued in Application No. 112017002154.5.
(Continued)

*Primary Examiner* — Justin M Jonaitis
(74) *Attorney, Agent, or Firm* — KED & Associates, LLP

(57) ABSTRACT

The present invention relates to a moving robot capable of recognizing a position on a map and a control method of the moving robot, and the moving robot according to the present invention includes: a travel drive unit configured to move a main body; an image acquisition unit configured to acquire images of surroundings; and a controller configured to recognize a current position. The controller is further configured to separate the travel area by the predetermined criterion into a plurality of large areas, into which the plurality of small areas is grouped; compute each large area feature distribution and the at least one recognition descriptor by a predetermined superordinate estimation rule to select a large area in which the current position is included;
(Continued)

and compute the small area feature distribution and the at least one recognition descriptor by the predetermined estimation rule to select a small area, in which the current position is included, from among a plurality of small areas included in the selected large area.

The control method according to the present invention includes: a learning process of learning a travel area to generate a map and separating the travel area into a plurality of small areas by a predetermined criterion; and a recognition process of selecting a current position on the map. The recognition process includes: a recognition descriptor generation process of acquiring an image of the current position, extract at least one recognition feature from the acquired image, and generating a recognition descriptor corresponding to the at least one recognition feature. The recognition process includes: a large area selection process of computing each large area feature distribution and the at least one recognition descriptor by a predetermined superordinate estimation rule to select a large area in which the current position is included.

22 Claims, 35 Drawing Sheets

(51) Int. Cl.
 B25J 9/16 (2006.01)
 B25J 9/00 (2006.01)
 B25J 19/02 (2006.01)
 A47L 5/12 (2006.01)
 G05D 1/02 (2020.01)
(52) U.S. Cl.
 CPC .............. *A47L 9/2894* (2013.01); *B25J 9/00* (2013.01); *B25J 9/16* (2013.01); *B25J 11/00* (2013.01); *B25J 19/02* (2013.01); *G05D 1/0246* (2013.01); *A47L 2201/022* (2013.01); *A47L 2201/04* (2013.01); *G05B 2219/45098* (2013.01); *G05D 2201/0215* (2013.01)
(58) Field of Classification Search
 CPC .. A47L 2201/022; A47L 2201/04; B25J 9/00; B25J 9/16; B25J 11/00; B25J 19/02; G05D 1/0246; G05D 2201/0215; G05D 1/0231; G05B 2219/45098
 USPC .......................... 701/27, 23, 28, 25, 26, 300
 See application file for complete search history.

(56) References Cited

U.S. PATENT DOCUMENTS

| | | | |
|---|---|---|---|
| 2013/0116826 A1* | 5/2013 | Kim | G05D 1/0253 700/259 |
| 2015/0012209 A1* | 1/2015 | Park | G05D 1/0231 701/408 |
| 2016/0089783 A1* | 3/2016 | Noh | G06K 9/52 382/153 |

FOREIGN PATENT DOCUMENTS

| | | |
|---|---|---|
| KR | 10-2006-0015163 | 2/2006 |
| KR | 10-2010-0031277 | 3/2010 |
| KR | 10-2010-0104581 | 9/2010 |
| KR | 10-2013-0000278 | 1/2013 |
| KR | 10-2015-0004568 | 1/2015 |
| KR | 10-2016-0038437 | 4/2016 |

OTHER PUBLICATIONS

International Search Report (with English Translation) and Written Opinion dated Aug. 17, 2017 issued in Application No. PCT/KR2017/004388.

* cited by examiner

FIG. 7
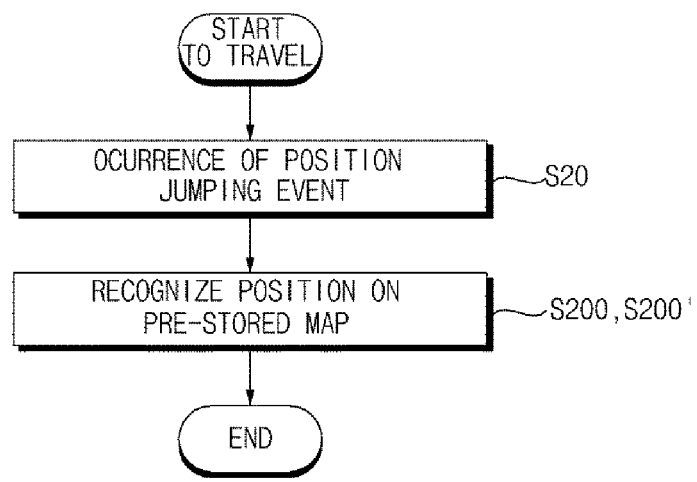
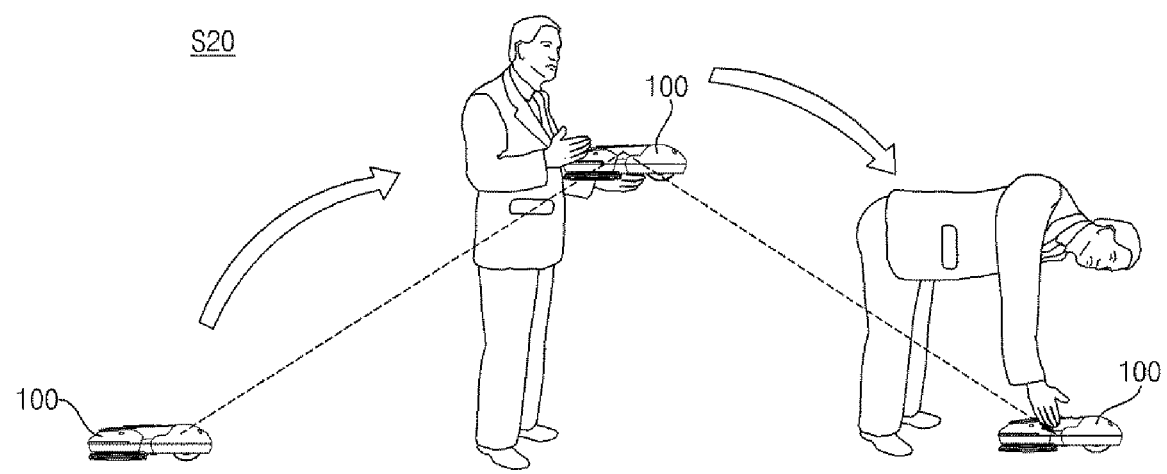

S146

S146'

FIG. 21
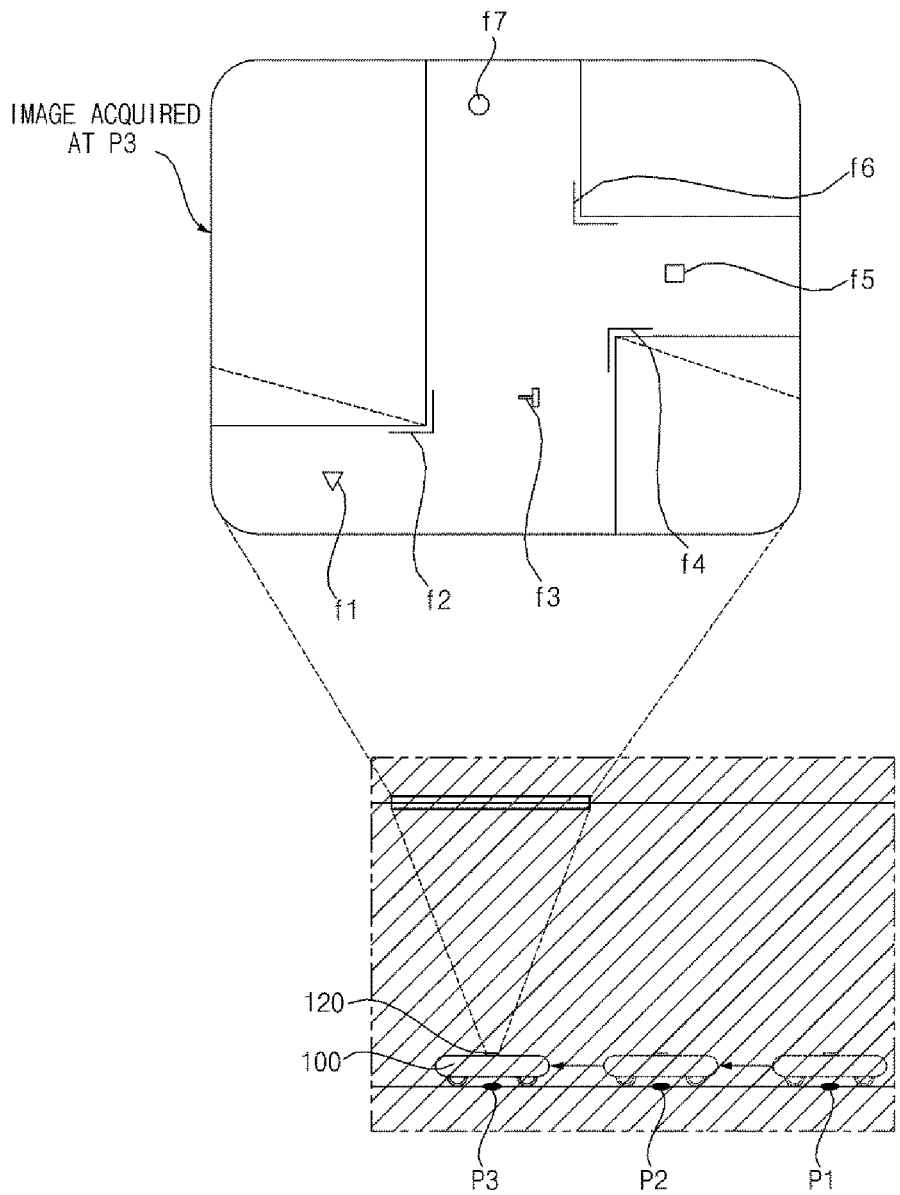
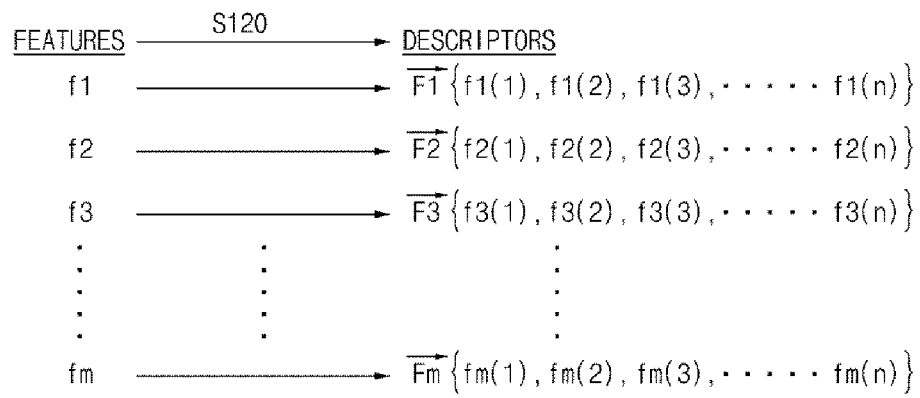

FIG. 23
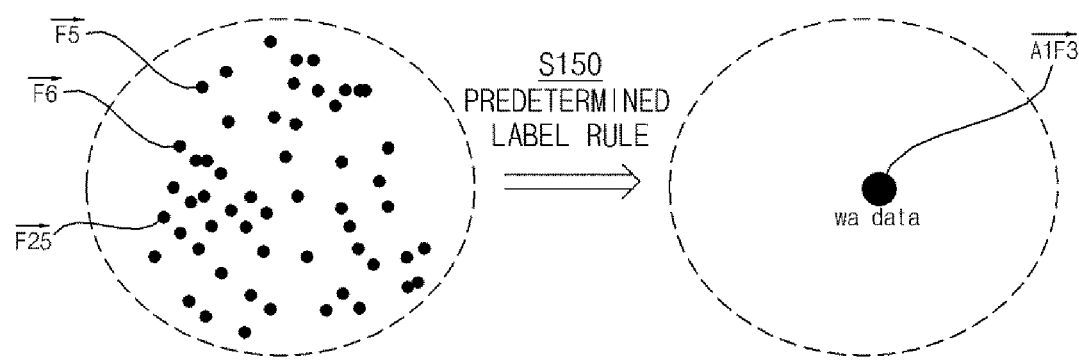
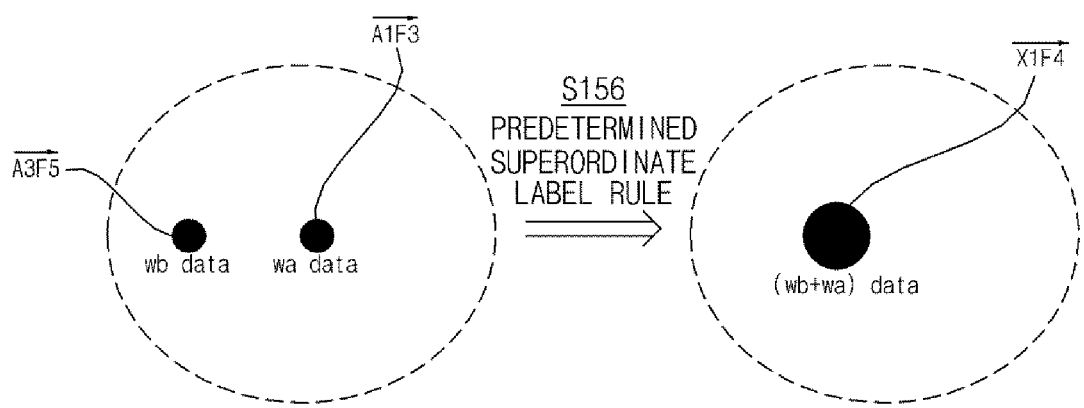

| RCOGNITION FEATURES | S220 | RECOGNITION DESCRIPTORS |
|---|---|---| h1 ⟶ $\vec{H1}\{h1(1), h1(2), h1(3), \cdots h1(n)\}$ h2 ⟶ $\vec{H2}\{h2(1), h2(2), h2(3), \cdots h2(n)\}$ h3 ⟶ $\vec{H3}\{h3(1), h3(2), h3(3), \cdots h3(n)\}$ h4 ⟶ $\vec{H4}\{h4(1), h4(2), h4(3), \cdots h4(n)\}$ h5 ⟶ $\vec{H5}\{h5(1), h5(2), h5(3), \cdots h5(n)\}$ h6 ⟶ $\vec{H6}\{h6(1), h6(2), h6(3), \cdots h6(n)\}$ h7 ⟶ $\vec{H7}\{h7(1), h7(2), h7(3), \cdots h7(n)\}$

MOBILE ROBOT AND MOBILE ROBOT CONTROL METHOD

CROSS-REFERENCE TO RELATED PATENT APPLICATIONS

This application is a U.S. National Stage Application under 35 U.S.C. § 371 of PCT Application No. PCT/KR2017/004388, filed Apr. 25, 2017, which claims priority to Korean Patent Application No. 10-2016-0050210, filed Apr. 25, 2016, whose entire disclosures are hereby incorporated by reference.

TECHNICAL FIELD

The present invention relates to a moving robot and a control method thereof and, more particularly, to a technology by which a moving robot recognizes a position thereof on a map.

BACKGROUND ART

In general, robots have been developed for an industrial purpose and have been in charge of part of factory automation. Recently, robot-applied fields have further extended to develop medical robots or aerospace robots, and household robots that may be used in ordinary homes have also been made. Among these robots, robots capable of traveling on its own are referred to as moving robots. A typical example of the moving robots used at home is a robot cleaner.

To enable a moving robot to precisely move to a desired destination or a specific area, there are method for sensing an InfraRed (IR) signal transmitted from a destination such as a charging base: however, in this method, a moving robot is enabled merely to move to a limited destination transmitting an IR signal and, if failing to sense a transmitted IR signal due to a distance or an obstacle, the moving robot may wonder while looking for the destination.

Thus, in order to move to any position in a travel area, a map of the travel area needs to be stored and a moving robot should have a capability of recognizing the current position on the map.

To this end, there have been known a variety of methods for constantly recognizing the current position based on information on traveling at a previous position during continuous movement of a moving robot (information on a moving direction and a moving speed, comparison between continuously captured pictures of a floor, etc.), and also a variety of methods of generating a map of a cleaning area by itself.

However, when a position of a moving robot in move is forcibly changed by an external factor (for example, when a user picks up the moving robot in move and puts it in another chamber), the moving robot is not capable of recognize an unknown position based on the information on traveling at the previous position.

Laser sensors such as ultrasonic sensors have been proposed to enable a moving robot to recognize the current position even in such a position jumping state, but there are limitations that costs are increased and that it is not allowed to acquire more detailed information on a surrounding environment.

Accordingly, a related art (Korean Patent Application Publication No. 10-2010-0104581) discloses a technology for recognizing an unknown current position using an image captured at the current position using a camera.

In the related art, a three-dimensional map is generated based on features extracted from an image captured in a travel area, and three or more pairs of features matching the features in the three-dimensional map are detected from among features in an image captured at an unknown current position. Next, distance is calculated based on the three or more matching features by using two-dimensional coordinates of three or more matching features in the image captured at the current position, three-dimensional coordinates of three or more matching features on the three-dimensional map, and information on a focal distance of a camera at the current position, and then the current position is recognized based on the above, and a technology therefor is disclosed in the related art.

RELATED ART DOCUMENT

Patent Document
Korean Patent Application Publication No. 10-2010-0104581 (Publication Date: Sep. 29, 2010)

DISCLOSURE

Technical Problem

A first object of the present invention is to provide an efficient global localization technique by which a moving robot is enabled to recognize the current position thereof on a map of a travel area in any situation including a position jumping event.

The related art may take a relatively long time to match three or more features acquired at an unknown current position with three or more features on a pre-stored three-dimensional map, and, in particular, if huge amount of information on too many features in a three-dimensional map is given because of a wide travel area, an excessive amount time is required to match features. A second object of the present invention is to solve this problem and minimize time required for comparison between features acquired from the current image and data on a map.

In the related art, features acquired at an unknown current position are matched with features in a feature cluster (features which are densely located to form a group) on a three-dimensional map: in this case, the acquired features are supposed to match features existing in the feature cluster, but this may be ignored and thus accuracy of position estimation may be reduced. A third object of the present invention is to solve this problem and provide a technology of minimizing time consumption while using all feature data on a map.

In the related art, distance between three or more features acquired at a current position and a camera needs to be calculated, and the distance to the features are calculated based on a focal distance of the camera and two-dimensional coordinates of the features in the current image. However, the focal distance information of the camera may be inaccurate due to ambient brightness, and, when the three or more features in the image is not disposed on a plane vertical to a photographing direction of the camera but disposed on an inclined plane due to inclination or a protruding surface, the distance between the features and the camera calculated based on the second coordinates may have a big difference from an actual distance therebetween. In conclusion, accuracy of position estimation may be reduced. A fourth object of the present invention is to solve this problem and provide a technology of recognizing the current position even without using focal distance information of a camera and two-dimensional coordinates of features in an image.

In the related art, there is a problem that a huge storage is required to store a map because the map is generated in a three-dimensional format. A fifth object of the present invention is to solve this problem and provide a technology of recognizing the current position merely with a two-dimensional map.

A feature may be stored in a descriptor format, and a plurality of descriptors may have a low rarity indicating that a relatively more number of similar descriptors is present, and a high rarity indicating that a relatively less number of similar descriptors is present. However, the related art does not consider such rarity of descriptors and thus accuracy of position estimation is reduced. A sixth object of the present invention is to solve this problem and provide a technology of recognizing a position in consideration of a degree of rarity of features.

A moving robot may move into an indoor space separated by a traveling capability, and, in this case, when the current position is estimated only on a pre-stored map, an error may occur. A seventh object of the present invention is to provide this problem and provide a technology by which, even when positioned in a space separated by a traveling capability, a moving robot learns a map of the corresponding map or accurately and efficiently recognizes the current position.

Objects of the present invention should not be limited to the aforementioned objects and other unmentioned objects will be clearly understood by those skilled in the art from the following description.

Technical Solution

In order to achieve the first to fifth objects, a solution is provided, in which a feature distribution for each small area is achieved based on features in a travel area, a small area in which the current position is included is first selected, and other images corresponding to other positions in no-selected small areas is excluded from comparison subjects.

To this end, a moving robot according to the present invention includes: a travel drive unit configured to move a main body; an image acquisition unit configured to acquire images of surroundings; and a controller configured to recognize a current position, wherein the controller is further configured to: separate a travel area into a plurality of small areas by a predetermined criterion; extract at least one recognition feature from an image acquired at an unknown current position; generate a recognition descriptor corresponding to the at least one recognition feature; and compute each small area feature distribution and the recognition descriptor by a predetermined estimation rule to select a small area in which the current position is included.

To achieve the first to third objects, a technology of generating the small area feature distribution when learning a map of a travel area is implemented. To this end, the controller may extract features from images acquired at a plurality of positions; generate descriptors corresponding to the respective features; and generate the small area feature distribution for each of the small area by a predetermined learning rule.

To implement a specific technology of generating the small area feature distribution and achieve the sixth object, and a technology of considering rarity of features based on the number of label descriptors is implemented. To this end, the predetermined learning rule may include a predetermined classification rule for classifying the descriptors into a plurality of groups, and a predetermined label rule for converting the descriptors included in a same group into label descriptors, and the small area feature distribution for each of the small areas may be generated based on type of the label descriptors and a number of label descriptors per type.

The predetermined classification rule may be defined in Equation 1, which is exemplarily described later on, and the predetermined label rule may be defined as in Equation 2 which is exemplarily described later on. In addition, when it comes to generating a small area feature distribution, reflecting the number of the label descriptors per type may be implemented using Equation 3 which is exemplarily described later on.

In order to implement a specific technology of selecting a small area, in which the current position is included, and achieve the sixth object is implemented, a technology of considering rarity of features based on label descriptors as to a recognition feature distribution (a recognition feature distribution generated based on features detected from an image acquired at an unknown current position) is implemented. To this end, the predetermined estimation rule may include a predetermined classification rule for classifying the descriptors into a plurality of groups, and a predetermined label rule for converting the descriptors included in a same group into label descriptors.

The predetermined conversion rule has a meaning in generating a plurality of recognition feature distributions respectively comparable with a plurality of small area feature distributions. A recognition feature distribution comparable with any one comparison subject small area may be generated based on types of converted label descriptors and the number of label descriptors per type, and reflecting the number of label descriptors per type may be implemented using Equation 4 which is exemplarily described later on.

The predetermined comparison rule has a meaning in comparing a plurality of small area feature distributions with each other, and a similarity (probability) for each small area may be calculated using Equation 5 which is exemplarily described later on.

To further enhance efficiency of position recognition by implementing area separation in a pyramid form, the controller may be configured to separate the travel area by the predetermined criterion into a plurality of large areas, into which the plurality of small areas is grouped. The controller may be further configured to: compute each large area feature distribution and the at least one recognition descriptor by a predetermined superordinate estimation rule to select a large area in which the current position is included; and compute the small area feature distribution and the at least one recognition descriptor by the predetermined estimation rule to select a small area, in which the current position is included, from among a plurality of small areas included in the selected large area.

To achieve the first to third objects, the controller may select the current position from among a plurality of positions included in the selected small area.

To achieve the first to third objects, a technology of generating the large area feature distribution when learning a map of a travel area is implemented. To this end, the controller may be further configured to: extract features from images acquired at a plurality of positions; generate descriptors of the respective features; generate the small area feature distribution for each of the small areas by a predetermined learning rule; and generate the large area feature distribution for each of the large areas by a predetermined superordinate learning rule.

To implement a specific technology of generating the large area feature distribution and achieve the sixth object is implemented, and a technology of considering rarity of features based on the number of label descriptors is implemented. To this end, the predetermined superordinate learning rule may include a predetermined superordinate classification rule for classifying the plurality of label descriptors into a plurality of groups, and a predetermined superordinate label rule for converting the label descriptors included in the same group into large area label descriptors, and the large area feature distribution may be generated for each of the large areas based on types of the large area label descriptors and the number of label descriptors per type.

The predetermined superordinate classification rule may be defined as in Equation 6 which is exemplarily described later on, and the predetermined superordinate label rule may be defined as in Equation 7 which is exemplarily described later on. In addition, when it comes to generating a large area feature distribution, reflecting the number of the large area label descriptors may be implemented using Equation 8 which is exemplarily described later on.

To implement a specific technology of selecting a large area in which the current position is included and achieve the sixth object, a technology of considering rarity of features based on the number of large area label descriptor is implemented even as to a superordinate recognition feature distribution (a superordinate recognition feature distribution generated based on features detected from an image acquired at an unknown current position). To this end, the predetermined superordinate estimation rule may include a predetermined superordinate conversion rule for generating, based on the at least one recognition descriptor, a superordinate recognition feature distribution that is comparable with the large area feature distribution; and a predetermined superordinate comparison rule for comparing each of the large area feature distribution with the superordinate recognition feature distribution to calculate a similarity therebetween.

The predetermined superordinate conversion rule has a meaning to generate a plurality of superordinate recognition feature distributions respectively comparable with a plurality of large area feature distributions. A superordinate recognition feature distribution comparable with any one comparison subject large area may be generated based on types of converted large area label descriptors and the number of large area label descriptors per type, and reflecting of the number of large area label descriptors per types may be implemented using Equation 9 which is exemplarily described later on.

The predetermined superordinate comparison rule has a meaning to compare each of the plurality of large area feature distributions, and a similarity (probability) of each large area may be calculated using Equation 10 which is exemplarily described later on.

To additionally achieve the seventh object, the controller may separate the travel area into a plurality of large areas, separated by a moving path, by a predetermined criterion.

To achieve the first to third objects, the controller may select one of a plurality of areas included in the selected large area, and select the current position from a plurality of positions included in the selected small area.

The present invention may be implemented in different moving robots, a center server, or a computer, but each process may be implemented by each element of one moving robot. To achieve the first to fifth object, a control method of a moving robot according to the present invention includes: a learning process of learning a travel area to generate a map and separating the travel area into a plurality of small areas by a predetermined criterion; and a recognition process of selecting a current position on the map, wherein the recognition process comprises: a recognition descriptor generation process of acquiring an image of the current position, extract at least one recognition feature from the acquired image, and generating a recognition descriptor corresponding to the at least one recognition feature; and a small area selection process of computing each small feature distribution and the at least one recognition descriptor by a predetermined estimation rule to select a small area in which the current position is included.

To efficiently achieve the first and fifth object, the small areas may be separated on the basis of rooms in the travel area.

To achieve the first to third objects, the learning process may include a descriptor generation process of acquiring images at a plurality of positions, extracting features from the respective images, and generating descriptors corresponding to the respective features. The learning process may include a small area feature distribution generation process of storing a small area feature distribution generated for each of the small areas by a predetermined learning rule based on the descriptors.

To further enhance efficiency of position recognition by implementing area separation in a pyramid form, the area separation process may separate the travel area into a plurality of large areas, into which the plurality of small areas are grouped, by the predetermined criterion. The recognition process may further include, prior to the small area selection process, a large area selection process of computing each large area feature distribution and the at least one recognition descriptor by a predetermined superordinate estimation rule to select a large area in which the current position is included. The large area in which the current position is included may be selected from among a plurality of small areas included in the large area selected in the small area selection process.

To achieve the first to third objects, a technology of generating the large area feature distribution when learning the map of the travel area is implemented. To this end, the learning process may include a descriptor generation process of acquiring images at a plurality of positions, extracting features from the respective images, and generating descriptors corresponding to the respective features. The learning process may further include: a small area feature distribution generation process of storing a small area feature distribution generated for each of the small areas by a predetermined learning rule based on the descriptors; and a large area feature distribution generation process of storing a large area feature distribution generated for each of the large areas by a predetermined superordinate learning rule based on the small area feature distributions.

To efficiently achieve the first to fifth objects, the large areas may be separated on the basis of rooms in the travel area.

A control method of a moving robot according to the present invention, which specifies a learning process, may include: a process (a1) of acquiring images at a plurality of positions, extracting features from the respective images, generating descriptors corresponding to the respective features, and separating a travel area into a plurality of large area and a plurality of small areas, which are included in the plurality of large areas, by a predetermined criterion; and a process (a2) of storing a small area feature distribution generated for each of the small areas by a predetermined learning rule based on the descriptors, and storing a large area feature distribution generated for each of the large areas by a predetermined superordinate learning rule.

A control method of a moving robot according to the present invention, which specifies a recognition process, may include: a process (b1) of acquiring an image of a current position, extracting at least one recognition feature from the acquired image, and generating a recognition descriptor corresponding to the at least one recognition feature; a process (b2) of computing a large area feature distribution and the at least one recognition descriptor by a predetermined superordinate estimation rule to select a large area in which the current position is included; and a process (b3) of computing each small area feature distribution and the at least one recognition descriptor by a predetermined estimation rule to select an area, in which the current position is included, from among a plurality of small areas included in the selected large area.

The descriptor, the label descriptor, the large area label descriptor, and the recognition descriptors may be n-dimensional vectors.

The predetermined classification rule and the predetermined superordinate classification rule may be based on a distance between the vectors, and the predetermined label rule and the predetermined superordinate label rule may be based on an average of the vectors.

The predetermined conversion rule may be preset to convert the at least one recognition descriptor into the closest label descriptor among label descriptors of small area feature distributions of a comparison subject so as to generate the recognition feature distribution for the comparison subject.

The predetermined superordinate conversion rule may be preset to convert the at least one recognition descriptor into the closest large area label descriptor among label descriptors of large area feature distributions of a comparison subject so as to generate the superordinate recognition feature distribution for the comparison subject.

The small area feature distribution may be generated based on a score which increases in proportion of the number of label descriptors per type in each of the small areas, and the recognition feature distribution for the comparison subject small area may be generated based on a recognition score which increases in proportion of the number of label descriptors converted by the predetermined conversion rule. The predetermined comparison rule may be preset to calculate a similarity based on the small area feature distribution and the recognition feature distribution of the comparison subject small area.

The large area feature distribution may be generated based on a score which increases in proportion of the number of large area descriptors per type in each large area, and the recognition feature distribution for the comparison subject large area may be generated based on a recognition score which increases in proportion of the number of large area label descriptors converted by the predetermined superordinate conversion rule. The predetermined superordinate comparison rule may be preset to calculate a similarity based on the large area feature distribution and the recognition feature distribution for the comparison subject large area.

A program of implementing the control method may be implemented, and a computer readable recording medium which records the program may be implemented.

In addition, a program for executing at least one of the above various rules (the learning rule, the superordinate learning rule, the estimation rule, the superordinate estimation rule, the classification rule, the superordinate classification rule, the label rule, the superordinate label rule, the conversion rule, the superordinate conversion rule, the comparison rule, and the superordinate comparison rule) may be implemented, and a computer readable recording medium which records the program may be implemented.

The details of other embodiments are included in the following description and the accompanying drawings.

Advantageous Effects

The above solutions offers advantages of the present invention that the current position may be efficiently and accurately estimated on a map even when a position of a moving robot is jumped, and that the moving robot is able to move exactly to a destination using a map even without a signal transmitted from the desired destination.

In addition, as a small area in which the current position is included is first selected and then the current position is estimated in the small area, it is possible to remarkably reduce a time required for comparison between the current image with stored feature data, and it is possible to accurately estimate the current position using all feature data on a map.

In addition, as the present invention is implementable simply with a ceiling image, device implementation may be simplified.

In addition, as the current position is recognizable even without focal distance information of a camera and two-dimensional coordinates of features in an image, the technology may be implemented and accuracy of estimation of the current position may improve.

In addition, as the present invention is implementable simply with a two-dimensional map, a memory may be used efficiently.

In addition, as rarity of features is considered based on the score and the recognition score, a different weight is applied to each feature for position estimation, and thus, more precise position estimation is possible.

In addition, as areas are divided and grouped in a pyramid form, a time required for position recognition is remarkably reduced.

Effects of the present invention should not be limited to the aforementioned effects and other unmentioned effects will be clearly understood by those skilled in the art from the claims.

DESCRIPTION OF DRAWINGS

FIG. 7 illustrates a flowchart of a scenario for another case where the moving robot of FIG. 1 performs position recognition (S200, S200') on a map in response to a position jumping event (S20), and an example of the position jumping event (S20).

FIG. 9 illustrates a first scenario of a case where, when two actual areas Area1 and Area2 are connected to each other on a plane and a pre-stored map M1 of the two areas Area1 and Area2 exists, a moving robot 100 jumps from a position in the Area1 to a position in the Area2.

FIG. 10 illustrates a second scenario of a case where, when the two actual areas Area1 and Area2 are connected to each other on a plane and a pre-stored map M1 of only Area1 out of the two areas Area1 and Area2 exists, a moving robot 100 jumps from a position in Area1 to a position in Area2.

FIG. 11 illustrates a third scenario of a case where, when actual two floors are separated from each other on a plane and pre-stored maps M1 and M2 of the two floors Floor1 and Floor2 exist, the moving robot 100 jumps from a position on the floor Floor2 to a position on the floor Floor2.

FIG. 12 illustrates a fourth scenario of a case where, when the actual two floors are separated from each other on a plane and a pre-stored map M1 of only the floor Floor1 out of the two floors Floor1 and Floor2 exists, the moving robot 100 jumps from a position on the floor Floor2 to a position on the floor Floor2.

FIG. 14A illustrates the learning process (S100), and FIG. 14B illustrates the position recognition process (S200) on a map that is learned in accordance with the learning process (S100).

FIG. 16A illustrates the learning process (S100'), and FIG. 16B illustrates the position recognition process (S200') on a map that is learned in accordance with the learning process (S100').

FIG. 21 is a conceptual diagram illustrating features f1, f2, f3, f4, f5, f6, and f7 in an image acquired at a position P3, and how to generate n-dimensional descriptors $\vec{F1}$, $\vec{F2}$, $\vec{F3}$, . . . , $\vec{Fm}$ respectively corresponding to all features f1, f2, f3, . . . , fm in a small area A1.

FIG. 23 is a conceptual diagram illustrating an example of a predetermined label rule, and an example of a predetermined superordinate label rule.

FIG. 25 illustrates feature distributions of small areas A1, A2, . . . , and Ak generated through such a predetermined process.

FIG. 27 illustrates feature distributions of large areas X1, X2, . . . , and Xj generated through such a predetermined process.

FIG. 33 shows a process (Q) for selecting a small area in response to position recognition and then selecting a node according to the first embodiment, and a process (O) for selecting a node in response to position recognition without selecting a small area, so that a time difference (Ta<To) between the process (Q) and the process (O) is found.

FIG. 33 shows a process (Q) for selecting a small area in response to position recognition and then selecting a node according to the first embodiment, and a process (O) for selecting a node in response to position recognition without selecting a small area, so that a time difference (Ta<To) between the process (Q) and the process (O) is found.

BEST MODE

A moving robot 100 of the present invention refers to a robot capable of moving by itself with a wheel and the like, and the moving robot 100 may be a domestic robot and a robot cleaner. Hereinafter, with reference to FIGS. 1 to 4, the moving robot 100 is exemplified by a robot cleaner 100 but not necessarily limited thereto.

Figure 1:
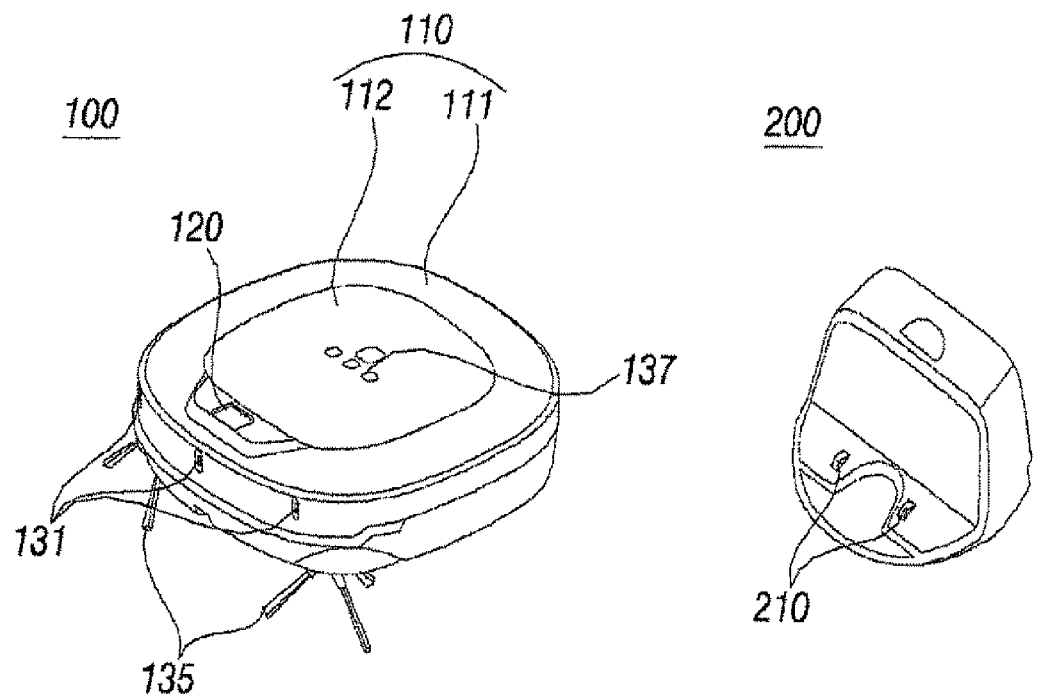
FIG. 1 is a perspective view illustrating a moving robot and a charging base for the moving robot according to an embodiment of the present invention.
Figure 2:
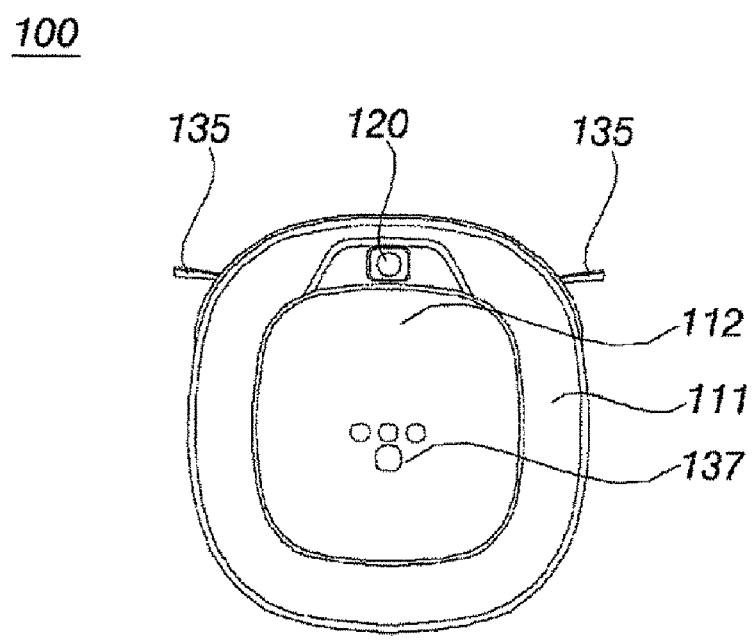
FIG. 2 is a view illustrating a top part of the robot cleaner illustrated in FIG.
Figure 3:
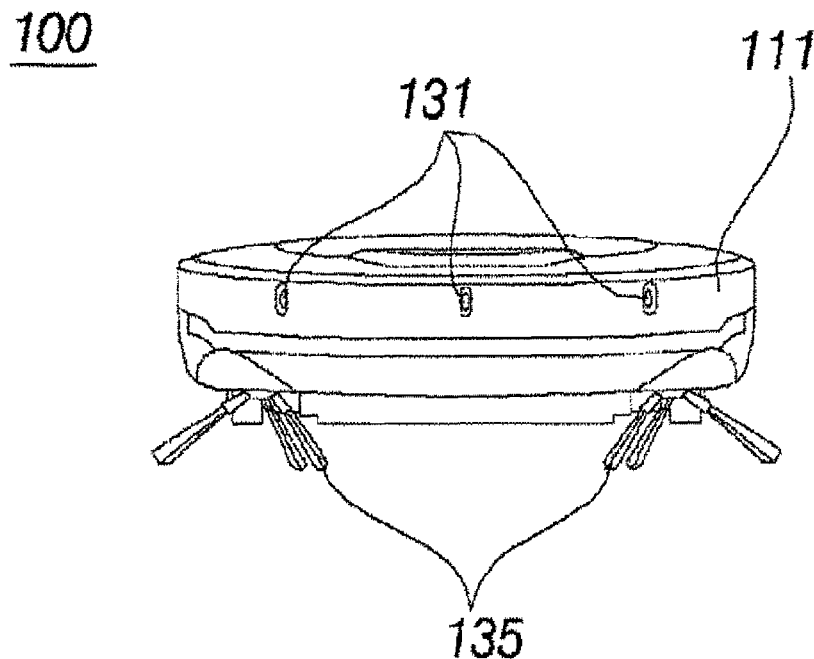
FIG. 3 is a view illustrating a front part of the robot cleaner illustrated in FIG. 1.
Figure 4:
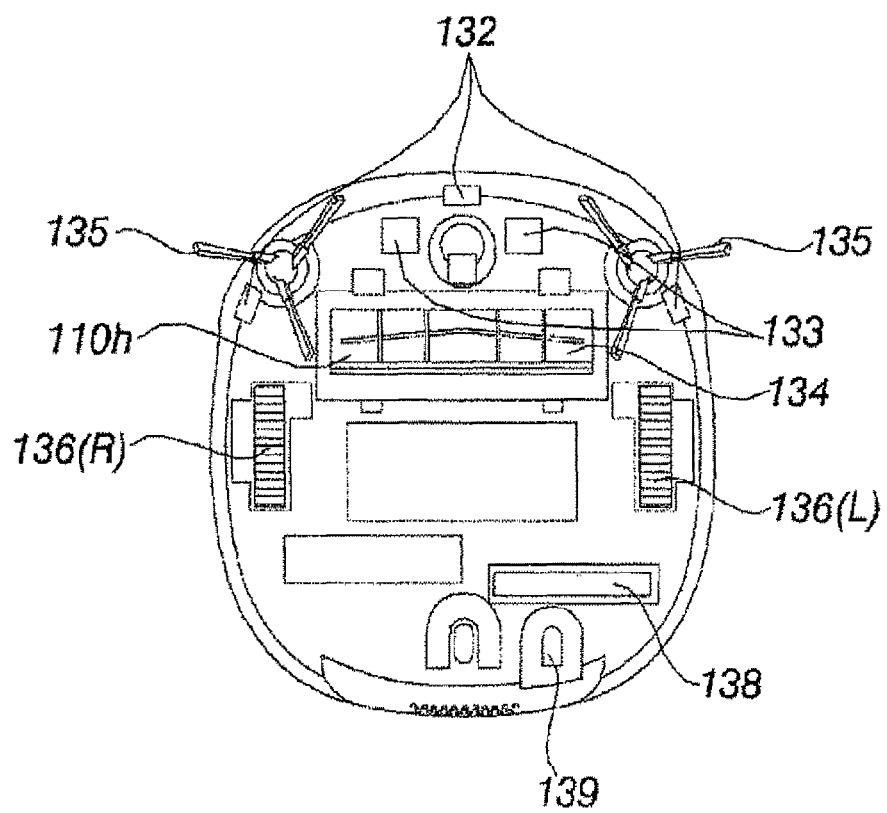
FIG. 4 is a view illustrating a bottom part of the robot cleaner illustrated in FIG. 1.

FIG. 1 is a perspective view illustrating a cleaner 100 and a charging base 200 for charging a moving robot. FIG. 2 is a view illustrating a top part of the robot cleaner 100 illustrated in FIG. 1. FIG. 3 is a view illustrating a front part of the robot cleaner 100 illustrated in FIG. 1. FIG. 4 is a view illustrating a bottom part of the robot cleaner 100 illustrated in FIG. 1.

The robot cleaner 100 includes a main body 110, and an image acquisition unit 120 for acquiring an image of an area around the main body 110. Hereinafter, as to defining each part of the main body 110, a part facing the ceiling in a cleaning area is defined as a top part (see FIG. 2), a part facing the floor in the cleaning area is defined as a bottom part (see FIG. 4), and a part facing a direction of travel in parts constituting the circumference of the main body 110 between the top part and the bottom part is referred to as a front part (see FIG. 3).

The robot cleaner 100 includes a travel drive unit 160 for moving the main body 110. The travel drive unit 160 includes at least one drive wheel 136 for moving the main body 110. The travel drive unit 160 may include a driving motor. Drive wheels 136 may be provided on the left side and the right side of the main body 110, respectively, and such drive wheels 136 are hereinafter referred to as a left wheel 136(L) and a right wheel 136(R), respectively.

The left wheel 136(L) and the right wheel 136(R) may be driven by one driving motor, but, if necessary, a left wheel drive motor to drive the left wheel 136(L) and a right wheel drive motor to drive the right wheel 136(R) may be provided. The travel direction of the main body 110 may be changed to the left or to the right by making the left wheel 136(L) and the right wheel 136(R) have different rates of rotation.

A suction port 110h to suction air may be formed on the bottom part of the body 110, and the body 110 may be provided with a suction device (not shown) to provide suction force to cause air to be suctioned through the suction port 110h, and a dust container (not shown) to collect dust suctioned together with air through the suction port 110h.

The body 110 may include a case 111 defining a space to accommodate various components constituting the robot cleaner 100. An opening allowing insertion and retrieval of the dust container therethrough may be formed on the case 111, and a dust container cover 112 to open and close the opening may be provided rotatably to the case 111.

There may be provided a roll-type main brush having bristles exposed through the suction port 110h and an auxiliary brush 135 positioned at the front of the bottom part of the body 110 and having bristles forming a plurality of radially extending blades. Dust is removed from the floor in a cleaning area by rotation of the brushes 134 and 135, and such dust separated from the floor in this way is suctioned through the suction port 110h and collected in the dust container.

A battery 138 serves to supply power not only necessary for the drive motor but also for overall operations of the robot cleaner 100. When the battery 138 of the robot cleaner 100 is running out, the robot cleaner 100 may perform return travel to the charging base 200 to charge the battery, and during the return travel, the robot cleaner 100 may autonomously detect the position of the charging base 200.

The charging base 200 may include a signal transmitting unit (not shown) to transmit a predetermined return signal. The return signal may include, but is not limited to, a ultrasonic signal or an infrared signal.

The robot cleaner 100 may include a signal sensing unit (not shown) to receive the return signal. The charging base 200 may transmit an infrared signal through the signal transmitting unit, and the signal sensing unit may include an infrared sensor to sense the infrared signal. The robot cleaner 100 moves to the position of the charging base 200 according to the infrared signal transmitted from the charging base 200 and docks with the charging base 200. By docking, charging of the robot cleaner 100 is performed between a charging terminal 133 of the robot cleaner 100 and a charging terminal 210 of the charging base 200.

The image acquisition unit 120, which is configured to photograph the cleaning area, may include a digital camera. The digital camera may include at least one optical lens, an image sensor (e.g., a CMOS image sensor) including a plurality of photodiodes (e.g., pixels) on which an image is created by light transmitted through the optical lens, and a digital signal processor (DSP) to construct an image based on signals output from the photodiodes. The DSP may produce not only a still image, but also a video consisting of frames constituting still images.

Preferably, the image acquisition unit 120 is provided to the top part of the body 110 to acquire an image of the ceiling in the cleaning area, but the position and capture range of the image acquisition unit 120 are not limited thereto. For example, the image acquisition unit 120 may be arranged to acquire a forward image of the body 110.

In addition, the robot cleaner 100 may further include an obstacle sensor to detect a forward obstacle. The robot cleaner 100 may further include a sheer drop sensor 132 to detect presence of a sheer drop on the floor within the cleaning area, and a lower camera sensor 139 to acquire an image of the floor.

In addition, the robot cleaner 100 includes a manipulation unit 137 to input an on/off command or any other various commands.

Figure 5:
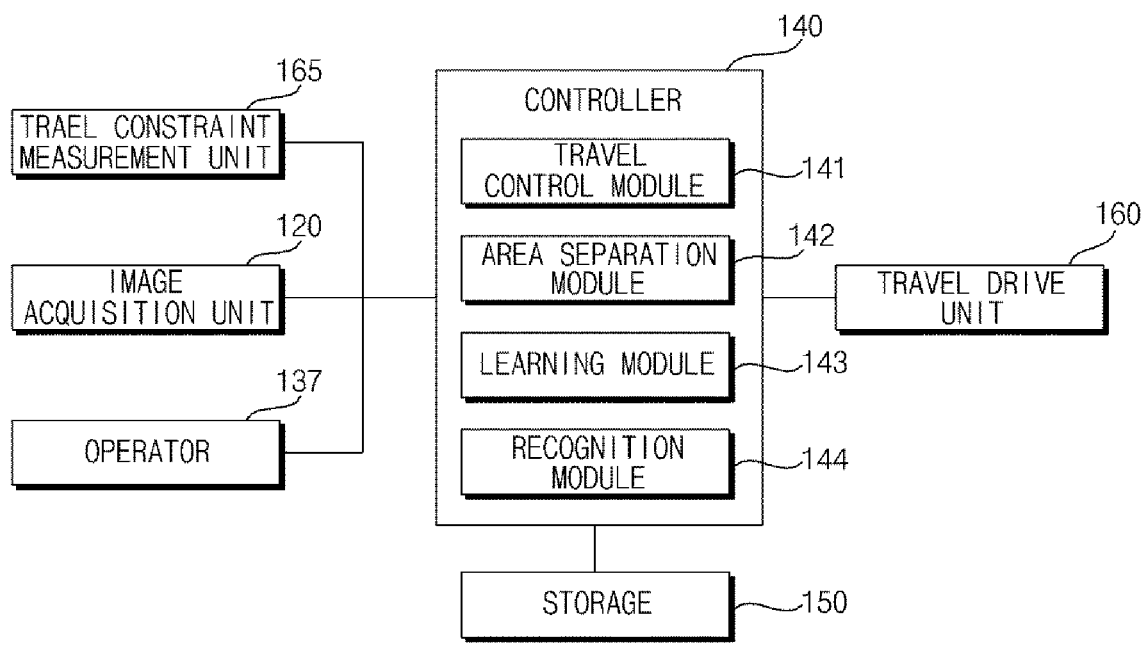
FIG. 5 is a block diagram illustrating a control relationship between major components of a moving robot according to an embodiment of the present invention.

Referring to FIG. 5, the robot cleaner 100 may include a controller 140 for processing and determining a variety of information, such as recognizing the current position, and a storage 150 for storing a variety of data. The controller 140 controls overall operations of the robot cleaner 100 by controlling various elements (e.g., the image acquisition unit 120, the manipulation unit 137, the travel drive unit 160, etc.) included in the robot cleaner 100, and the controller 140 may include a travel control module 141, an area separation module 142, a learning module 143, a recognition module 144. The learning module 143 may be understood as encompassing the area separation module 142.

The storage 150 serves to record various kinds of information necessary for control of the robot cleaner 100 and may include a volatile or non-volatile recording medium. The recording medium serves to store data which is readable by a micro processor and may include a hard disk drive (HDD), a solid state drive (SSD), a silicon disk drive (SDD), a ROM, a RAM, a CD-ROM, a magnetic tape, a floppy disk, and an optical data storage.

Meanwhile, a map of the cleaning area may be stored in the storage 150. The map may be input by an external terminal capable of exchanging information with the robot cleaner 100 through wired or wireless communication, or may be constructed by the robot cleaner 100 through self-learning. In the former case, examples of the external terminal may include a remote control, a PDA, a laptop, a smartphone, a tablet, and the like in which an application for configuring a map is installed.

On the map, positions of rooms within the cleaning area may be marked. In addition, the current position of the robot cleaner 100 may be marked on the map, and the current position of the moving robot 100 on the map may be updated during travel of the robot cleaner 100.

A travel constraint is a concept including a moving direction and a moving distance of the moving robot. When it is assumed that a floor of a travel area is on a plane where the X-axis and the Y-axis are orthogonal to each other, a travel constraint may be represented as $(\Delta x, \Delta y, \theta)$, wherein $\Delta x, \Delta y$ indicate constraint on the X-axis and the Y-axis, respectively, and $\theta$ indicates a rotation angle.

The moving robot 100 includes a travel constraint measurement unit 165. The travel constraint measurement unit 165 may measure a travel constraint based on an image acquired by the lower camera sensor 139. For example, the travel constraint measurement unit 165 may measure a travel constraint by comparing consecutive pixels of an image of a floor, which change in accordance of continuous movement of the moving robot 100.

The travel constraint measurement unit 165 may measure a travel constraint of the moving robot 100 based on operation of the travel drive unit 160. For example, the travel control module 141 may measure the current or previous moving speed, a distance travelled, and the like based on a rotation speed of the drive wheel 136 and may also measure the current or previous change of direction in accordance with a rotation direction of each of the drive wheels 136(L) and 136(R).

The travel constraint measurement unit 165 may measure the travel constraint using at least one of the obstacle sensor 131 or the image acquisition unit 120.

Based on the travel constraint measured in this way, the controller 14 recognize the position of the moving robot on a map when a position jumping event has not occurred.

The travel control module 141 serves to control travel of the robot cleaner 100 and controls driving of the travel drive unit 160 according to a travel setting.

Figure 13:
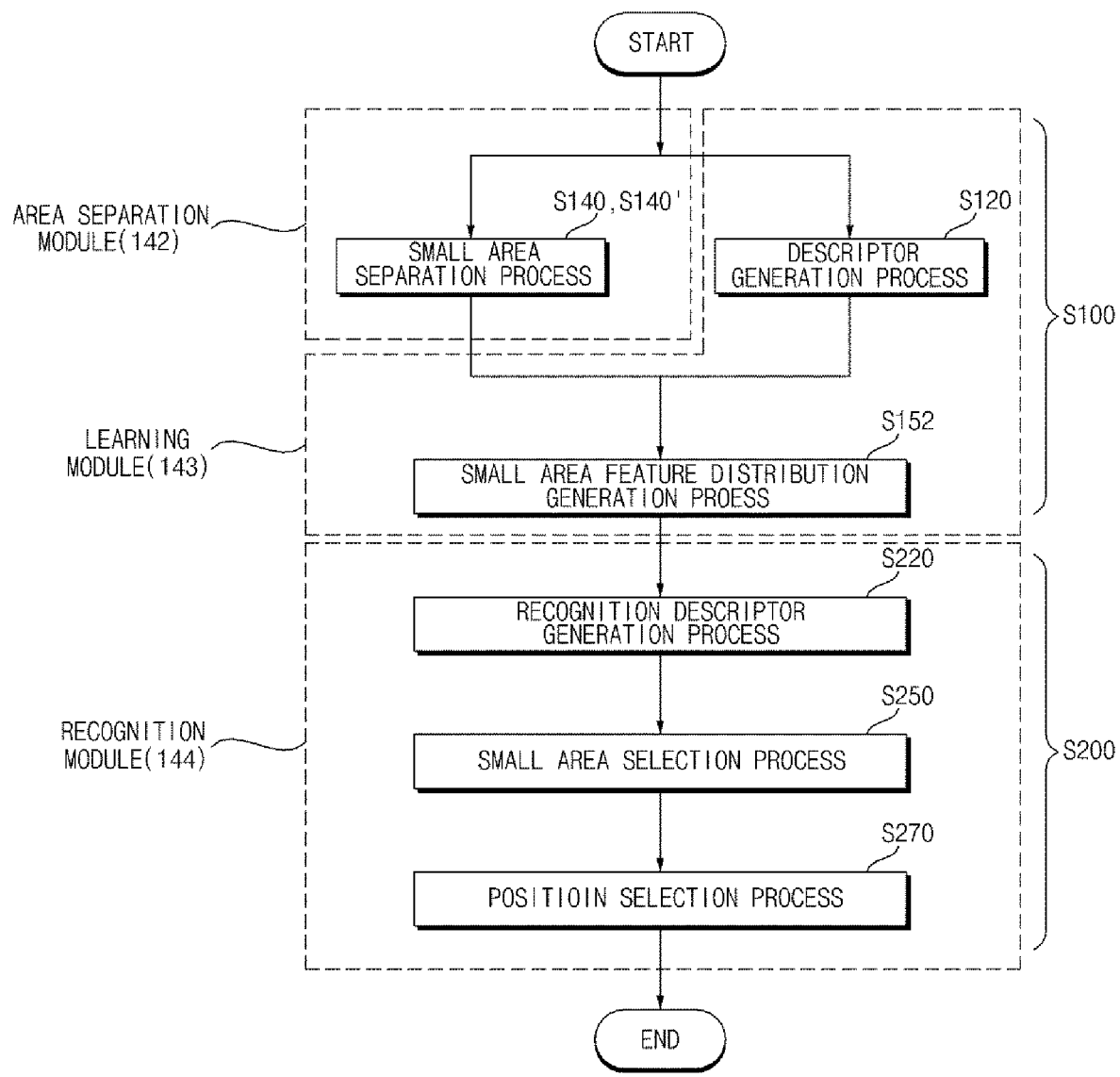
FIG. 13 is a flowchart illustrating a control method of a moving robot according to a first embodiment of the present invention.
Figure 15:
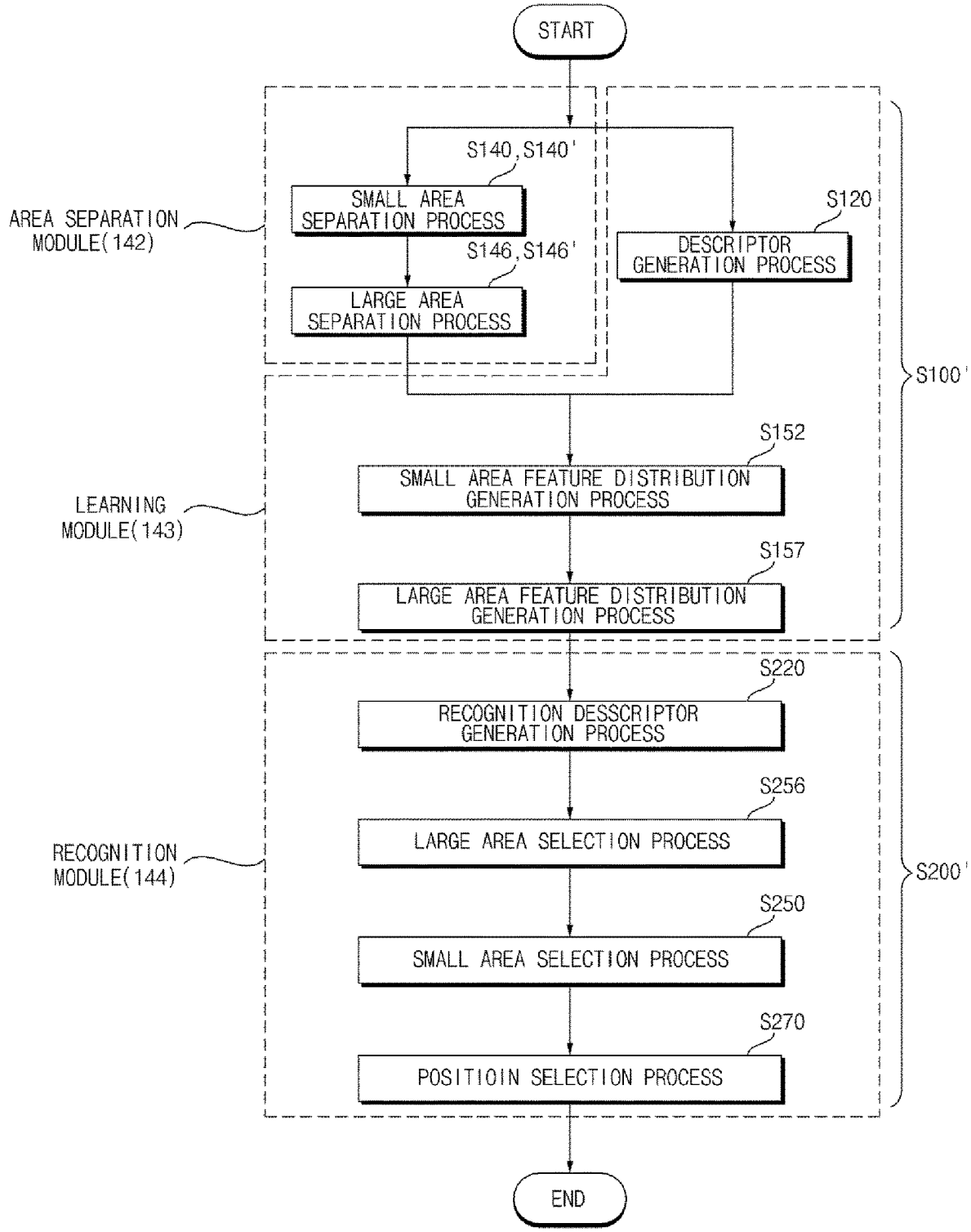
FIG. 15 is a flowchart illustrating a control method of a moving robot according to a second embodiment of the present invention.

With reference to FIGS. 5, 13, and 15, the controller 140 includes an area separation module 142 to separate a travel area X into a plurality of areas by a predetermined criterion. The travel area X may be defined as a range including areas of every plane previously traveled by the moving robot 100 and areas of a plane currently traveled by the moving robot 100.

The area separation module 143 may separate the travel area X into a plurality of small areas.

Figure 18A:
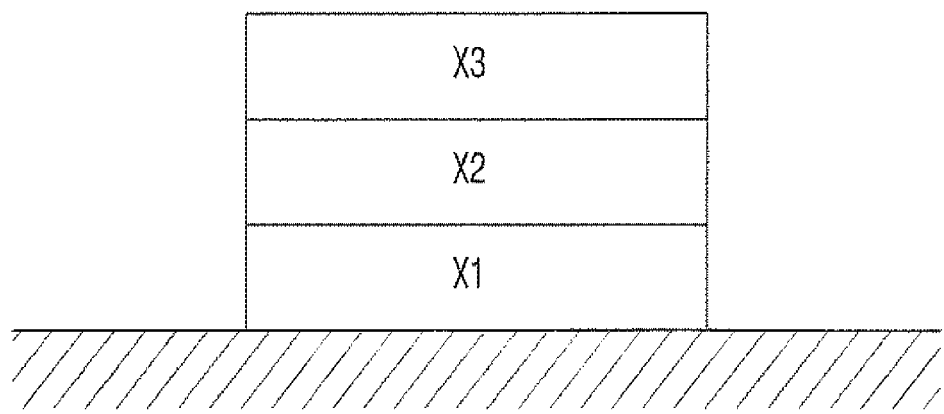
FIG. 18A is a conceptual side view illustrating a plurality of large areas X1, X2, and X3 according to an embodiment.
Figure 18B:
FIG. 18B is a conceptual side view illustrating a plurality of large areas X1, X2, and X3 according to another embodiment.

The area separation module 142 may separate the travel area X into a plurality of large areas completely separated from each other by a moving line. Referring to FIGS. 18A and 18B, two indoor spaces completely separated from each other by a moving line may be separated as two large areas, respectively. For example, referring to FIG. 18A, even in the same indoor space, the large areas may be separated on the basis of floors in the travel area X. In another example, referring to FIG. 18B, even in the same plane, the large areas may be separated on the basis of indoor spaces separated from each other in the travel area X.

The controller 140 may include the learning module 143 for generating a map of the travel area X. For global location recognition, the learning module 143 may process an image acquired at each position and associate the image with the map. Each actual position may be stored in the form of a node N on the map.

The learning module 143 may match an image acquired at each position with each node on the map. Acquisition images may respectively correspond to nodes.

The learning module 143 generates information on nodes on the map based on information on the travel constraint. For example, node coordinate information may be generated based on a travel constraint that is measured with reference to the origin. Node information may include the node coordinate information. The node information may include information on the acquisition image corresponding to the node.

The learning module 143 may generate a map based on a node N and a travel constraint between nodes.

The learning module 143 may update a pre-generated map. The learning module 143 may update pre-stored node coordinate information through continuous traveling. The learning module 143 may update information on an acquisition image corresponding to a node that is pre-stored through the continuous traveling.

A method of recognizing the current position based on the above-described travel information is implementable when continuous traveling of the robot cleaner 100 is given as a premise, and, when a position jumping event has occurred, it is not possible to recognize the current position based on the travel information.

The "position jumping event" is an event where a moving path on a map cannot be tracked. Specifically, the position jumping event may occur when a moving robot has moved when a travel constraint cannot be measured by the travel constraint measurement unit 165. An example of the position jumping event is a kidnapping event (see FIG. 7) where a moving robot in move is forcibly picked up and moved by a user, or an event where a position of a power-off moving robot is forcibly changed.

A method of recognizing a position using image information is a technique of recognizing the current position even in a position jumping event. The controller 140 may include a recognition module 144 that estimates and recognizes the current position even in a position jumping event.

Figure 6:
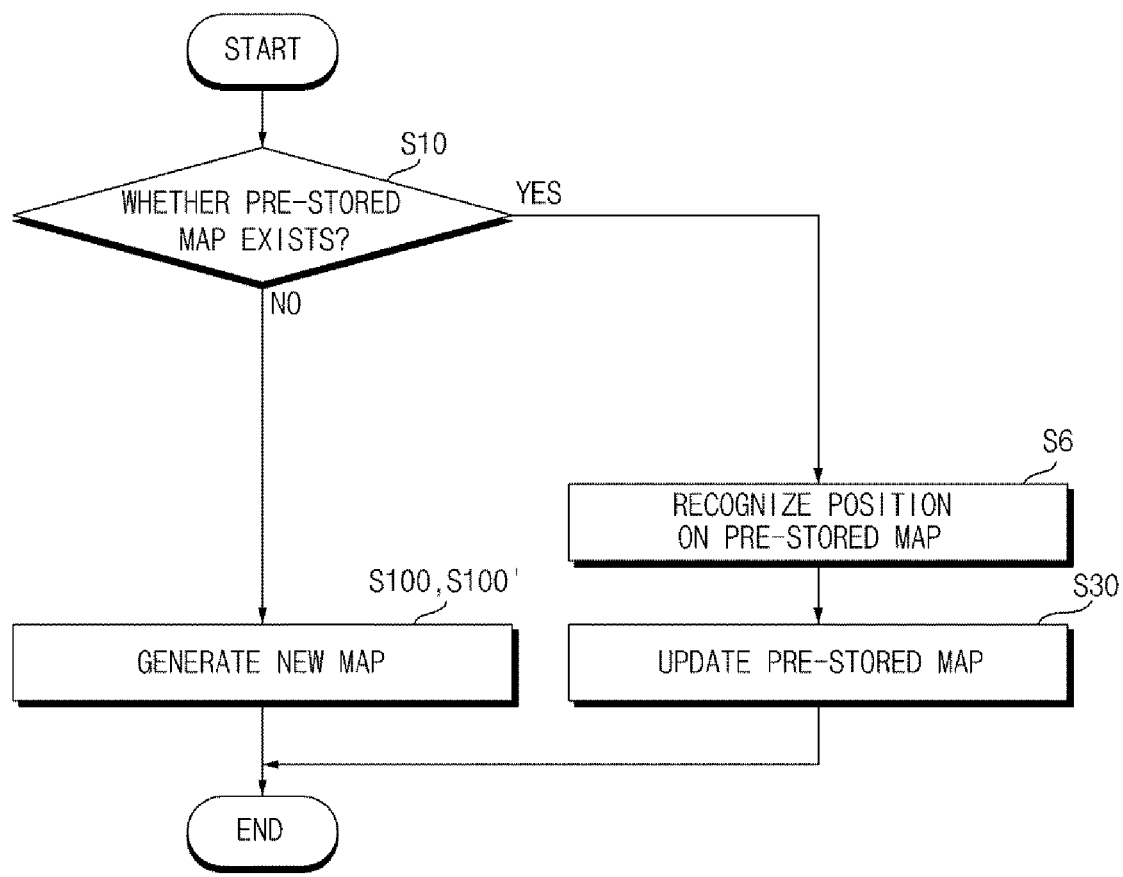
FIG. 6 is a flowchart illustrating a scenario for a case where the moving robot of FIG. 1 generates (S100, S100') or updates (S30) a map depending on presence of a pre-stored map.

A control method of a moving robot according to an embodiment of the present invention includes a learning process (S100, S100', S30). The control method may include a recognition process (S200, S200'). Referring to FIGS. 6 and 7, a scenario of starting the learning process (S100, S100', S30) or the recognition process (S200, S200') is described exemplarily.

In a scenario referring to FIG. 6, when the moving robot 100 starts to travel, whether or not a pre-stored map exists is determined (S10). Determining whether or not the pre-stored map exists may be a process of determining whether or not a map is stored in the storage 150 of the moving robot 100. When it is determined in the process S10 that no pre-stored map exists, the moving robot 100 starts the learning process (S100 and S100') of generating a new map. When it is determined in the process S10 that a pre-stored map exists, a process (S6) of recognizing the current position of the moving robot 100 on the pre-stored map starts. After the process (S6), the step (S30) of updating the pre-stored map starts. In the process (S30), the moving robot 100 may update the pre-stored map based on newly acquired image information. The process (S30) may include a process of generating a new node on the pre-stored map based on information acquired from a newly travelled area. In addition, the process (S30) may include a process of updating some of information on a node on the pre-stored map based on environment information that is acquired in the travel area. In this manner, the location recognition process (S6) and the learning process (S30) may be constantly carried out at the same time. (SLAM) Hereinafter, the following description may be, but not limited to, mainly about the learning process (S100 and S100') of generating the map is mainly described, and may apply to the learning process (S30) of updating a map.

In a scenario referring to FIG. 7, a position jumping event occurs (S20). After the occurrence (S20) of the position jumping event, the moving robot 100 starts a process (S200 and S200')_of recognizing the current position on a pre-stored map.

Figure 8:
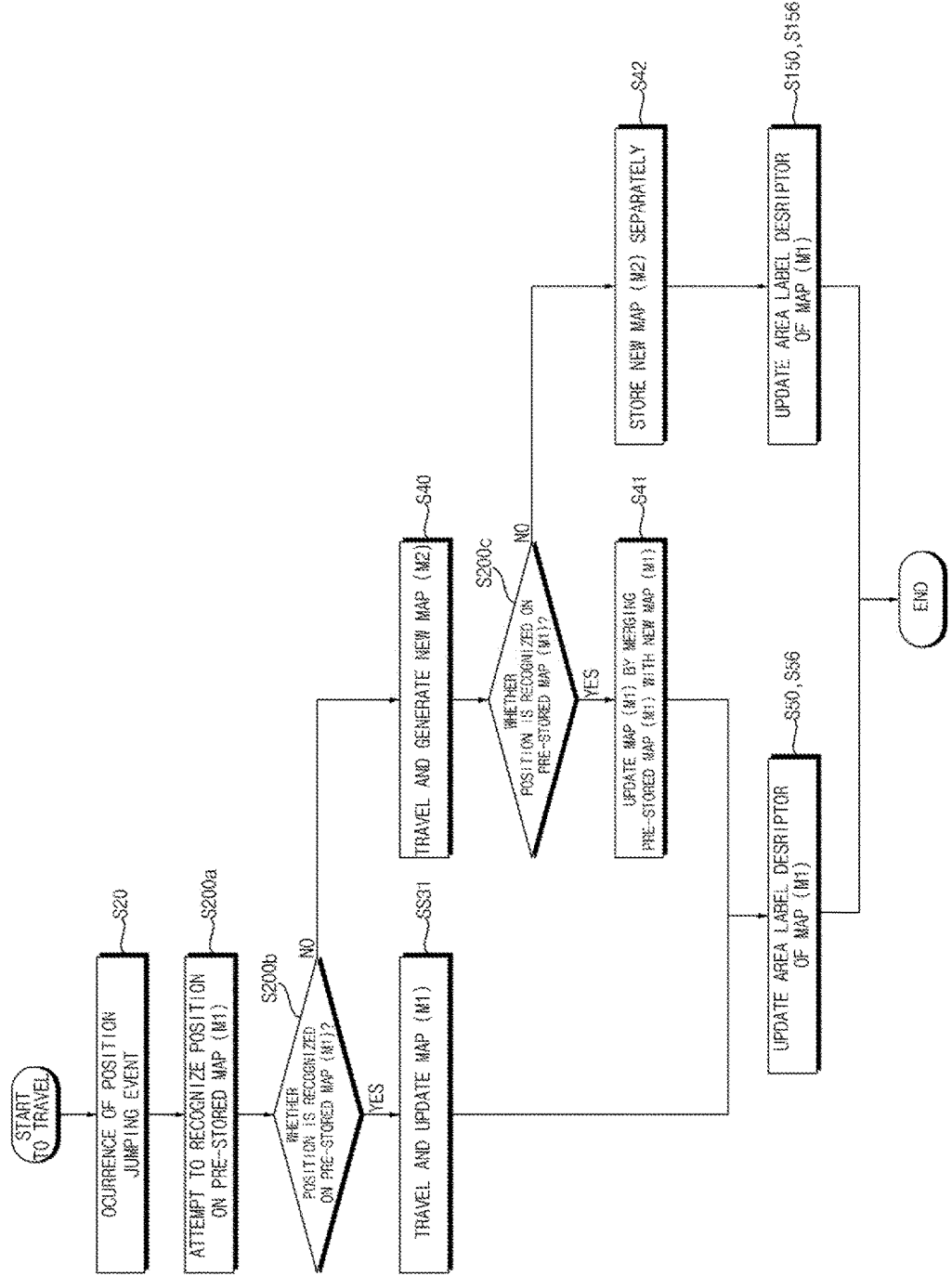
FIG. 8 is a flowchart of a control method depending on recognition of a position on a map M1 by a moving robot according to an embodiment in response to the position jumping event (S20) of the moving robot when the pre-stored map M1 exists.

Referring to FIG. 8, when a position jumping event occurs (s20) with presence of a pre-stored map M1, a method of controlling the moving robot 100 according to an embodiment of the present invention is as follows.

The control method is implemented such that, after occurrence (S20) of a position jumping event, recognition of a position on the pre-stored map M1 is attempted. (S200a) After this, a process (S200b) of determining whether or not the position is recognized on the pre-stored map M1 is performed.

When position recognition is succeeded in the above process (S200b), a process (S31) of traveling and updating the map M1 is performed. In the process (S31), node information may be updated. For example, image information corresponding to an existing node may be changed and a new node may be added to the map M1. Accordingly, descriptors corresponding to features on the map M1 may be updated (changed/deleted/added). In addition, a process (S50) of updating area label descriptors of the map M1 based on descriptors and/or areas updated in the process (S31) of updating (changing/deleting/adding) area distinction of the map M1 is performed.

If position recognition is failed in the above process (s200b), a process (S40) of traveling and generating a new map M2 is performed. In the process (S40), a process (S200c) may be performed to determine whether or not a position on the pre-stored map M1 is recognized. In the process (S40) of generating the new map M2, recognition of a position on the pre-stored map M1 may be allowed, and, for example, when a position jumps into another unmapped area while only some areas on a connected plane is mapped, the moving robot 100 may enter the some areas which have been already mapped, and, at this point, the moving robot 100 is capable of recognizing a position on the existing map.

When recognition of a position on the pre-stored map M1 is succeeded in the process (200c), a process (S41) of updating the map M1 by merging the pre-stored map M1 with a new map M2 is performed. Accordingly, new nodes may be added to the map M1, and descriptors corresponding to features of the map M1 may be added. In addition, an area may be added to the map M1. Based on the descriptors and/or area updated in the above process (S41), a process (S50) may be performed to update the area label descriptors of the map M1.

When recognition of a position on the pre-stored map M1 is filed in the process (200c), a process (S42) of storing the new map M2 separately from the pre-stored map M1 is performed. Accordingly, the map M1 and the map M2 may be stored as maps of different areas. Specifically, the map M1 and the map M2 may be stored as maps for different large areas X1 and X2. In addition, a process (S150, S156) may be performed to generate area label descriptors of the map M2 based on the descriptors of the new map M2.

With reference to FIGS. 9 to 12, scenarios responsive to occurrence of position jumping events under different conditions are described as follows.

Figure 9:
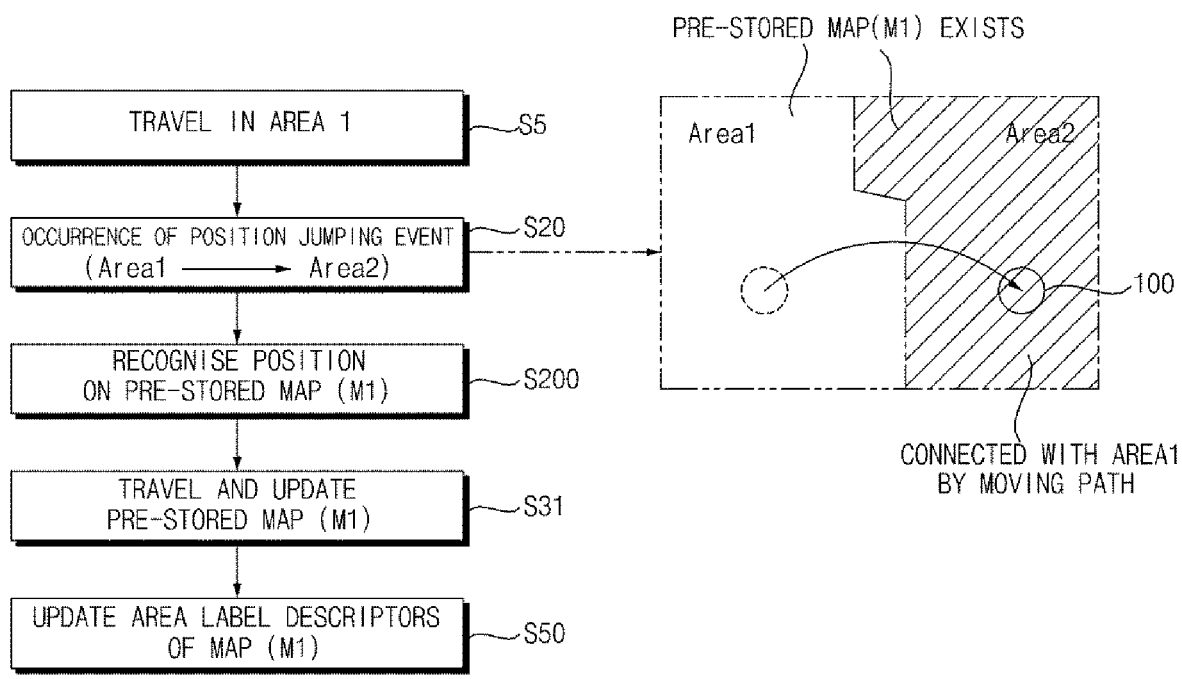
FIGS. 9 to 12 illustrate flowcharts of other scenarios according to the control method of FIG. 8 in response to the position jumping event (S20) of the moving robot under different conditions.

FIG. 9 illustrates a first scenario where a position jumping event occurs (s20) since a moving robot 100, when traveling (S5) in an arean area1, is forcibly moved. Condition of the first scenario are as follows: i) two actual areas Area1 and Area2 are connected by a moving line of the moving robot, and ii) the two areas Area1 and Area2 are already learned and thus a pre-stored map M1 of the two areas Area1 and Area2 already exists.

In the first scenario, after the occurrence (S20) of the position jumping event, the moving robot 100 recognizes the current position thereof on the pre-stored map M1 according to the control method of this embodiment. (S200) After this, the moving robot 100 keeps traveling and updates the pre-stored map M1 based on newly obtained information. (S31) In addition, the moving robot 100 updates small-area label descriptors of the map M1 based on updated descriptors and/or small areas of the pre-stored map M1. (S50)

Figure 10:
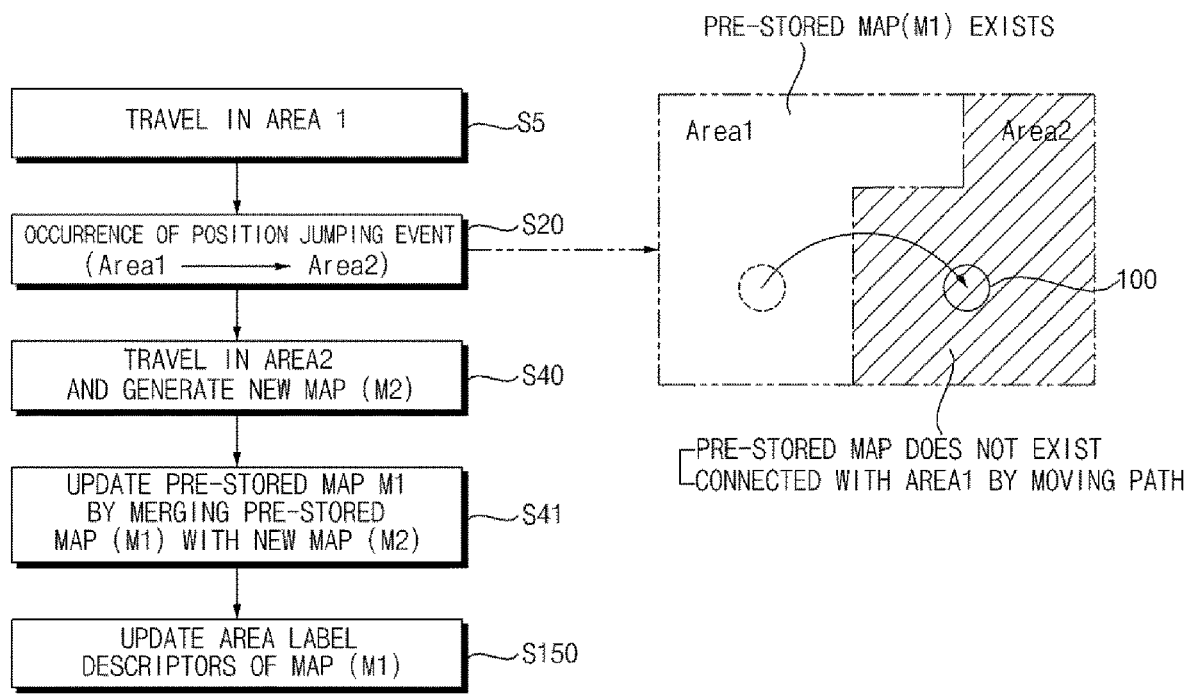

FIG. 10 illustrates a second scenario where a position jumping event occurs (S20) since the moving robot 100, when traveling (S5) in an area Area1, is forcibly moved to an area Area2. Conditions of the second scenario are as follows: i) the two actual areas Area1 and Area2 are connected by a moving line of the moving robot, and ii) the area Area1 out of the two areas Area1 and Area2 is already learned and a pre-stored map M1 of the area Area1 already exists, but learning of the area Area2 was not performed before the occurrence of the position jumping event.

In the second scenario, after the occurrence (S20) of the position jumping event, the moving robot 100 fails to recognize the current position thereof on the pre-stored map M1 according to the control method of this embodiment. Accordingly, the moving robot 100 performs learning while traveling the area Area2, and a process of generating a new map M2 starts. (S40) After the above process (S40), the moving robot 100 enters the area Area1, and determines that a partial area of the mapped map M2 overlaps the pre-stored map M1. Accordingly, a process of updating the pre-stored map M1 by merging the new map M2 with the pre-stored map M1 is performed. (S41) In this process (S41), the area Area2 may be added a new small area on the map M1. A process of generating small-area label descriptors of the map M1 based on added small areas and added descriptors of the map M1 is performed. (S150)

Figure 11:
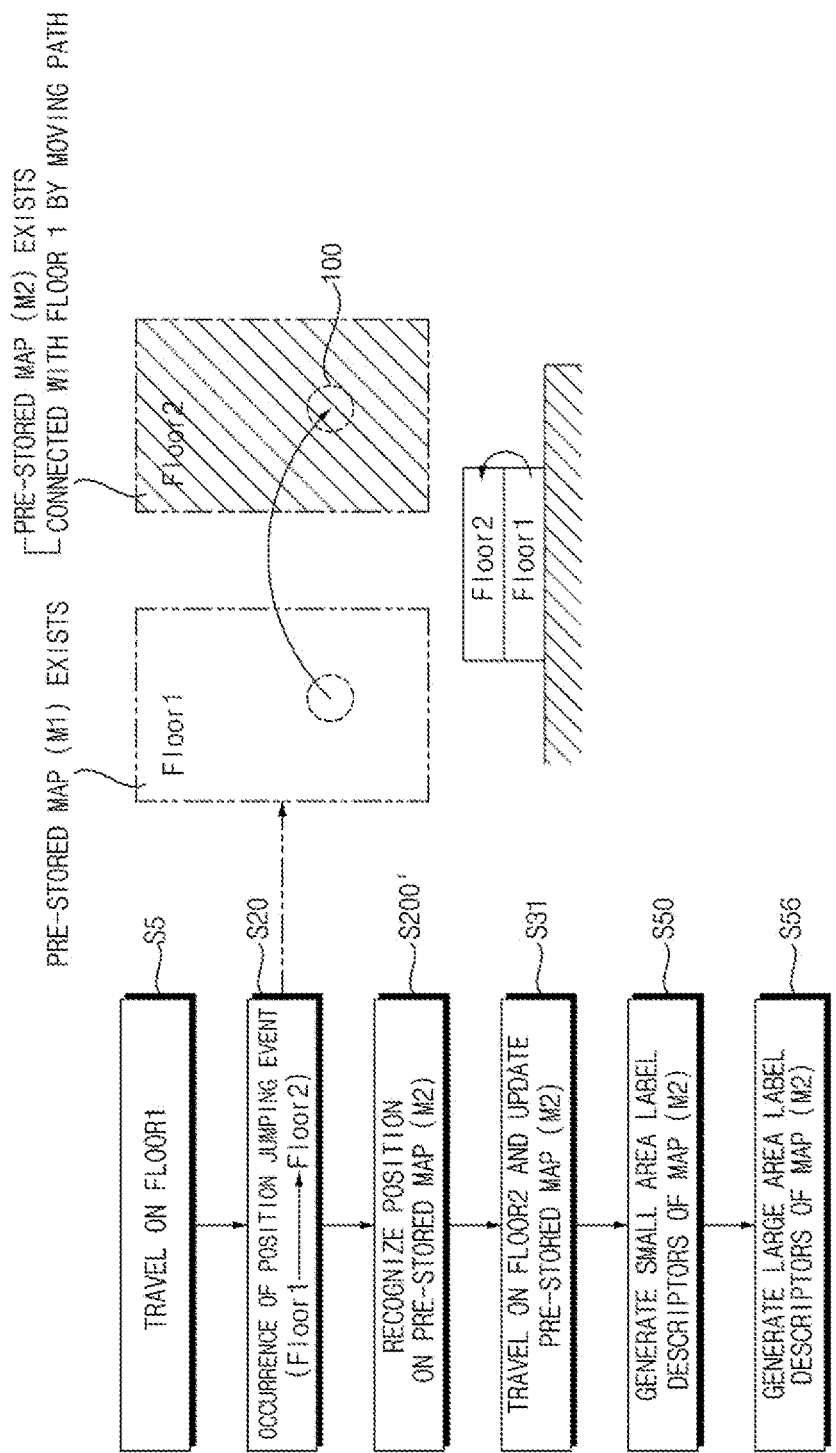

FIG. 11 illustrates a third scenario where a position jumping event occurs (S20) since the moving robot 100, when traveling (S5) on a floor Floor1, is forcibly moved to another floor Floor2. Conditions of the third scenario are as follows: i) the actual two floors Floor1 and Floor2 are not connected by a moving line of the moving robot, and ii) the two floors Floor1 and Floor2 are already learned and thus pre-stored maps M1 and M2 of the two flows Floor1 and Floor2 already exist. Here, the floors Floor1 and Floor2 are large areas X1 and X2 that are separated from each other on the maps M1 and M2.

In the third scenario, after the occurrence of the position jumping event (S20), the moving robot 100 recognizes the current position thereof on the map M2 according to the control method. (S200) After this, the moving robot 100 keeps traveling on the floor Floor2 and update the pre-stored map M2 based on newly obtained information. (S31) In addition, the moving robot 100 updates small-area label descriptors of the map M2 based on updated descriptors and/or small areas of the pre-stored map M2. (S50) The moving robot updates large-area descriptors of the map M2 based on the updated small-area label descriptors. (S56)

Figure 12:
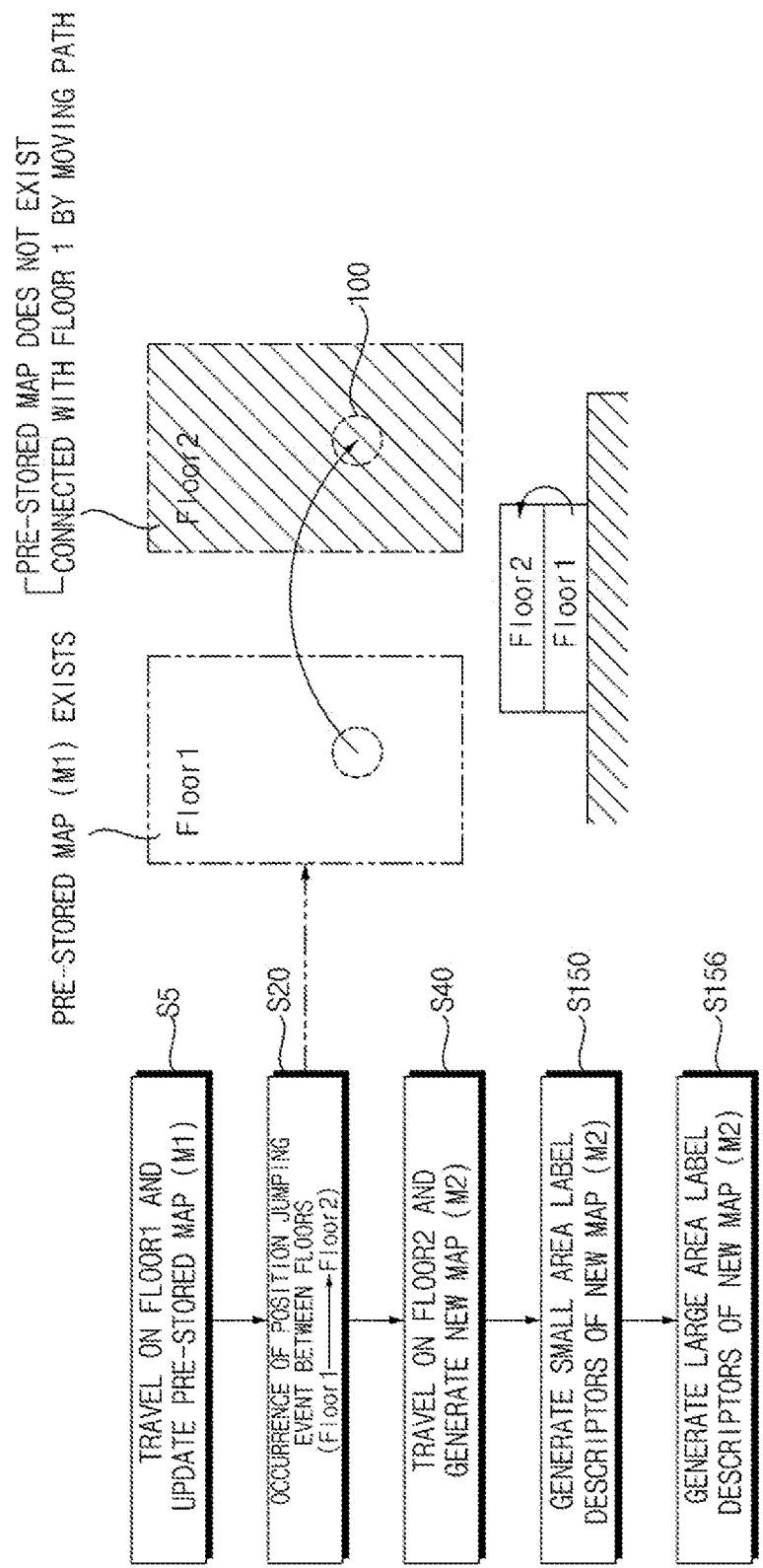

FIG. 12 illustrates a fourth scenario where a position jumping event occurs (S20) since the moving robot 100, when traveling (S5) on a floor Floor1, is forcibly moved to another floor Floor2. Conditions of the fourth scenario are as follows: i) the two actual floors Floor1 and Floor2 are not connected by a moving line of the moving robot, and ii) the floor Floor1 out of the two floors Floor1 and Floor2 is already learned and thus a pre-stored map M1 of the floor Floor1 already exists, but learning of the floor Floor2 was not performed before the occurrence of the position jumping event.

In the fourth scenario, after the occurrence (S20) of the position jumping event, the moving robot 100 fails to recognize the current position thereof on the map M1 according to the control method of this embodiment. Accordingly, the moving robot 100 performs learning while traveling on the floor Floor2, and a process of generating a new map M2 starts. (S40) After this process (S40), the moving robot 100 determines that the mapped map M2 does not overlap the pre-stored map M1. Accordingly, the moving robot 100 stores the new map M2 corresponding to a large area X2, which is different from the pre-stored map M1 corresponding to another large area X1. In addition, the moving robot 100 generates small area descriptors of the map M2 based on generated descriptors and/or small-areas of the new map M2. (S150) After this, the moving robot 100 generates large area label descriptors of the map M2 based on the generated small area label descriptors. (S156)

An example in which the moving robot 100 learns a map and estimate the current position thereof through the learning module 143 and the recognition module 144, even without the area separation module 142, is as follows.

First, a process of learning the map and associating the map with data (feature data) obtained from an image acquired at each position is as follows.

While the moving robot 100 travels, the image acquisition unit 120 acquires images of an area around the moving robot 100. The acquisition images may be images of the above of the moving robot 100, and furthermore the technique of the present invention may be implementable just with an image of a ceiling. Hereinafter, an image acquired by the image acquisition unit 120 is defined as an "acquisition image".

The acquisition unit 120 may acquire an acquisition image at each position on a map. The drawing of FIG. 21 illustrates an acquisition image captured at a certain position in a travel area, and various features, such as lighting devices, edges, corners, blobs, and ridges which are placed on a ceiling, are found in the image.

The learning module 143 detects features from each acquisition image. In the computer vision field, various feature detection methods for detecting features from an image are well-known. A variety of feature detectors suitable for such feature detection are well known. For example, there are Canny, Sobel, Harris&Stephens/Plessey, SUSAN, Shi&Tomasi, Level curve curvature, FAST, Laplacian of Gaussian, Difference of Gaussians, Determinant of Hessian, MSER, PCBR, and Grey-level blobs detectors.

FIG. 21 is a diagram illustrating that descriptors are generated based on features f1, f2, f3, . . . , and fm through a descriptor generation process (S120). (m is a natural number)

A "descriptor" is a pre-determined format data, which represents the feature, and a mathematical data in a format which enables computation of a distance or similarity between descriptors. For example, a descriptor may be a n-dimensional vector (n is a natural number) or data in matrix format.

Throughout this description, the term "generate" means creating data that is not previously stored. The expression "generating a subject B based on a subject A" means generating the subject B as a result of processing information with the subject A as an input value.

In addition, the term "compute" means calculating mathematical data to obtain data which is a result value.

The expression "comparing a subject A and a subject B" means determining similarity between the subject A and the subject B using a well-known technique or a technique according to an embodiment described in the present invention.

For feature detection, features f1, f2, f3, . . . , and fm may be converted into descriptors using Scale Invariant Feature Transform (SIFT). The descriptors may be represented as n-dimensional vectors. (n is a natural number) In FIG. 21, $\vec{F1}, \vec{F2}, \vec{F3}, \ldots, \vec{Fm}$ indicate n-dimensional vectors. f1(1), f1(2), f1(3), ..., f1(n) within the brace { } of $\vec{F1}$ indicate values of dimensions that constitute $\vec{F1}$. The remaining $\vec{F2}$, $\vec{F3}, \ldots, \vec{Fm}$ are represented in the same way and detailed description thereof is herein omitted.

For example, the SIFT is an image recognition technique by which easily distinguishable features f1, f2, f3, f4, f5, f6, and f7, such as corners, are selected in an acquisition image of FIG. 21 and a n-dimensional vector is obtained, which is each dimensional value indicative of a drastic degree of change in each direction with respect to a distribution feature (a direction of brightness change and a drastic degree of the change) of gradient of pixels included in a predetermined area around each of the features f1, f2, f3, f4, f5, f6, and f7.

The SIFT enables detecting a feature invariant to a scale, rotation, change in brightness of a subject, and thus, it is possible to detect an invariant (i.e., rotation-invariant) feature of an area even when images of the area is captured by changing a position of the moving robot 100. However, aspects of the present invention are not limited thereto, and Various other techniques (e.g., Histogram of Oriented Gradient (HOG), Haar feature, Fems, Local Binary Pattern (LBP), and Modified Census Transform (MCT)) can be applied.

The learning module 143 may classify at least one descriptor of each acquisition image into a plurality groups based on descriptor information, obtained from an acquisition image of each position, by a predetermined subordinate classification rule and may convert descriptors in the same group into subordinate label descriptors by a predetermined subordinate label rule (in this case, if only one descriptor is included in the same group, the descriptor and a subordinate label descriptor thereof may be identical).

Throughout this description, the term "convert" means changing any one data into different data.

The above descriptions about the predetermined subordinate classification rule and the predetermined subordinate label rule may be understood through the following description about a predetermined classification rule and a predetermined label rule. In this process, a feature distribution of each position may be obtained. A feature distribution of each position may be represented as a histogram or an n-dimensional vector.

In another example, without using the predetermined subordinate classification rule and the predetermined subordinate label rule, an unknown current position of the moving robot 100 may be estimated directly based on a descriptor that is generated from each feature.

Next, when the current position of the moving robot 100 becomes unknown due to position jumping or the like, a process of estimating the current position based on data, such as the descriptor or the subordinate label descriptor which is pre-stored, may be described as below.

The moving robot 100 acquires an acquisition image at the unknown current position through the image acquisition unit 120. The drawing of FIG. 28 illustrates an image captured at the unknown current position, and various features, such as lighting devices, edges, corners, blobs, and ridges which are located at the ceiling, are found in the image.

The recognition module 144 detects features from an acquisition image. Various methods for detecting a feature from an image in the computer vision field, and various feature detectors suitable for such feature detection are the same as described above.

Figure 28:
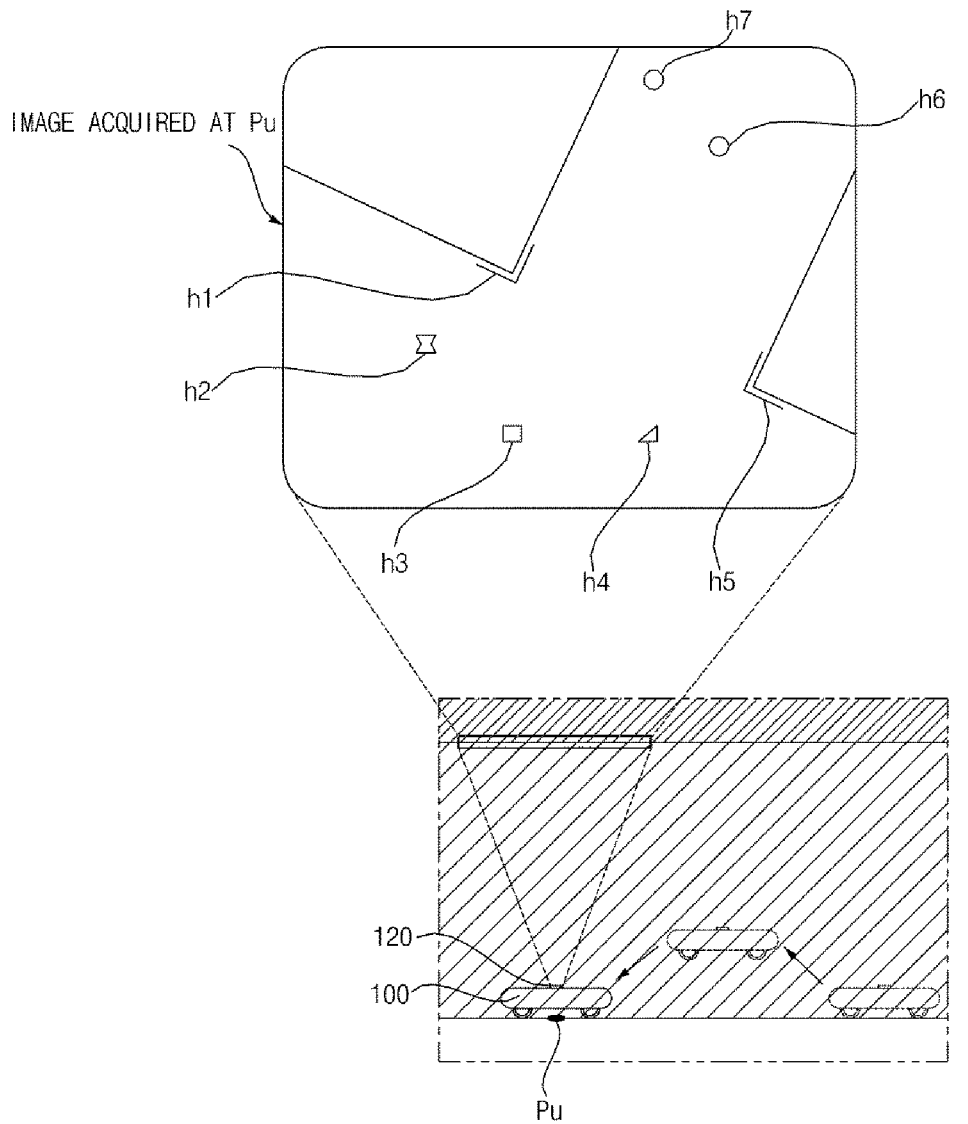
FIG. 28 is a conceptual diagram illustrating recognition features h1, h2, h3, h4, h5, h6, and h7 in an image acquired at an unknown current position, and how to generate recognition descriptors ($\vec{H1}$, $\vec{H2}$, $\vec{H3}$, $\vec{H4}$, $\vec{H5}$, $\vec{H6}$, $\vec{H7}$), which are n-dimensional vectors, respectively corresponding to all the recognition features h1, h2, h3, h4, h5, h6, and h7 in the acquired image.

FIG. 28 is a diagram illustrating generating a recognition descriptor based each recognition feature h1, h2, h3, ... through a recognition descriptor generation process (S220).

The term "recognition feature" is a term used in the case of describing a process performed by the recognition module 144, and defined distinguishable from the term "feature" which is used in the case of describing a process performed by the learning module 143, but these terms are different terms defined merely to indicate characteristics of the world outside the moving robot 100.

For such feature detection, the recognition features h1, h2, h3, ..., hn may be converted into recognition descriptors using the SIFT. The recognition descriptors may be represented as n-dimensional vectors. In FIG. 28, $\vec{H1}, \vec{H2}, \vec{H3}, \ldots, \vec{H7}$ indicate n-dimensional vectors. h1(1), h1(2), h1(3), ..., h1(n) within the brace { } of $\vec{H1}$ indicate values of respective dimensions of $\vec{H1}$. The remaining $\vec{H2}, \vec{H3}, \ldots, \vec{H7}$ are represented in the same way and thus detailed description thereof is herein omitted.

For example, the SIFT is an image recognition technique by which easily distinguishable features h1, h2, h3, h4, h5, h6, and h7, such as corners, are selected in an acquisition image of FIG. 28 and a n-dimensional vector is obtained, which is each dimensional value indicative of a drastic degree of change in each direction with respect to a distribution feature (a direction of brightness change and a drastic degree of the change) of gradient of pixels included in a predetermined area around each of the features h1, h2, h3, h4, h5, h6, and h7.

Based on information on at least one recognition descriptor obtained from an acquisition image of an unknown current position, the recognition module 144 converts position information (e.g., a feature distribution of each position) which is comparable with comparison subject information (e.g., a subordinate recognition feature distribution) by a predetermined subordinate conversion rule.

According to a predetermined subordinate comparison, it is possible to calculate a similarity for each position by comparing feature distribution of each position with a corresponding recognition feature distribution. A similarity (probability) for the position may be calculated, and a position with the highest probability may be selected as the current position of the moving robot 100.

The description about the predetermined subordinate conversion rule and the predetermined subordinate comparison rule may be understood through the following description about a predetermined conversion rule and a predetermined comparison rule.

Referring to FIGS. 12 to 17B, 21 to 15, 28, 31, and 32, a first embodiment in which a travel area X is separated into a plurality of small areas A1, A2, . . . to learn a map or recognize the current position may be described as below.

The area separation module 142 may separate the travel area X into the plurality of small areas according to a predetermined criterion.

Figure 17A:
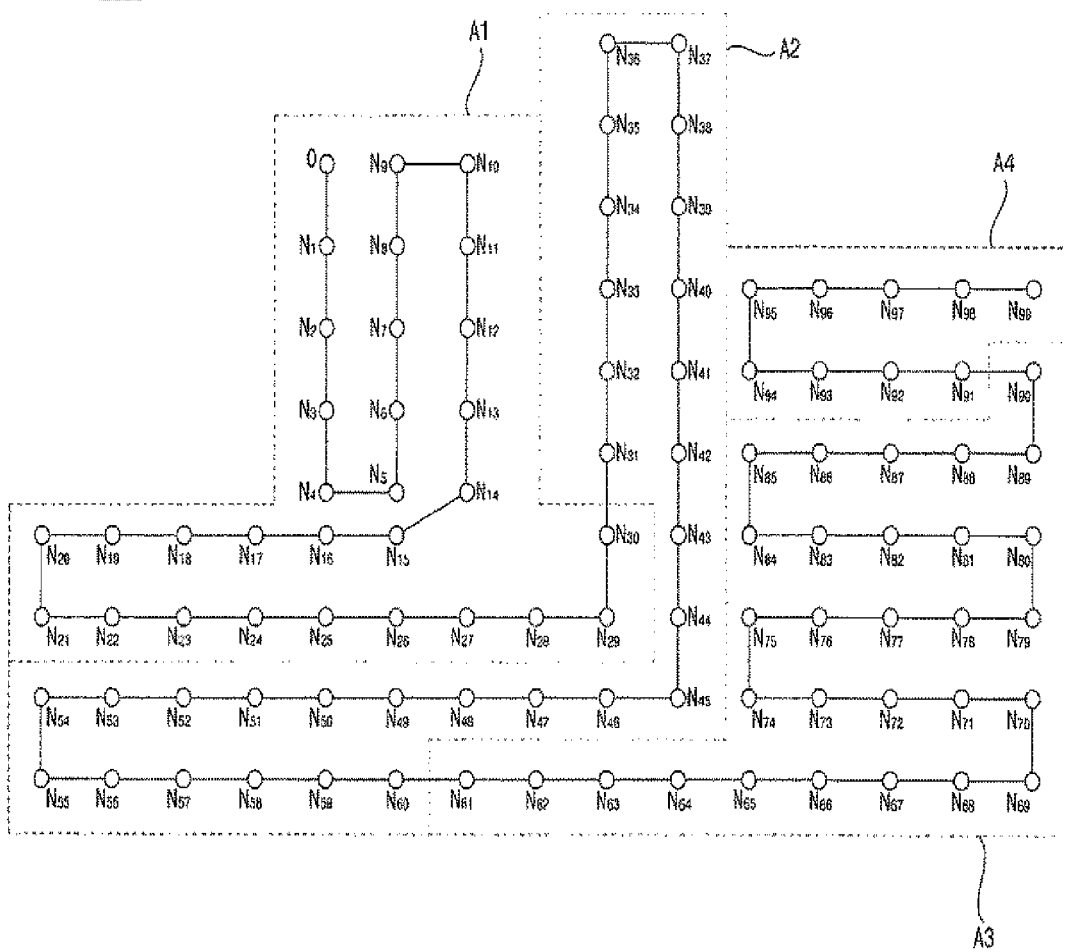
FIG. 17A is a conceptual plan view illustrating a plurality of small areas A1, A2, A3, and A4, and a large area X1 composed of the plurality of small areas A1, A2, A3, and A4 according to an embodiment of the present invention.

Referring to FIG. 17A, in a small area separation process (S140) according to an embodiment, a small area separation condition is set based on the number of nodes. The small area separation condition according to an embodiment includes a "condition in which the number of consecutively generated new nodes reaches a" (a first condition). If the small area separation condition according to an embodiment is satisfied, a number of new additionally generated nodes are grouped as one small area. In this case, a may be preset as a fixed natural value or may be preset as a natural value that changes according to a predetermined criterion.

For example, in the first condition, a=30 may be preset. If the number of consecutively generated new nodes reaches 30, the small area separation condition is satisfied. If the small area separation condition is satisfied, new additionally generated thirty nodes are grouped as one small area.

The small area separation condition according to an embodiment may further include a "condition in which a newly generated node not grouped into a small area under the first condition exists at a point of termination of traveling" (a second condition). If the first condition or the second condition is satisfied, the small area separation condition according to an embodiment is satisfied.

For example, when the moving robot 100 generates a node N to a node N90 in sequence, the first condition is satisfied to separate three areas A1, A2, and A3. Next, if the moving robot 100 generates the node N to the node N90 in sequence and then terminates traveling although the first condition is not satisfied, the moving robot 100 satisfies the second condition such that newly generated nodes N91 to N99 are grouped as a small area A4 and thus separated.

Although not illustrated in the drawing, the moving robot 100 generates a new node while traveling but does not generate an additional node when passing through a previously mapped area, and, when the moving robot 100 terminates passing through the previously mapped area, the moving robot 100 additionally generate a node. In this case, there is no continuity between nodes (a first node group) newly generated before the moving robot 100 passing through the previously mapped area, and nodes (a second node group) newly generated after the moving robot 100 penetrates the already mapped area. The small area separation condition according to an embodiment may include an exception condition in which the first node group and the second node group are grouped as different areas even if "at least one node in the first node group" and "at least one node in the second node group" are allowed to be grouped as the same area according to the first condition or the second condition.

Figure 17B:
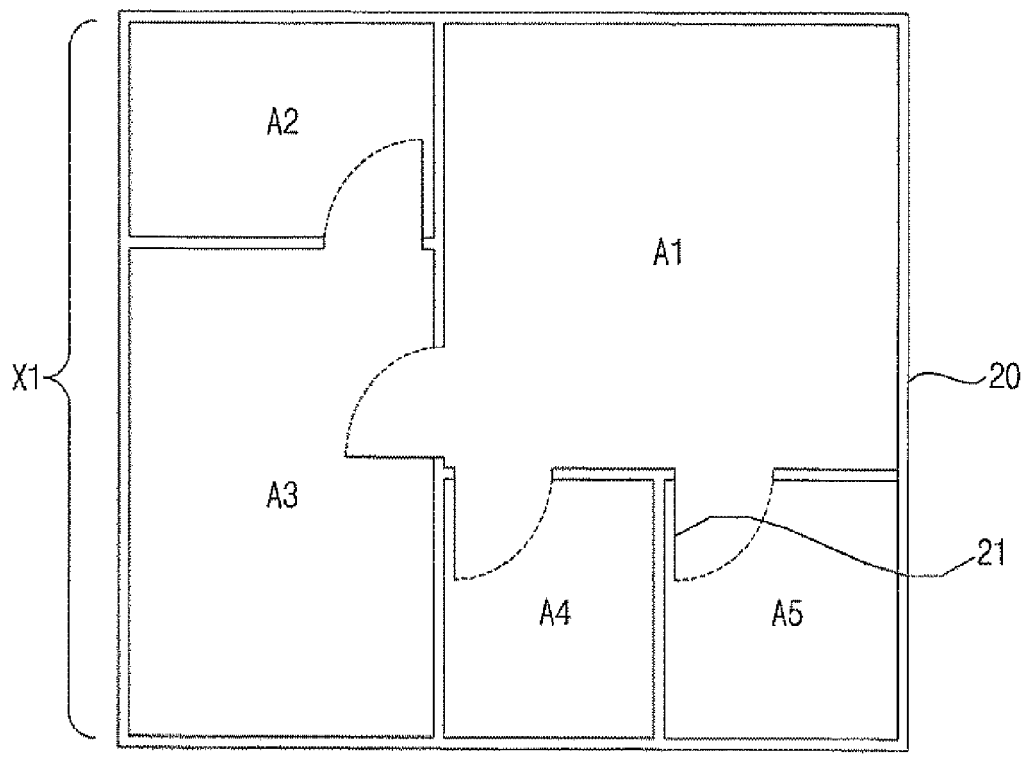
FIG. 17B is a conceptual plan view illustrating a plurality of small areas A1, A2, A3, A4, and A5, and a large area X1 composed of the plurality of small areas A1, A2, A3, A4, and A5 according to another embodiment of the present invention.

Referring to FIG. 17B, in a small area separation process (S140') according to another embodiment, a predetermined small area separation condition is set based on a separation shape of a travel area. The small area separation according to another embodiment is a condition in which an area on a map, corresponding to an actual area separated by each chamber or the like, is separated as an area. As the moving robot 100 recognizes a wall 20 in each chamber and an openable door capable of being opened and closed, the small area separation process (S140') according to another embodiment may be performed. The small area separation process (S140') according to another embodiment groups nodes on the basis of chambers in the travel area X and separates the nodes into areas. FIG. 17B illustrates an exemplary partition shape of an actual travel area, which is the basis of separation into small areas A1, A2, A3, A4, and A5 on a map.

Figure 19:
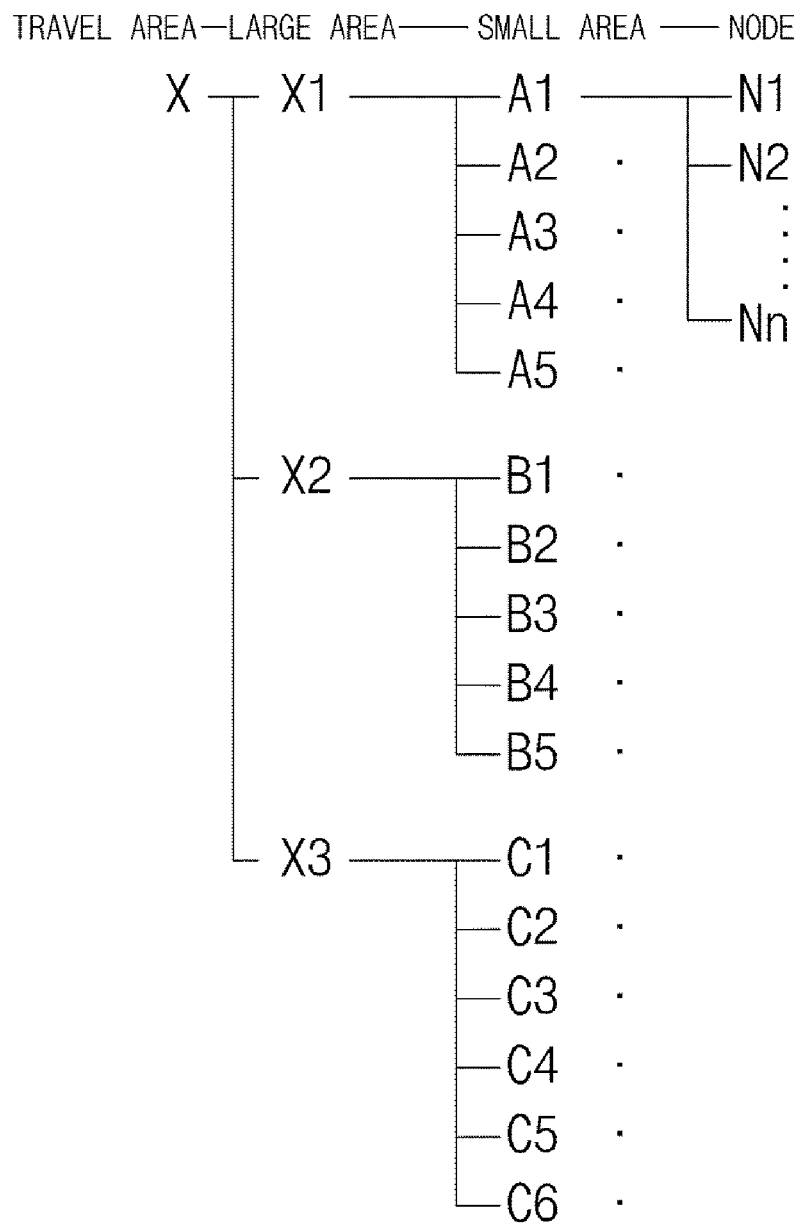
FIG. 19 is a conceptual view illustrating a superordinate-subordinate relationship among a travel area X, a plurality of large areas X1, X2, and X3 constituting the travel area X, a plurality of small areas A1 to A5, B1 to B5, and C1 to C6 respectively constituting the large areas, and a plurality of positions (nodes N1 to Nn) constituting any one small area A1.

Referring to FIG. 19, each small area A1 to A5, B1 to B5, and C1 to C6 is comprised of a plurality of positions (nodes) that constitute a corresponding small area. For example, ay one small area A1 may be comprised of a plurality of nodes N1, N2, N3, . . . , Nn (n is a natural number).

In addition, a process of processing data obtained from an acquisition image acquired at each position is as follows.

Figure 20:
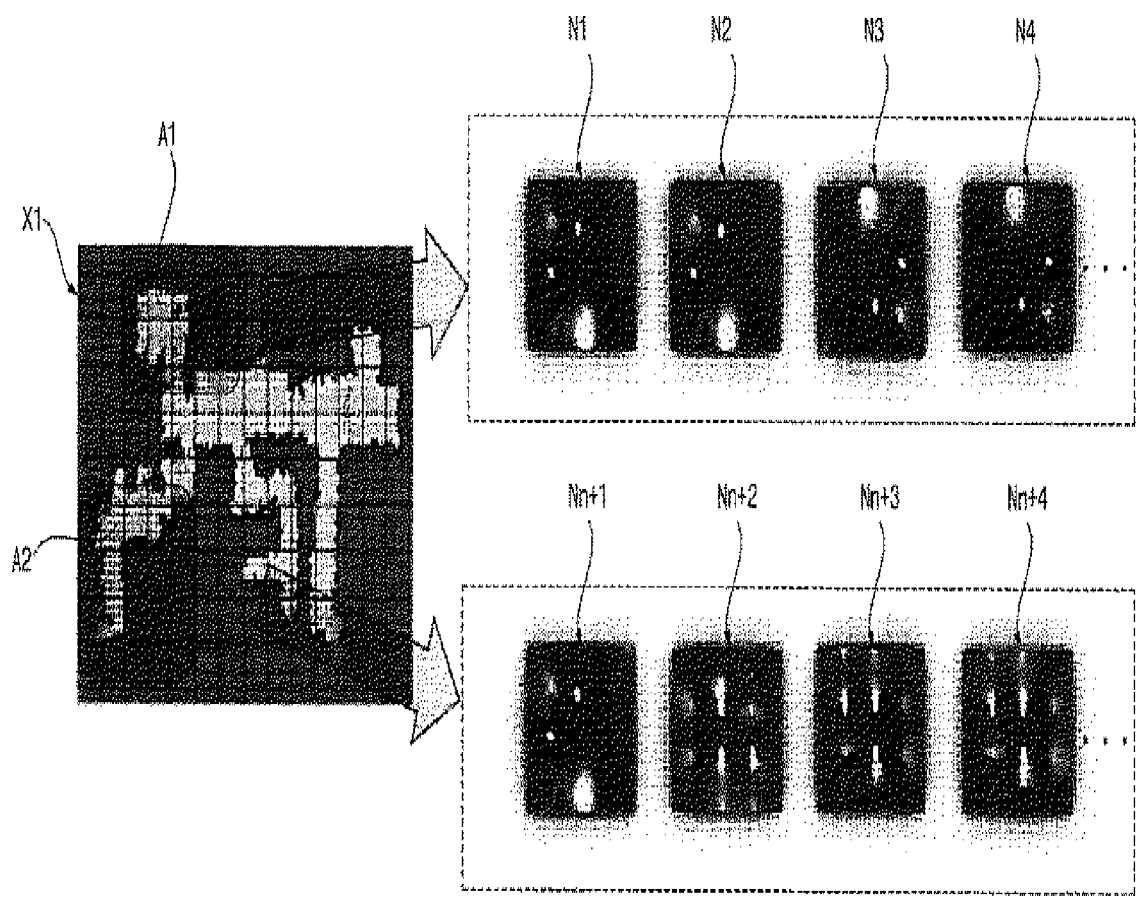
FIG. 20 is a drawing exemplarily illustrating a plurality of small areas A1 and A2 in a large area X1 according to an embodiment, and images respectively acquired at a plurality of nodes N1, N2, N3, N4, . . . , Nn+1, Nn+2, Nn+3, Nn+4, . . . in the respective small areas A1 and A2.

Referring to FIG. 20, each position (e.g., nodes N1, N2, N3, . . . , Nn) corresponds to an acquisition image acquired at each corresponding position.

Throughout this description, the term "correspond" means that a pair of subjects (e.g., a pair of data) matches and thus in a relationship where, in response to one of the two subject, the other subject is determined. For example, when an acquisition image acquired at the any one position is set in response to the any one position or when any one position at which any one acquisition image is acquired is set in response to the any one acquisition image, this may be said that the any one acquisition image and the any one position "correspond" to each other.

Each position, and data acquired from a corresponding acquisition image may be stored in the storage 150.

The image acquisition unit 120 may acquire an acquisition image at each position of the moving robot 100. For example, the drawing of FIG. 21 illustrates an acquisition image captured at an actual position P3 within a small area A1 of the travel area X.

The learning module 143 extracts features (e.g., f1, f2, f3, f4, f5, f6, and f7 in FIG. 12) from images acquired at a plurality of positions. Various methods for detecting a feature from an acquisition image, and various feature detectors are the same as described above.

Referring to FIG. 21, the learning module 143 generates descriptors corresponding to features f1, f2, f3, . . . , and fm. FIG. 21 is a diagram illustrating generating descriptors based on the features f1, f2, f3, . . . , and fm through a descriptor generation process (S120). How to use the SIFT to detect a feature is the same as described above. The descriptors may be represented as 0n-dimensional vectors. (n is a natural number) $\vec{F1}, \vec{F2}, \vec{F3}, \ldots, \vec{Fm}$ are n-dimensional vectors. f1(1), f1(2), f1(3), . . . , f1(n) within the brace of $\vec{F1}$ indicate values of respective dimensions of $\vec{F1}$.

The learning module 143 generates a small area feature distribution for each small area according to a predetermined learning rule.

The predetermined learning rule includes a predetermined classification rule for classifying the plurality of descriptors into a plurality of groups, and a predetermined label rule for converting the descriptors in the same group into label descriptors.

The learning module 143 classifies a plurality of descriptors obtained from all acquisition images of each small area into a plurality of groups according to the predetermined classification rule.

Figure 22:
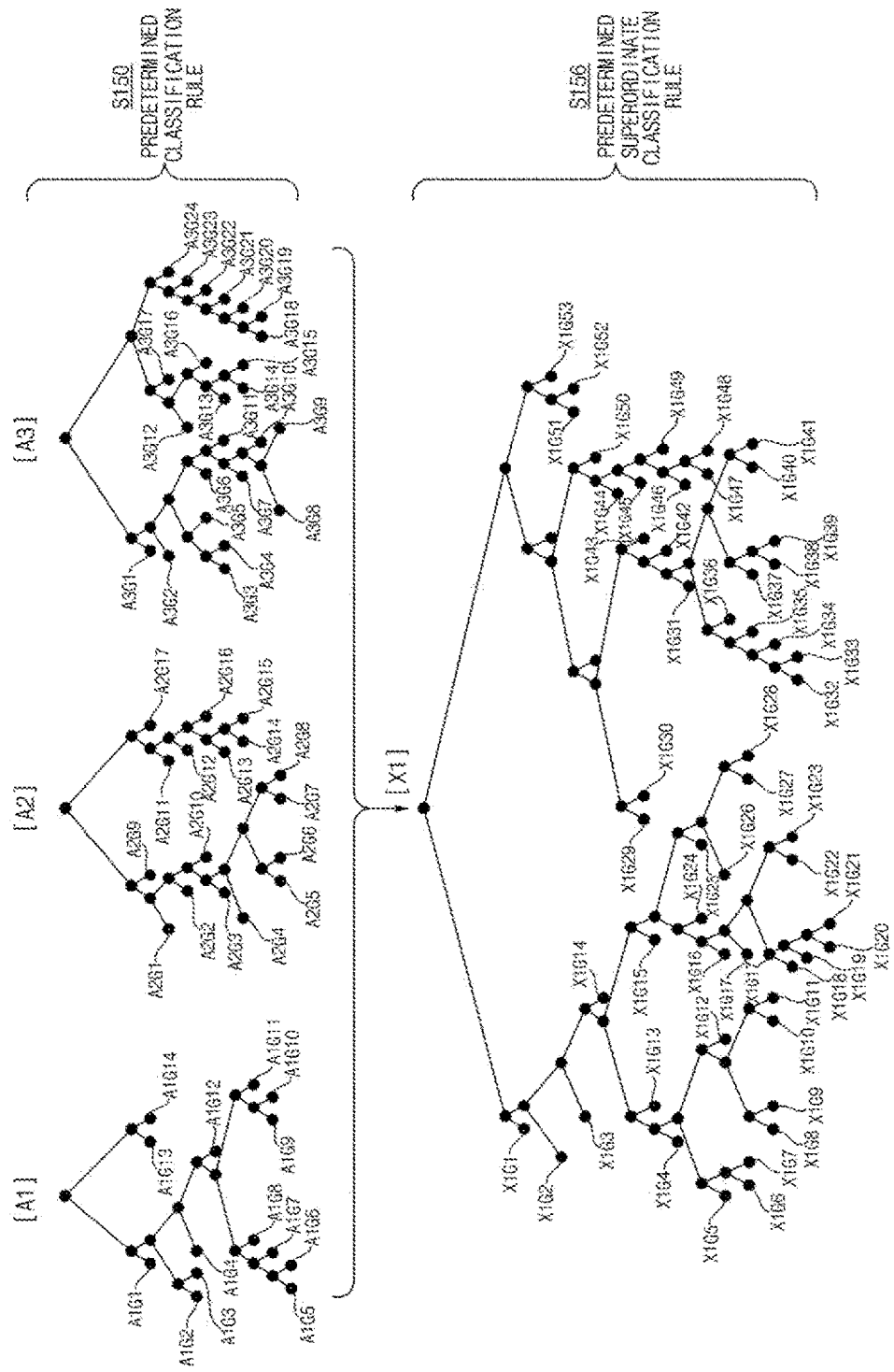
FIG. 22 is a conceptual diagram illustrating an example of a predetermined classification rule, and an example of a predetermined superordinate classification rule.

FIG. 22 illustrates a process (S150) of dividing a plurality of descriptors in small areas A1, A2, and A3 into a plurality of groups by a predetermined classification rule according to one embodiment. FIG. 22 illustrates a tree structure growing downward in a manner in which any one dot is branched into two lines, wherein a dot is formed at the bottom of each line. In the tree structure of the process (S150), the schema in which any one dot is divided downward into two dots represents a "process in which a plurality of descriptors is divided into two groups" (a dividing process). The dots A1G1 to A1G14, A2G1 to A2G17, and A3G1 to A3G24, which constitute lower ends of the tree structure in the process (S150), represent groups into which a plurality of descriptors are divided by a predetermined classification rule.

A process of classifying the plurality of descriptors in the small areas A1, A2, and A3 by a predetermined classification rule according to one embodiment includes the above-described dividing process. In the above-described dividing process, the plurality of descriptors to be divided is defined as a "head group", and two branched groups are each defined as a "branch group". The two branch groups generated in a dividing process may serve as the head group in a next dividing process. In this embodiment, it is described that one head group is divided into two branch groups through one round of the dividing process, but a head group may be divided into three or more branch groups through one round of the dividing process.

In the dividing process, a head group is divided into k1 number of groups based on a distance between the plurality of descriptors in the head group. (Here, k1 is a natural number equal to or greater than 2) Hereinafter, one round of a dividing process is described in more detail. The dividing process includes a first temporary process which is conducted as follows: k1 number of descriptors from is randomly selected among a plurality of descriptors in a head group, and the non-selected remaining descriptors in the head group are grouped with a descriptor at the shortest distance among the k1 number of selected descriptors to form k1 number of "first temporary groups". The dividing process may include a second temporary process which is conducted as follows: after the first temporary process, a first average value of descriptors in each first temporary group is calculated, and, if it is assumed that all descriptors in a head group are matched with a value at the shortest distance among k1 number of first average values, descriptors matched with the same first average value are grouped to form k1 number of "second temporary groups". The dividing process may include first to mth temporary processes. (Here, m is a natural value equal to or greater than 2) The dividing process may include the mth temporary process which is conducted as follows: after the m−1th temporary process, a first m−1th average value of descriptors in each m−1th temporary group is calculated, and, if it is assumed that all descriptors in a head group are matched with a value at the shortest distance among k1 number of m−1th average values, descriptors matched with the m−1th average value are grouped to form k1 number of "mth temporary group". As the temporary process is performed repeatedly from the first round to the mth round, grouping of descriptors may be converged into one form, and the k1 number of mth temporary groups generated after the mth temporary process become k1 number of branch groups. Here, k1 may be 2.

The predetermined classification rule according to one embodiment includes: a "basic rule" which requires the dividing process to be performed on a plurality of descriptors in an area K2 number of times; and an "exception rule" which, when the number of descriptors in a branch group is equal to or less than k3, prevents that a dividing process is not performed with head groups of the branch groups. (Here, k2 and k3 are natural numbers). For example, the predetermined classification rule may include a basic rule of k2=9, and an exceptional rule of k3=1. According to the basic rule, two branch groups may be generated through a dividing process performed on any one head group, and a dividing process may be repeatedly performed on each generated branch group used as a head group. When the number of descriptors in a branch group is equal to or smaller than k3, a dividing process is no longer performed on the branch group used as a head group according to the exception rule, regardless of the basic rule.

In FIG. 22, by the predetermined classification rule according to one embodiment, a plurality of descriptors in an area A1 is divided into a plurality of groups A1G1 to A1G14, a plurality of descriptors in an area A2 is divided into a plurality of groups A2G1 to A2G17, and a plurality of descriptors in an area A3 is divided into a plurality of groups A3G1 to A3G24.

Although not illustrated in the drawing, a predetermined classification rule according to another embodiment includes a rule that requires classifying two descriptors at a distance equal to or smaller than a predetermined value ST1 as the same group. Equation 1 for classifying two descriptors (n-dimensional vectors $\vec{A}$, $\vec{B}$) as the same group may be defined as follows.

$$d = |\vec{A} - \vec{B}| \leq ST1 \qquad \text{Equation 1}$$

Here, $\vec{A}$, $\vec{B}$ are two n-dimensional vectors,
d is a distance between the two dimensional vectors, and ST1 is the predetermined value.

Figure 24:
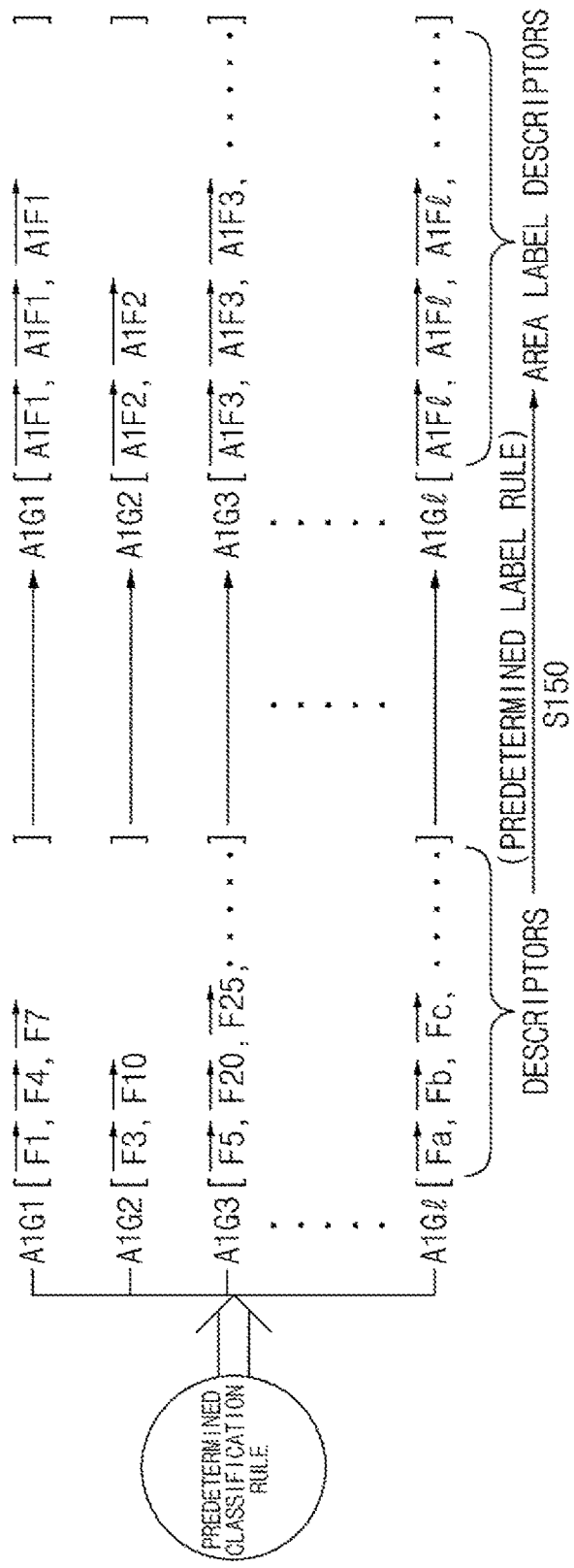
FIG. 24 illustrates how to classify a plurality of descriptors $\vec{F1}$, $\vec{F2}$, $\vec{F3}$, . . . , $\vec{Fm}$ generated in a small area A1 through a predetermined process into a plurality of groups A1G1, A1G2, A1G3, . . . , and A1Gl by a predetermined classification rule, and how to convert a plurality of descriptors in the same group into label descriptors $\overrightarrow{A1F1}$, $\overrightarrow{A1F2}$, $\overrightarrow{A1F3}$, . . . , $\overrightarrow{A1Fl}$ by a predetermined label rule.

In FIG. 24, A1G1, A1G2, A1G3, . . . , A1Gl illustrates groups into which all descriptors in the small area A1 is to be divided by a predetermined classification rule. Contents within the square bracket [ ] illustrates at least one descriptor classified as the same group. For example, descriptors classified as any one group A1G1 are $\vec{F1}$, $\vec{F4}$, $\vec{F7}$. The remaining A1G2, A1G3, . . . , A1Gl are represented in the same way and thus detailed description thereof is herein omitted.

Referring to FIG. 24, the learning module 143 converts descriptors included in the same group into respective label descriptors by the predetermined label rule. In FIG. 24, ($\overrightarrow{A1F1}$, $\overrightarrow{A1F1}$, $\overrightarrow{A1F1}$) illustrates label descriptors converted by the predetermined label rule. A plurality of groups in the same group is all converted into the identical label descriptors. For example, descriptors $\vec{F1}$, $\vec{F4}$, $\vec{F7}$ in any one group A1G1 are all converted into $\overrightarrow{A1F1}$. That is, three different descriptors $\vec{F1}$, $\vec{F4}$, $\vec{F7}$ in the group A1G1 are converted into three identical descriptors ($\overrightarrow{A1F1}$, $\overrightarrow{A1F1}$, $\overrightarrow{A1F1}$). Descriptors in the remaining groups A1G2, A1G3, . . . , A1Gl are converted in the same way and thus detailed description thereof is herein omitted.

FIG. 23 illustrates a process (S150) of generating a small area label descriptor ($\overrightarrow{A1F3}$) with a weight of wa based on a plurality of descriptors by a predetermined label rule according to one embodiment. (Here, wa is a natural number)

The predetermined label rule may be based on an average value of at least one descriptor (an n-dimensional vector) classified as the same group. For example, if it is assumed that a descriptor (an n-dimensional vector) classified as being included in a particular group is $\vec{A1}$, $\vec{A2}$, $\vec{A3}$, . . . , $\vec{Ax}$ and that x is the number of descriptors classified as being included in the particular group, a label descriptor (an n-dimensional vector) $\vec{A}$ may be defined as in Equation 2 as below.

$$\vec{A} = \frac{\vec{A1} + \vec{A2} + \vec{A3} + \cdots + \vec{Ax}}{x} \qquad \text{Equation 2}$$

Figure 25:
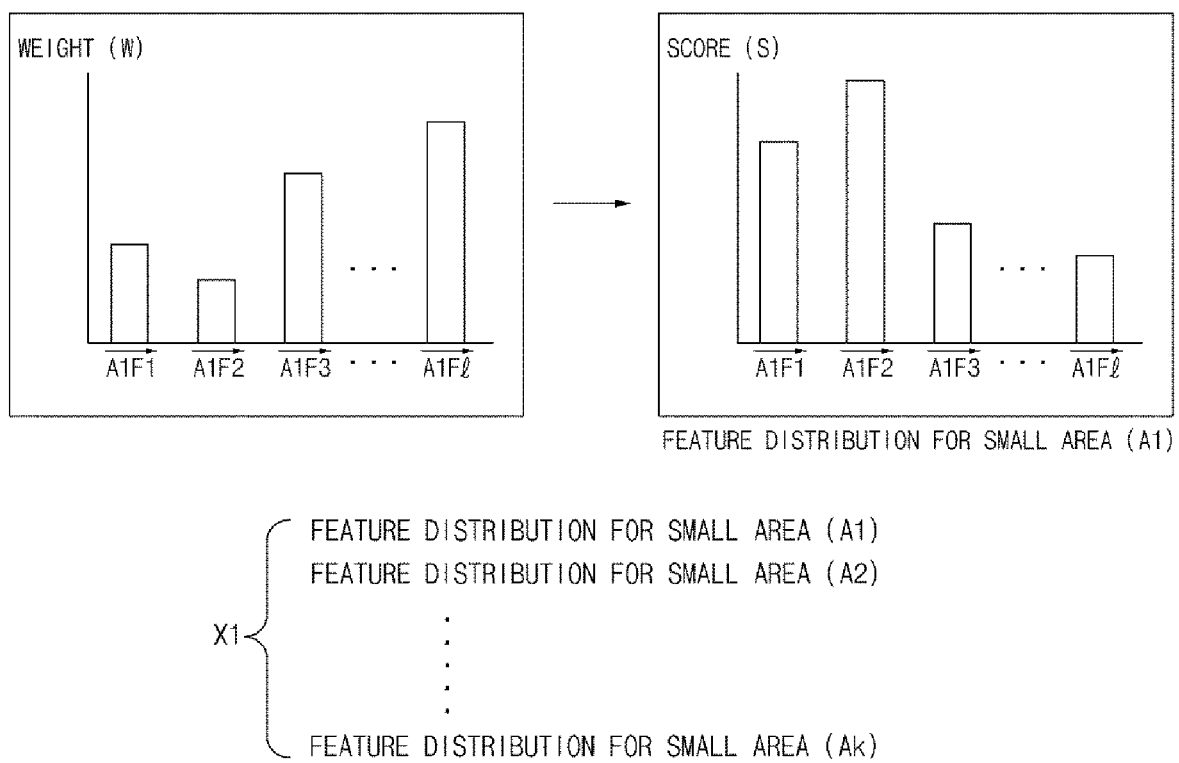
FIG. 25 illustrates a histogram of a small area A1 with a score S, which is decreased as the number w of the label descriptors $\overrightarrow{A1F1}$, $\overrightarrow{A1F2}$, $\overrightarrow{A1F3}$, . . . , $\overrightarrow{A1Fl}$ shown in FIG. 24 is increased, and visually shows a feature distribution of a small area A1.

Referring to FIG. 25, types of label descriptors converted by the predetermined classification rule and the predetermined label rule, and the number (weight w) of label descriptors per type are converted into data with respect to each small area. For example, the small area feature distribution for each small area (e.g., A1) may be generated based on the types of label descriptors and the number (w) of label descriptor per type. Using all acquisition images acquired in a small area, the types of all label descriptors in the area and the number (w) of label descriptors per type may be calculated. A small area feature distribution may be represented as a small area feature distribution histogram, in which label descriptor types are regarded representative values (values on the horizontal axis) and scores s calculated based on the number (weight w) of label descriptors per type are regarded frequency (values on the vertical axis).

A score s may be increased as the weight w of label descriptors per type is increased. For example, a score S1 of a label descriptor $\overrightarrow{A1F1}$ may be defined to be proportional to a value obtained by dividing a weight w1 of the label descriptor $\overrightarrow{A1F1}$ by the number of all label descriptors generated in a corresponding small area A1 (a total weight w of the corresponding small area), and this may be represented as in Equation 3 as below.

$$s1 = \frac{w1}{\Sigma w} \times IDF1 \qquad \text{Equation 3}$$

Here, s1 is a score of a label descriptor $\overrightarrow{A1F1}$ in a corresponding small area feature distribution, wherein, w1 is a weight of the label descriptor $\overrightarrow{A1F1}$, and wherein, Σw is a total sum of all label descriptors generated in the corresponding small area A1.

IDF1 is a value obtained by dividing "a total number of images" in the corresponding small area A1 by "the number of images where the label descriptor $\overrightarrow{A1F1}$ is generated".

A small area histogram may be represented as a small area feature distribution vector, where each representative value (label descriptor) is regarded a dimension and a frequency (score s) of each representative value is regarded as a value of each dimension. Referring to FIG. 25, small area feature distribution vectors respectively corresponding to a plurality of small areas A1, A2, . . . , Ak on a map may be generated. (k is a natural number)

A feature distribution vector corresponding to each small area on the map may be learned by learning module 143, as described above, or may be stored in a manner in which external data is input to the moving robot 100.

In the first embodiment, when the current position of the moving robot 100 becomes unknown due to occurrence of a position jumping event, a process of estimating a small area, in which the current position is included, based on data such as a pre-stored feature distribution vector corresponding to each small area is described as follows.

Referring to FIG. 28, the moving robot 100 acquires an acquisition image at an unknown current position Pu (an actual position) through the image acquisition unit 120. The recognition module 144 extracts at least one recognition feature from the image acquired at the unknown current position Pu. The drawing in FIG. 28 illustrates an image captured at the unknown position, and a plurality of recognition features h1, h2, h3, h4, h5, h6, and h7 located at a ceiling are found in the image.

Referring to FIG. 28, the recognition module 144 generates recognition descriptors respectively corresponding to the recognition features h1, h2, h3, h4, h5, h6, and h7. The recognition descriptors may be represented as an n-dimensional vector. In FIG. 28, $\overrightarrow{H1}, \overrightarrow{H2}, \overrightarrow{H3}, \ldots, \overrightarrow{H7}$ indicate n-dimensional vectors. h1(1), h1(2), h1(3), . . . , h1(n) in the brace { } of $\overrightarrow{H1}$ indicate values of respective dimensions of $\overrightarrow{H1}$.

The recognition module 144 computes the respective small area feature distributions and the respective recognition descriptors according to a predetermined estimation rule to select a small area in which the current position is included.

Throughout this description, the term "compute" means calculating an input value (one input value or a plurality of input values) by a predetermined rule. For example, when calculation is performed by the predetermined estimation rule by regarding the small feature distributions and/or the recognition descriptors as two input values, this may be expressed such that the small area feature distributions and/or recognition descriptors are "computed".

The predetermined estimation rule includes a predetermined conversion rule for generating a recognition feature distribution, which is comparable with the small feature distribution, based on the at least one recognition descriptor.

Throughout this description, the term "comparable" means a state in which a predetermined rule for comparison with any one subject is applicable. For example, in the case where there are two sets consisting of objects with a variety of colors, when colors of objects in one of the two sets are classified by a color classification standard of the other set in order to compare the number of each color, it may be expressed that the two sets are "comparable". In another example, in the case where there are two sets having different types and numbers of n-dimensional vectors, when n-dimensional vectors of one of the two sets are converted into n-dimensional vectors of the other sets in order to compare the number of each n-dimensional vector, it may be expressed that the two sets are "comparable".

Figure 31:
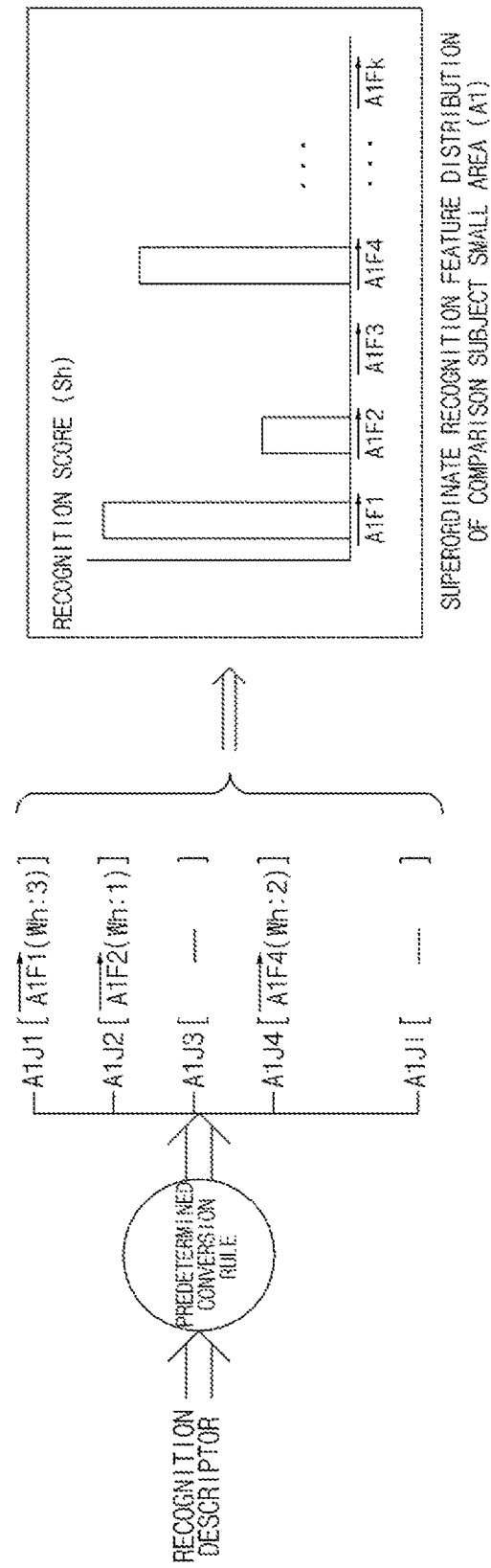
FIG. 31 is a conceptual diagram illustrating how to convert a plurality of recognition descriptor generated in FIG. 28 into label descriptors $\overrightarrow{A1F1}, \overrightarrow{A1F2}, \ldots, \overrightarrow{A1Fl}$ of a comparison subject small area A1 by a predetermined conversion rule to generate a recognition feature distribution of the comparison subject small area A1. In order to visually show the recognition feature distribution, a histogram having a recognition score Sh, which is increased as the number wh of label descriptors is increased, is illustrated.

Referring to FIG. 31, based on information on at least one recognition descriptor acquired from the acquisition image acquired at the unknown current position Pu, the recognition module 144 converts performs conversion by a predetermined conversion rule into information (a recognition feature distribution) comparable with information on a comparison subject small area (e.g., each small area feature distribution). For example, by the predetermined conversion rule, based on at least one recognition descriptor, the recognition module 144 may generate a recognition feature distribution vector that is comparable with the feature distribution vector of each small area. With respect to each comparison subject small area, recognition descriptors are converted into closest small area label descriptors through the predetermined conversion rule.

In one embodiment, with reference to each dimension (each small area label descriptor) of the small area feature distribution vector of any one small area A1 which is a comparison subject, at least one recognition descriptor may be converted into a small area label descriptor having a distance between vectors according to a predetermined conversion rule. For example, $\overrightarrow{H5}$ and $\overrightarrow{H1}$ among $\overrightarrow{H1}, \overrightarrow{H2}, \overrightarrow{H3}, \ldots, \overrightarrow{H7}$ may be converted into $\overrightarrow{A1F4}$ which is a small area label descriptor having the shortest distance among small area label descriptors $\overrightarrow{A1F1}, \overrightarrow{A1F2}, \overrightarrow{A1F3}, \ldots, \overrightarrow{A1Fl}$ constituting a feature distribution of the small area A1. (see FIG. 31)

Furthermore, when a distance between a recognition descriptor and a label descriptor closest to the recognition descriptor in the predetermined conversion rule exceeds a predetermined value, conversion may be performed based on information on remaining recognition descriptors except the corresponding recognition descriptor.

When it comes to comparison with a comparison subject small area A1, a recognition feature distribution for the comparison subject small area may be defined based on types of the converted label descriptors and the number (a recognition weight wh) of label descriptors per type. The recognition feature distribution for the comparison subject small area may be represented as a recognition histogram, where a type of each converted label descriptor is regarded a representative value (a value on the horizontal axis) and a recognition score sh calculated based on the number of label descriptors per type is regarded as a frequency (a value on the vertical axis). (see FIG. 31)

The recognition score sh may be increased as the number (a recognition weight wh) of label descriptors per type is increased. For example, a score sh1 of any one converted label descriptor may be defined as being proportional to a value obtained by dividing the weight wh1 of the any one converted label descriptor by the number (a total recognition weight wh) of all label descriptors converted from recognition descriptors, and this may be represented as in Equation 4 as below.

$$sh1 = \frac{wh1}{\Sigma wh} \times IDF1 \qquad \text{Equation 4}$$

Here, sh1 is a recognition score of any one label descriptor $\overrightarrow{A1F1}$ which is generated based on an acquisition image acquired at an unknown current position, and which is converted, wh1 is a recognition weight of the any one converted label descriptor $\overrightarrow{A1F1}$, and Σwh is a total number of label descriptors which are generated based on the acquisition image acquired at the unknown position, and which are converted.

IDF1 is a value obtained by the "total number of images" in the comparison subject small area A1 by the number of images in which the label descriptor $\overrightarrow{A1F1}$ is generated.

The above Equation 3 and Equation 4 enables more precise estimation of a current position by assigning a higher recognition score sh in proportion of the number of label descriptors generated and converted based on recognition features at an unknown position, by assigning a higher score S in proportion to the number of label descriptors generated based on features in an area subject to comparison, and by assigning a higher score S and/or recognition score sh to a label descriptor calculated based on a rare image in an area subject to comparison.

A histogram about a position comparable with an unknown current position may be expressed as a recognition feature distribution vector, where each representative value (converted label descriptor) is regarded as each dimension and a frequency of each representative value (recognition score sh) is regarded as a value of each dimension. Using this, it is possible to generate a comparable recognition feature distribution vector for each comparison subject small area.

Next, a feature distribution of each small area and a recognition feature distribution of each comparison subject small areas are compared and similarities therebetween are calculated to select a small area in which an unknown current position is included. (S250)

Throughout this description, the term "select" means selecting any one, not by a human, but using a predetermined rule by a controller of the present invention or by a program which implements the control method of the present invention. The meaning of "selection" is a concept including not just selecting any one of a plurality of subjects, but also selecting only one subject which exists alone.

Figure 32:
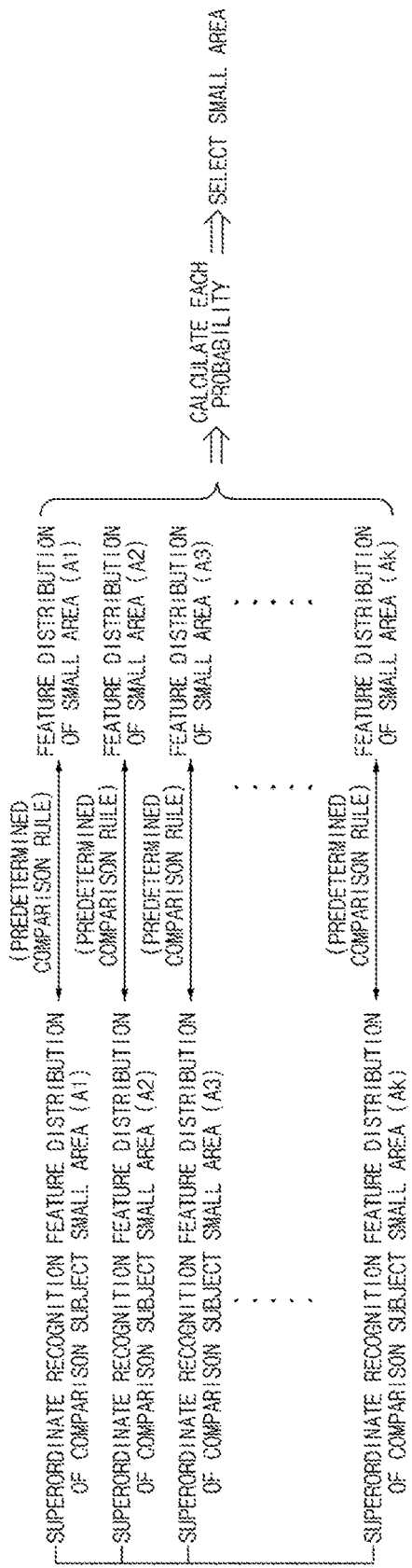
FIG. 32 is a conceptual diagram illustrating how to compare each recognition feature distribution of each small area, generated through the process shown in FIG. 31, and each small area feature distribution by a predetermined comparison rule to calculate a probability, and select any one small area.

The predetermined estimation rule includes a predetermined comparison rule for comparing the respective small area feature distributions with the respective recognition feature distributions to calculate similarities therebetween. Referring to FIG. 32, the respective small area feature distributions may be compared with the respective recognition feature distributions according to the predetermined comparison rule and similarities therebetween may be calculated. For example, a similarity between any one small area feature distribution vector and a corresponding recognition feature distribution vector (which means a recognition feature distribution vector converted to be comparable by a predetermined conversion rule according to a small area subject to comparison) may be defined as in Equation 5 as below. (cosine similarity)

$$\cos \theta = \frac{\vec{X} \cdot \vec{Y}}{|\vec{X}| \times |\vec{Y}|} \qquad \text{Equation 5}$$

Here, cos θ is a probability indicative of a similarity, $\vec{X}$ is a small area feature distribution vector, $\vec{Y}$ is a recognition feature distribution vector comparable with $\vec{X}$, $|\vec{X}| \times |\vec{Y}|$ indicates multiplication of absolute values of the two vectors, and $\vec{X} \cdot \vec{Y}$ indicates an inner product of two vectors.

A similarity (probability) for each small area subject to comparison may be calculated, and a small area for which the highest probability is calculated may be selected as a small area in which the current position is included.

The recognition module 144 may select the current position from among a plurality positions included in the selected small area.

Referring to FIGS. 15 to 18B and 21 to 32, a second embodiment in which a travel area X is separated into a plurality of large areas X1, X2, to learn a map or recognize a current position will be described as follows.

The area separation module 142 may separate the travel area X into the plurality of small areas according to a predetermined criterion. The description thereof is replaced with the description about the first embodiment.

The area separation module 142 may separate the travel area X into a plurality of large areas which are separated from each other by a traveling capability according to a predetermined criterion. The area separation module 142 may separate the travel area X into a plurality of large areas by grouping the plurality of small areas according a predetermined criterion.

Two indoor spaces totally separate by a moving path may be separated into two individual large areas.

In one example referring to FIG. 18A, even in the same indoor space, the large areas may be separated on the basis of each floor in the travel area X. A plurality of large areas X1, X2, and X3 may be separated on the basis of each floor in the travel area X.

In another example referring to FIG. 18B, even in the same plane, the large areas may be separated on the basis of indoor spaces separated by a moving path in the travel area X. A plurality of large areas X1, X2, and X3 may be separated on the basis of each buildings in the travel area X.

Referring to FIG. 19, the travel area X is comprised of a plurality of large areas X1, X2, and X3, and each of the large areas X1, X2, and X3 is comprised of a plurality of small areas that constitute a corresponding large area. Each small area A1 to A5, B1 to B5, and C1 to C6 is comprised of a plurality of positions (nodes) that constitutes a corresponding small area.

Referring to FIGS. 20 to 25, description about a process of acquiring an acquisition image at an actual position, generating a descriptor, and generating a small area feature distribution of each small area according to a predetermined learning rule (a predetermined classification rule and a predetermined label rule) is replaced with the description about the first embodiment.

In addition, a process of processing information classified for each small area is as follows:

Referring to FIGS. 22, 23, 26, and 27, the learning module 143 generates the large area feature distribution for each large area according to a predetermined superordinate learning rule. A large area feature distribution may be generate based on a small area label descriptor.

The predetermined superordinate learning rule may include a predetermined classification rule for classifying the plurality of small area label descriptors into a plurality of groups, and a predetermined superordinate label rule for converting the small label descriptors in the same group into a large area label descriptor.

The learning module 143 may classify all small area label descriptors in each large area into a plurality of groups according to a predetermined superordinate classification rule.

FIG. 23 illustrates a process (S156) of dividing all small label descriptors in any one large area X11 into a plurality of groups according to a predetermined superordinate classification rule. In FIG. 23, a tree structure illustrated with dots and lines each branched into two parts are the same as described above. In the tree structure of the above process (S156), one doe divided downward into two dots represents a "process of dividing a plurality of small label descriptors into two groups" (a large area dividing process). Dots X1G1 to X1G53, which constitute the lower ends in the tree structure of the above process (S156), represent groups into which a plurality of small area label descriptors are divided according to a predetermined superordinate classification rule.

A process of dividing a plurality of small label descriptors in a large area into a plurality of groups by a predetermined superordinate classification rule according to one embodiment includes the large area dividing process. In the large area dividing process, a plurality of small area label descriptors to be divided is defined as a "large area head group", and two groups branched into two parts are defined as "large area branch groups". The two large area branch groups generated in a process of dividing any one large area may each become the large area head group in the next large area dividing process. In this embodiment, it is described that one large area head group is divided into two large area branch groups through one round of the large area dividing process, but it is also possible that one large area head group is divided into three or more large area branch groups through one round of the large area dividing process.

In the large area dividing process, a large area head group is divided into g1 number of large area branch groups based on distance between a plurality of small area label descriptors in the large area head group. (Here, g1 is a natural number equal to or greater than 2) Hereinafter, one round of the large area dividing process will be described in more detail. The large area dividing process includes a first large area temporary process which is conducted as follows: the g1 number of small area label descriptors is randomly selected from the plurality of small area label descriptors in the large area head group; remaining small label descriptors not selected in the large area head group are grouped with a small label descriptor at the shortest distance from among the g1 number of selected small area label descriptor to form g1 number of "first large area temporary groups". The large area dividing process includes a second large area temporary process which is conducted as follows: after the first large area temporary process, a first average value of small area label descriptors in each first large area temporary group is calculated, and, when it is assumed that all small area label descriptors in a large area head group are matched with a value at the shortest distance among g1 number of first average values, small area label descriptors matched with the same first average value are grouped to thereby generate g1 number of "secondary large area temporary groups". The large area dividing process may include first to mth large area temporary processes. (Here, m is a natural number equal to or greater than 2) The large area dividing process may include a mth large area temporary process which is conducted as follows: after the m−1th large area temporary process, a m−1th average value of small label descriptors in each m−1th large area temporary group, and, when it is assumed that all small area label descriptors in a large area head group is matched with a value at the shortest distance among g1 number of m−1th average values, descriptors matched with the same m−1th average value are grouped to thereby generate g1 number of "second large area temporary groups". As the large area temporary processes is performed repeatedly from the first round to mth round, the g1 number of mth large area temporary groups generated after the mth large area temporary process becomes the g1 number of large area branch groups.

The predetermined superordinate classification rule according to one embodiment includes a "basic rule" for repeatedly performing the large dividing process g2 number of times with respect to a plurality small area label descriptors in a large area, and an "exception rule" for, when the number of types of small area label descriptors in a large area branch group is equal to or smaller than g3, stopping a large area dividing process from being performed on the corresponding large area branch group. (Here, g2 and g3 are natural numbers, respectively.) For example, the predetermined superordinate classification rule includes a basic rule of g2=14, and an exception rule g3=1. According to the basic rule, two large area branch groups may be generated through a large area dividing process performed on a large area head group, and the large area dividing process may be performed repeatedly on each of the generated large area branch groups as a large area head group. When the number of types of small area label descriptors in a large area branch group is equal to or smaller than g3, the large area dividing process is no longer performed on the large area branch group as a large area head group according to an exception rule, regardless of the basic rule.

In FIG. 23, by the predetermined superordinate classification rule according to one embodiment, a plurality of small area label descriptors in a large area X1 is divided into a plurality of groups X1G1 to X1G53.

Although not illustrated in the drawing, a predetermined superordinate classification rule according to another embodiment includes a rule for classifying small area label descriptors with a distance between two small area label descriptors which is equal to and smaller than a predetermined value ST2. Equation 6, by which two small area label descriptor (n-dimensional vectors $\vec{A}$, $\vec{B}$ are classified as the same group, may be defined as below.

$$d=|\vec{A}-\vec{B}|\leq ST2 \qquad \text{Equation 6}$$

Here, $\vec{A}$, $\vec{B}$ are two n-dimensional vectors,
wherein d is a distance between the two n-dimensional vectors, and
Wherein ST2 is a predetermined value.

Figure 26:
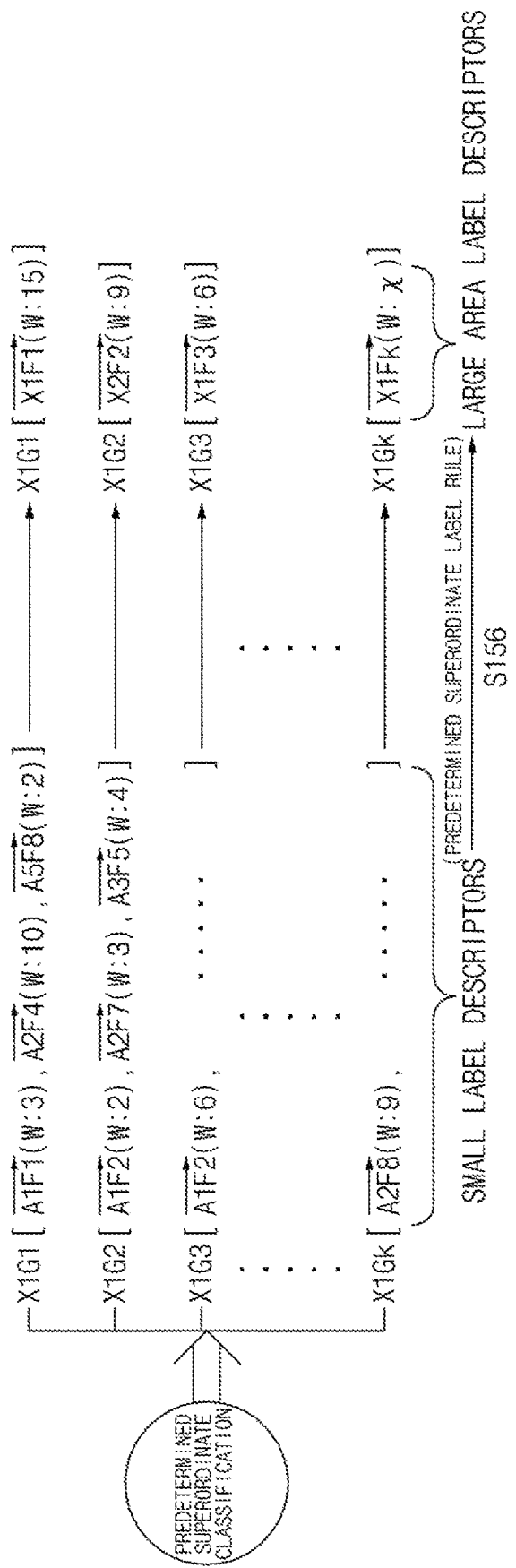
FIG. 26 illustrates hot to classify a plurality of label descriptors $\overrightarrow{A1F1}$, $\overrightarrow{A2F4}$, $\overrightarrow{A5F8}$, $\overrightarrow{A1F2}$, . . . , generated in a large area X1 through a predetermined process, into a plurality of groups by a predetermined superordinate classification rule, and convert a plurality of label descriptors in the same group into large label descriptors $\overrightarrow{X1F1}$, $\overrightarrow{X1F2}$, $\overrightarrow{X1F3}$, . . . , $\overrightarrow{X1Fk}$ by a predetermined superordinate label rule.

In FIG. 26, X1G1, X1G2, X1G3, . . . , and X1Gk shows each group classified by the predetermined superordinate classification rule from all the small area label descriptors in the large area X1. At least one small area label descriptor classified into the same group is shown in the square bracket [ ], and the number (weight w) of small area label descriptors is shown in the parenthesis ( ) on the right side of each small area label descriptor. For example, small area label descriptors classified into a group X1G1 are three number (w:3) of $\overrightarrow{A1F1}$, ten number (w:10) of $\overrightarrow{A2F4}$, and two number (w:2) of $\overrightarrow{A5F8}$, wherein $\overrightarrow{A1F1}$ indicates one of small area label descriptors in a small area A1, $\overrightarrow{A2F4}$ indicates one of small area label descriptors in a small area A2, and $\overrightarrow{A5F8}$ indicates one of small area label descriptors in a small area A5. The remaining X1G2, X1G3, . . . , and X1Gk are expressed in the same way and thus a detailed description thereof is herein omitted.

Referring to FIG. 26, the learning module 143 converts label descriptors included in the same group by the predetermined superordinate label rule into a large area label descriptor. In FIG. 26, $\overrightarrow{X1F1}$, $\overrightarrow{X1F2}$, $\overrightarrow{X1F3}$, . . . , $\overrightarrow{X1Fk}$ are large area label descriptors converted by the predetermined superordinate classification rule. A plurality of label descriptors included in the same group is not converted into the same large area label descriptor. For example, label descriptors included in a group X1G1, that is, three number (w:3) of $\overrightarrow{A1F1}$, ten number (w:10) of $\overrightarrow{A2F4}$, and two number (w:2) of $\overrightarrow{A5F8}$ are converted by the predetermined superordinate label rule into fifteen (w:15) $\overrightarrow{X1F1}$ which is a large area label descriptor. Conversion of descriptors included in the remaining X1G2, X1G3, . . . , and X1Gk are performed in the same way as above, and thus a detailed description thereof is herein omitted.

FIG. 23 illustrates a process (S156) for generating a weight wa+wb of large area label descriptors $\overrightarrow{X1F4}$ large based on a plurality of small label descriptors (a weight wa of $\overrightarrow{(A1F3)}$ and a weight wb of $\overrightarrow{A1F5}$ by a predetermined superordinate label rule according to one embodiment. (Here, wa and wb are natural numbers, respectively.)

The predetermined superordinate label rule may be based on an average value of at least one small area label descriptor (an n-dimensional vector) classified into the same group. For example, when it is assumed that small area label descriptors (n-dimensional vectors) classified into a group are $\overrightarrow{X1}$, $\overrightarrow{X2}$, $\overrightarrow{X3}$, . . . , $\overrightarrow{Xx}$, wherein x indicates the number (a total sum of weights) of small area label descriptors classified into the group, a large area label descriptor (an n-dimensional vector) $\vec{X}$ may be defined as in Equation 7 as below.

$$\vec{X} = \frac{\overrightarrow{X1}+\overrightarrow{X2}+\overrightarrow{X3}+\cdots+\overrightarrow{Xx}}{x} \qquad \text{Equation 7}$$

Types of large area label descriptors converted by the predetermined superordinate classification rule and the predetermined superordinate label rule, and the number (weight w) of large area label descriptors per type are converted into data on a per large area basis. For example, the large area feature distribution for each large area (e.g., X1) may be generated based on the types of the large area label descriptor and the number (w) of large area label descriptor per type. Using feature distribution data on small areas included in a large area, the types of all large area label descriptors in the large area and the number (w) of large area label descriptors per type may be calculated. A large area feature distribution may be represented as a large area feature distribution histogram, in which large area label descriptor types are regarded representative values (values on the horizontal axis) and scores s calculated based on the number (weight w) of large area label descriptors per type are regarded frequency (values on the vertical axis). (see FIG. 27)

A score S may be increased as the weight w of label descriptors per type is increased. For example, a score S2 of a large area label descriptor $\overrightarrow{X1F1}$ may be defined to be proportional to a value obtained by dividing a weight w2 of the large area label descriptor $\overrightarrow{X1F1}$ by the number of all large area label descriptors calculated from a corresponding large area X1 (a total weight w of the corresponding large area), and this may be represented as in Equation 8 as below.

$$s2 = \frac{w2}{\Sigma w} \times IDF2 \qquad \text{Equation 8}$$

Here, s2 is a score of the large area label descriptor $\overrightarrow{X1F1}$ of the large area in a corresponding large area feature distribution,
wherein w2 is a weight of the large area label descriptor, and
wherein $\Sigma w$ is a total sum of weights of all large area label descriptors generated in the corresponding large area X1.

IDF2 is a value obtained by dividing the "total number of images" in the large area X1 by the "number of images from which the large area label descriptor $\overrightarrow{X1F1}$" is generated.

Figure 27:
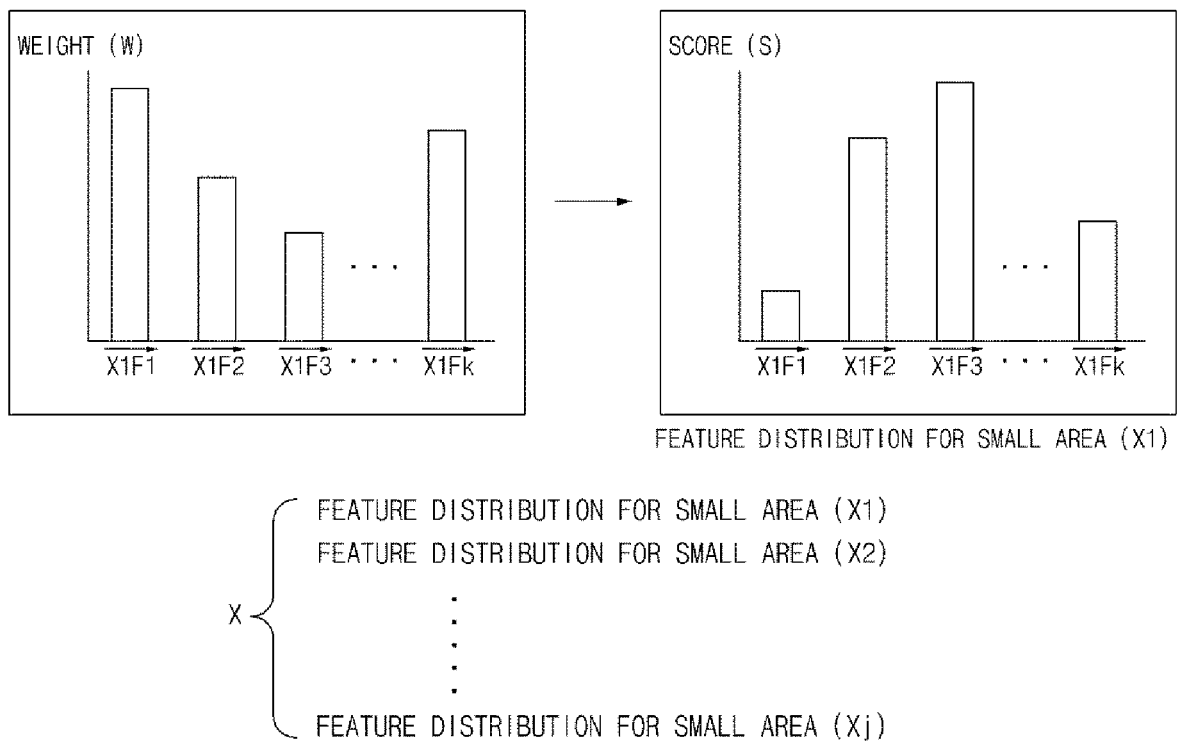
FIG. 27 illustrates a histogram of a large area X1 with a score S, which is decreased as the number w of large area label descriptors $\overrightarrow{X1F1}$, $\overrightarrow{X1F2}$, $\overrightarrow{X1F3}$, . . . , $\overrightarrow{X1Fk}$ shown in FIG. 26 is increased, and visually shows a feature distribution of the large area X1.

A large area histogram may be represented as a large area feature distribution vector, where each representative value (label descriptor) is regarded a dimension and a frequency (score s) of each representative value is regarded as a value of each dimension. Referring to FIG. 27, large area feature distribution vectors respectively corresponding to a plurality of large areas X1, X2, . . . , Xj on a map may be generated. (j is a natural number)

A feature distribution vector of each large area on the map may be learned by the learning module 143, as described above, or may be stored in a manner in which external data is input to the moving robot 100.

In the second embodiment, when the current position of the moving robot 100 becomes unknown due to occurrence of a position jumping event, a process of estimating a large area, in which the current position is included, based on data such as a pre-stored feature distribution vector corresponding to each large area is described as follows.

Referring to FIG. 28, description about a process in which the moving robot 100 acquires an acquisition image at the unknown current position thereof and generates recognition descriptors respectively corresponding to recognition features h1, h2, h3, h4, h5, h6, and h7 is replaced with the description about the first embodiment.

The recognition module 144 computes the respective large area feature distributions and the respective recognition descriptors according to a predetermined estimation rule to select a large area in which the current position is included. The recognition module 144 computes the feature distribution of each small area among a plurality of small areas in the selected large area and the recognition descriptor by the predetermined estimation rule, so as to select a small area in which the current position is included. In another example, the recognition module 144 may immediately select a position in which the current position is included among a plurality of positions in the large area.

The predetermined superordinate estimation rule includes a predetermined superordinate conversion rule for generating a superordinate recognition feature distribution, which is comparable with the feature distribution of the large area, based on the at least one recognition descriptor.

Figure 29:
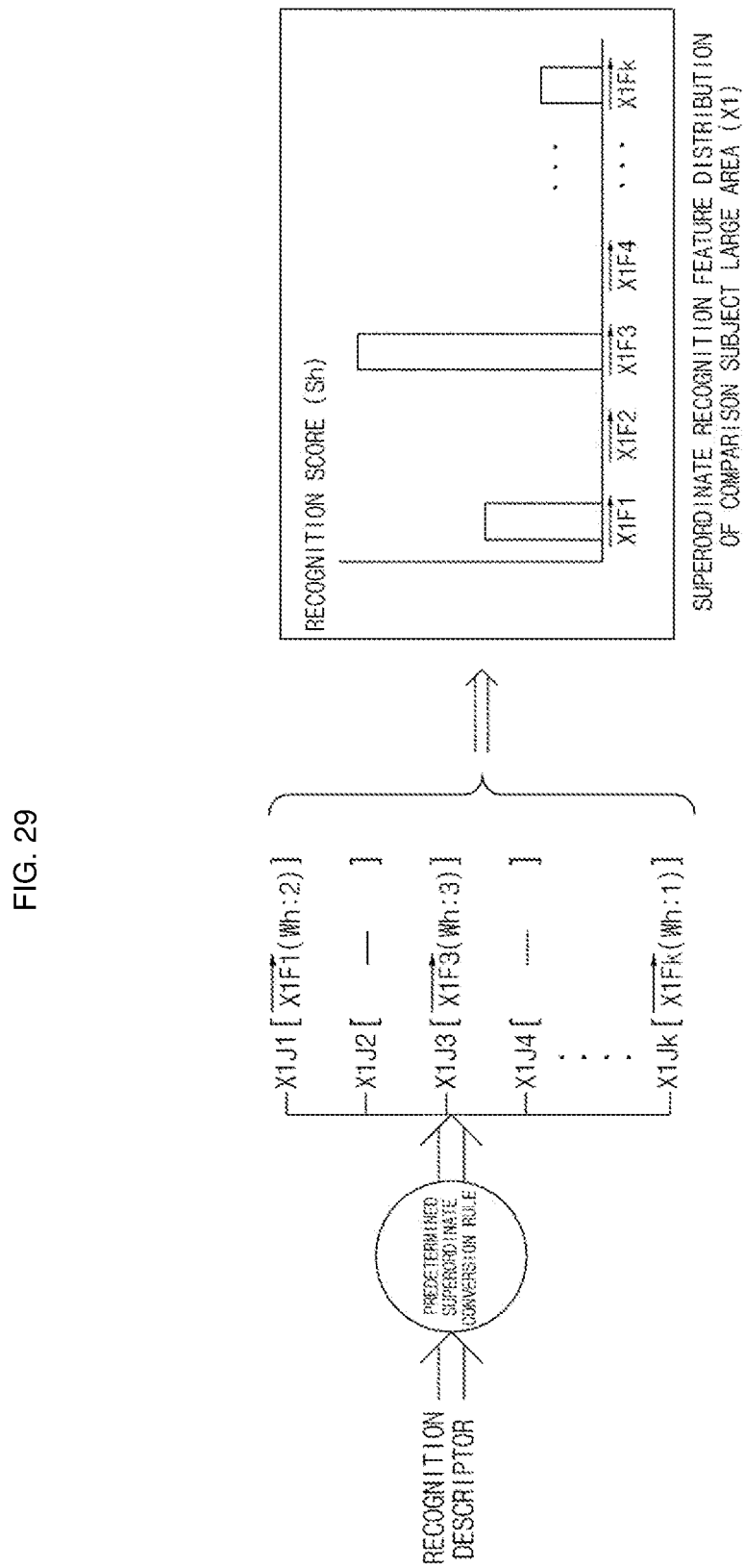
FIG. 29 is a conceptual diagram illustrating how to generate a superordinate recognition feature distribution of a comparison subject large area X by converting a plurality of recognition descriptor generated in FIG. 28 into large area label descriptors $\overrightarrow{X1F1}, \overrightarrow{X1F2}, \ldots, \overrightarrow{X1Fk}$ of the comparison subject large area X1 by a predetermined superordinate conversion rule. In order to visually show the superordinate feature distribution, a histogram having a recognition score Sh, which is increased as the number wh of large area label descriptors is increased, is illustrated.

Referring to FIG. 29, based on information on at least one recognition descriptor acquired from an acquisition image acquired at an unknown current position Pu, the recognition module 144 performs conversion by the predetermined superordinate conversion rule into information (superordinate recognition feature distribution) that is comparable with information on a comparison subject large area (e.g., a feature distribution of each large area). For example, by a predetermined superordinate conversion rule, a superordinate recognition feature distribution vector comparable with each large region feature distribution vector may be generated based on the at least one recognition descriptor. Recognition descriptors for each comparison subject large area are converted into closest large area descriptors through the predetermined superordinate conversion rule.

In one embodiment, with respect to each dimension (a label descriptor of each large area) of the large area feature distribution vector of a large area X1 subject to comparison, at least one recognition descriptor may be converted by the predetermined superordinate conversion rule into a large area label descriptor with the shortest distance between vectors. For example, $\vec{H1}$ and $\vec{H5}$ among $\vec{H1}, \vec{H2}, \vec{H3}, \ldots,$ $\vec{H7}$ may be converted into any one of large label descriptors constituting a large area feature distribution.

Furthermore, in the predetermined superordinate conversion rule, when a distance between a recognition descriptor and a large area label descriptor closest to the recognition descriptor exceeds a predetermined value, conversion may be performed based on information on recognition descriptors except the corresponding recognition descriptor.

When it comes to comparison with one large area X1 subject to comparison, a superordinate recognition feature distribution for the large area subject to comparison may be defined based on types of the converted large area label descriptors and the number of large area label descriptors per type. The recognition feature distribution for the large area subject to comparison may be represented as a superordinate recognition histogram, where a type of each converted large area label descriptor is regarded a representative value (a value on the horizontal axis) and a recognition score sh calculated based on the number of large area label descriptors per type is regarded as a frequency (a value on the vertical axis). (see FIG. 29)

The recognition score sh may be increased as the number (a recognition weight wh) of label descriptors per type is increased. For example, a score sh2 of any one converted large area label descriptor may be defined as being proportional to a value obtained by dividing the weight wh2 of the converted large area label descriptor by the number (a total recognition weight wh) of all large area label descriptors converted from recognition descriptors, and this may be represented as in Equation 4 as below.

$$sh2 = \frac{wh2}{\Sigma wh} \times IDF2 \qquad \text{Equation 9}$$

Here, sh2 is a recognition score of a large area label descriptor $\vec{X1F1}$ generated and converted based on an acquisition image acquired at an unknown current position, where wh2 is a recognition weight of the converted large area label descriptor $\vec{X1F1}$; and where Σwh is a total sum of recognition weights of large area label descriptors generated and converted from the acquisition image acquired at the unknown current position.

IDF2 is a value obtained by dividing the "total number of images" in the large area subject to comparison by the "number of images from which the large area label descriptor $\vec{X1F1}$" is generated.

The above Equation 8 and Equation 9 enable more precise estimation of a current position by assigning a higher recognition score sh in proportion of the number of large area label descriptors generated and converted based on recognition features at an unknown position, by assigning a higher score S in proportion to the number of large area label descriptors generated based on features in a comparison subject large area, and by assigning a higher score S and/or recognition score sh to a large area label descriptor calculated based on a rare image in the comparison subject large area.

A histogram about a position comparable with an unknown current position may be expressed as a recognition feature distribution vector, where each representative value (a converted large area label descriptor) is regarded as each dimension and a frequency of each representative value (recognition score sh) is regarded as a value of each dimension. Using this, it is possible to generate a comparable superordinate recognition feature distribution vector for each comparison subject large area.

Next, a feature distribution of each large area and a recognition feature distribution of a large area subject to comparison are compared and similarities therebetween are calculated to select a large area in which an unknown current position is included. (S256)

Figure 30:
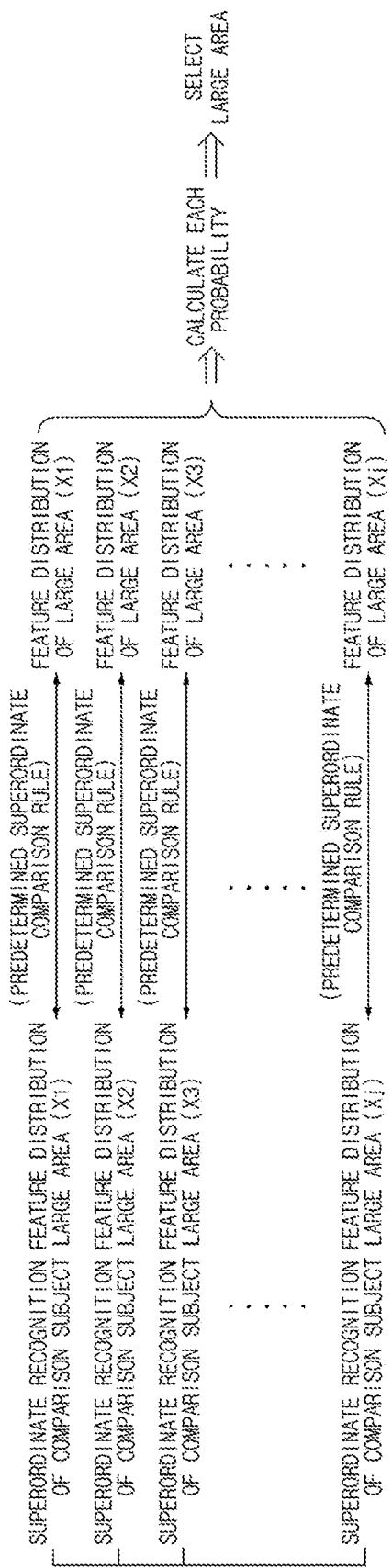
FIG. 30 is a conceptual diagram illustrating how to compare each superordinate recognition feature distribution of each large area, generated through a process shown in FIG. 29, and each large area feature distribution by a predetermined superordinate comparison rule to calculate a probability, and select any one large area.

The predetermined superordinate estimation rule includes a predetermined superordinate comparison rule for calculating a similarity by comparing the feature distribution of each large area and the superordinate recognition feature distribution. Referring to FIG. 30, by the predetermined superordinate comparison rule, a similarity may be calculated by comparing a feature distribution of each large area and a corresponding superordinate recognition feature distribution. For example, a similarity between the feature distribution vector of a large area and a corresponding superordinate recognition feature distribution vector (which means a superordinate recognition feature distribution vector converted by the predetermined superordinate conversion rule to be comparable with a large area subject to comparison) may be defined as in Equation 10 as below. (cosine similarity)

$$\cos\theta = \frac{\vec{X}\cdot\vec{Y}}{|\vec{X}|\times|\vec{Y}|} \qquad \text{Equation 10}$$

Here, cos θ is a probability indicative of a similarity, where $\vec{X}$ is a feature distribution vector of the large area, $\vec{Y}$ is a superordinate recognition feature distribution vector comparable with $\vec{X}$, $|\vec{X}|\times|\vec{Y}|$ indicates multiplication of absolute values of the two vectors; and where $\vec{X}\cdot\vec{Y}$ indicates an inner product of two vectors.

A similarity (probability) for each large area subject to comparison may be calculated, and a large area for which the highest probability is calculated may be selected as a large area in which the current position is included.

The recognition module 144 may select one of small areas in the selected large area, and select the current position from among a plurality positions in the selected small area. In this case, description about a process for selecting one of the plurality of small areas in the selected large area is replaced about the description about the first embodiment which uses the predetermined estimation rule.

In another example, the recognition module 144 may select the current position from among a plurality of positions in the selected large area.

Referring to FIG. 13, the control method according to the first embodiment includes: a learning process (S100) for generating a map by learning a travel area, and a recognition process (S200) for selecting a current position on the map.

The learning process (S100) may include a small area separation process (S140, S140') for separating a travel area X into a plurality of small areas by a predetermined criterion.

The learning process (S100) includes a descriptor generation process (S120) for acquiring images at a plurality of positions in each small area, extracting features from the images, and generating descriptors respectively corresponding to the features. The descriptor generation process (S120) may be performed at the same time with the small area separation process (S140, S140').

The learning process (S100) includes, after the small area separation step (S140, S140') and the descriptor generation process (S120), a small area feature distribution generation process (S152) for generating a small area feature distribution for each small area based on a plurality of descriptors by the predetermined learning rule.

The recognition process (S200) includes a recognition descriptor generation process (S220) for acquiring an image at the current position, extracting at least one recognition feature from the acquired image, and generating a recognition descriptor corresponding to the recognition feature.

The recognition process (S200) includes, after the recognition descriptor generation process (S220), a small area selecting process (S250) for computing each small area feature distribution and a corresponding recognition descriptor by the predetermined estimation rule so as to select a small area in which the current position is included.

The recognition process may include, after the small area selecting process (S250), a position selecting process (S270) for selecting the current position from among a plurality of positions in the selected small area. In the position selecting process S270, one of a plurality of nodes on a map may be selected.

Figure 14A:
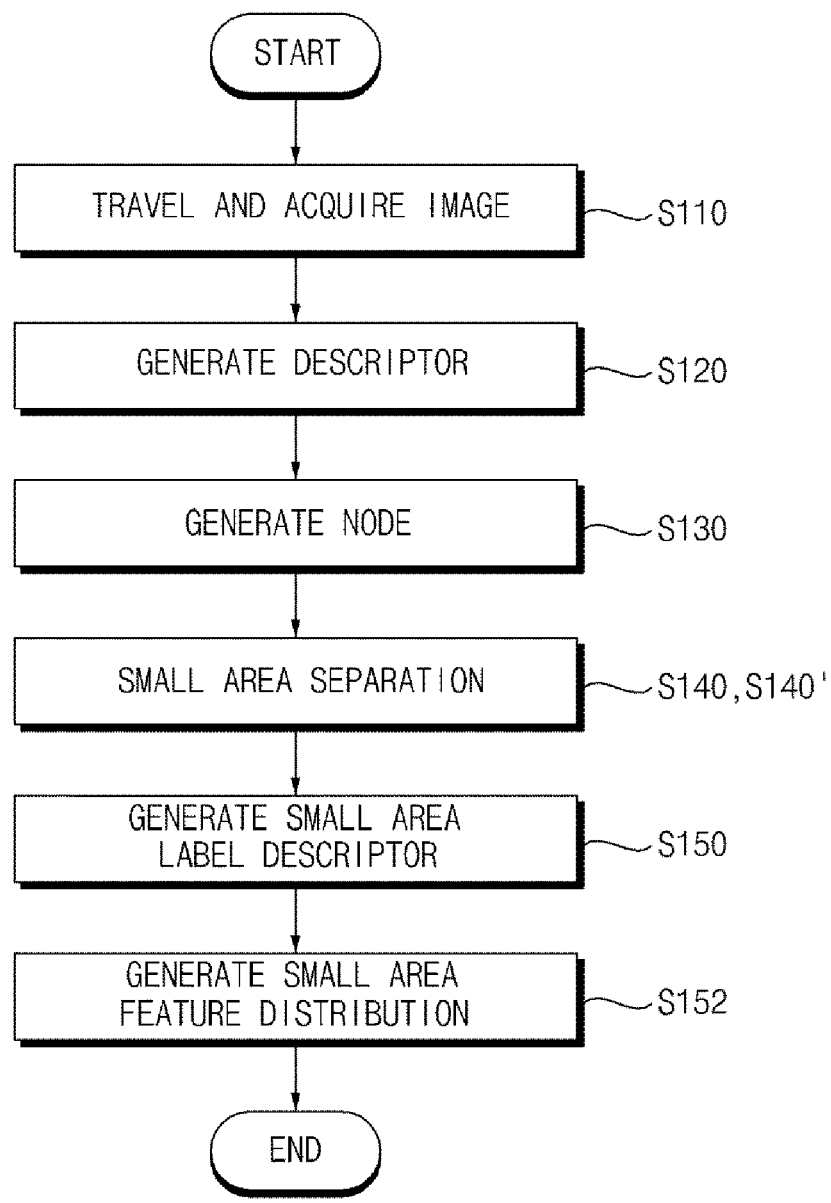
FIGS. 14A and 14B are flowchart illustrating a learning process (S100) and a position recognition process (S200) according to the first embodiment of FIG. 13.

Referring to FIG. 14, the learning process (S100) according to the first embodiment includes an initial learning process. The initial learning process includes: a process (S110) for traveling and acquiring an image, a process (S120) for generating a descriptor, and a process (S130) for generating a node.

The learning process (S100) includes the process (S110) for traveling and acquiring an image. In the process (S110), the moving robot 100 while moving acquires an image at each spaced point (an actual position). A different acquisition image corresponds to each point.

The learning process (S100) include the process (S120) for generating descriptors respectively corresponding to a plurality of features extracted from an acquired image. The plurality of descriptors corresponds one by one to the plurality features. The process (S120) may be performed in the middle of a process of moving to a next point after an image is acquired at one point. The process (S120) may be performed during the process (S110).

The learning process (S100) includes the process (S130) for generating nodes on a map. In the process (S130), a plurality of nodes is generated. Each node corresponds to coordinate information of a different point. Each node corresponds to an image acquired at a different point. Each image information corresponds to a different node. The plurality of node may correspond one by one to a plurality of acquisition images. The process (S130) may be performed during a process of moving from one point to a next point. The process (S130) may be performed during the process (S110) and/or the process (S120).

The learning process (S100) includes the process (S140, S140') for separating a travel area X into a small areas by a predetermined criterion. The process (S140, S140') may be referred to as a small area separation process (s140, S140'). The process (S140, S140') for separating a small area A1 is performed before the process (S150) for generating a small area label descriptor of the small area A1. The process (S140, S140') may be performed during the process (S130) for generating nodes. Some of the plurality of nodes may be grouped to be classified as one small area. The process (S140, S140') may be performed if the small area separation condition is satisfied as a new node is generated during the initial learning process.

The learning process (S100) includes a process (S150) for generating a small area label descriptor based on the plurality of descriptors. In the process (S150), a plurality of descriptors in each small area is classified into a plurality of groups. In the process (S150), the plurality of descriptors in each small area is classified into a plurality of groups by the predetermined classification rule. In the process (S150), a small area label descriptor representative of descriptors classified into the same group is generated. In the process (S150), a small area label descriptor is generated by the predetermined label rule based on the descriptors classified into the same group.

The learning process (S100) may further include a process (S152) for generating the small area feature distribution based on the plurality of small area label descriptors after the process (S150). It would be sufficient if the process S152 is performed at a time prior to a process (S240) for comparing a small area feature distribution of a small area subject to comparison and a corresponding recognition feature distribution.

Figure 14B:
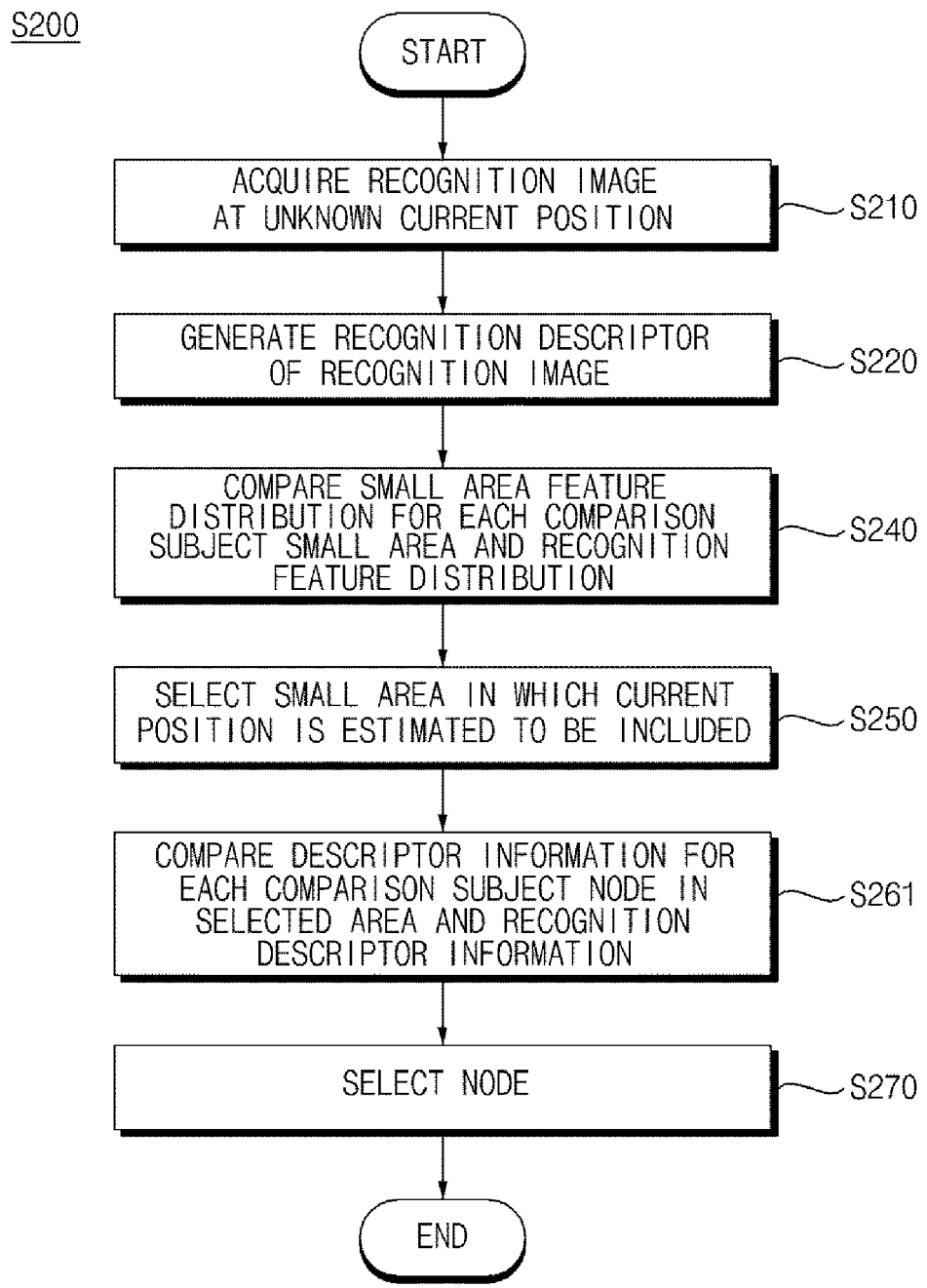

Referring to FIG. 14B, the recognition process (S200) according to the first embodiment includes a recognition image acquisition process (S210) in which the moving robot 100 acquires a recognition image at an unknown position. Here, the "recognition image" refers to an image acquired at the known current position.

The recognition process (S200) includes a process (S220) for generating recognition descriptors respectively corresponding to a plurality of recognition features extracted from a recognition image. The process (S220) may be performed after at least one recognition image is acquired at an unknown current position.

The recognition process (S200) includes, after the process (S220), a process (S240) for comparing a plurality of small area label descriptors in each small area subject to comparison and the plurality of recognition descriptors. In the process (S240), a small area feature distribution of a small area subject to comparison and a corresponding recognition feature distribution may be compared.

The recognition process (S200) includes a process (S250) for selecting a small area, in which the unknown current position is estimated to be included, from among a plurality of small areas. Through the comparison process (S240), a small area having the highest similarity is selected (S250).

The recognition process (S200) includes a process (S261) for comparing descriptor information of an image corresponding to each comparison subject node with recognition descriptor information corresponding to a recognition image. In the comparison process (S261), a comparison subject node is a plurality of nodes selected in the area selecting process (S250). For example, in the comparison process (S261), a plurality of label descriptors corresponding to each node and a plurality of label descriptors generated and converted based on the recognition image to thereby calculate a similarity between comparison subject nodes.

The recognition process (S200) includes a process (S270) for selecting a node, which is assumed to be the current position, from among one or more comparison subject nodes. In the process (S270), a node assumed to be the current position is selected. In the node selecting process (S270), a node having the highest similarity among comparison subject nodes may be selected.

Referring to FIG. 15, the control method according to the second embodiment includes a learning process (S100') for learning a travel area to generate a map, and a recognition process (S200') for selecting a current position on the map.

The learning process (S100') includes a small area separation process (S140, S140') for separating a travel area X into a plurality of small areas by a predetermined criterion, and a large area separation process (S146, S146') for separating the travel area X into a plurality of large areas, into which the plurality of small areas are grouped, by a predetermined criterion.

Here, a process including at least one of the small area separation process (S140, S140') or the large area separation process (S146, S146') may be referred to as a "area separation process". The small area separation process (S140, S140') or the large area separation process (S146, S146') may be performed at the same time, or any one thereof may be performed first.

The learning process (S100') includes a descriptor generation process (S120) for acquiring images at a plurality of positions in each large area, extracting features from the image, and generating descriptors respectively corresponding to the features. The description generation process (S120) may be performed at the same time with the area separation process (S140, S140', S146, S146').

The learning process (S100') may include, after the description generation process (S120), a small area feature distribution generation process (S152) for generating a small area feature distribution for each small area based on the plurality of descriptors.

The learning process (S100') further includes a large area feature distribution generation process (S157) for storing a large area feature distribution for each large area, which is generated based on the plurality of small area feature distribution by the predetermined superordinate learning process after the small area feature distribution generation process (S152).

The recognition process (S200') further includes a recognition descriptor generation process (S220) for acquiring an image at the current position, extracting at least one recognition feature from the acquired image, and generating the recognition descriptor corresponding to each recognition feature.

The recognition process (S200') includes, after the recognition descriptor generation process (S220) and before the small area selecting process (S250), a large area selecting process (S256) for computing each large area feature distribution and the recognition descriptor by the predetermined superordinate estimation rule to select a large area in which the current position is included.

The recognition process (S200') includes, after the recognition descriptor (S220), a small area selecting process (S250) for computing each small area feature distribution and each recognition descriptor by the predetermined estimation rule to select one of a plurality of small areas included in the large area selected in the large area selecting process.

The recognition process (S200') includes a position selecting process (S270) for selecting the current position from among a plurality of positions in the selected small area. In the position selecting process (S270), one of a plurality of modes on the map may be selected.

Figure 16A:
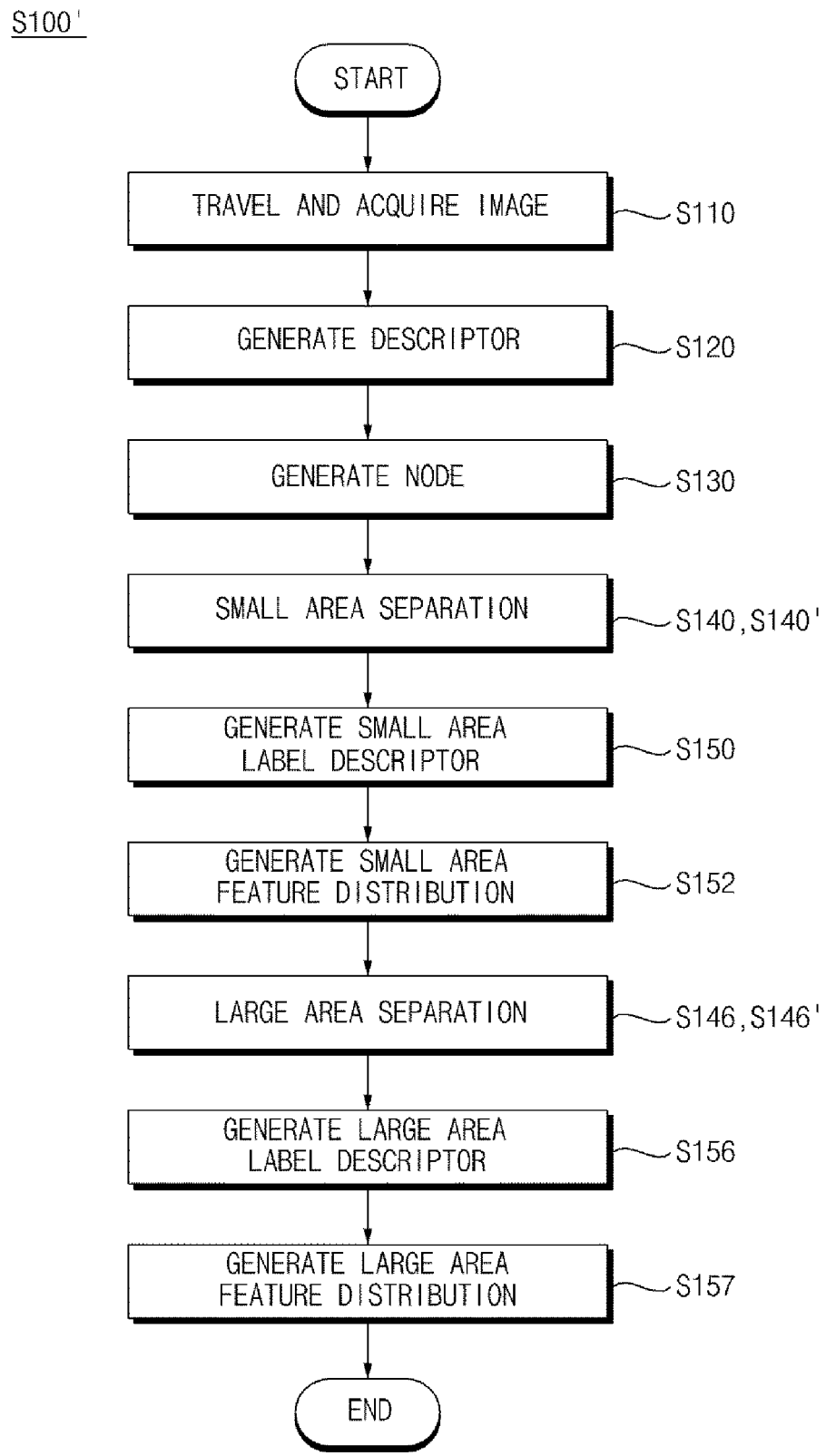
FIGS. 16A and 16B are flowcharts illustrating a learning process (S100') and a position recognition process (S200') according to the second embodiment of FIG. 15.

Referring to FIG. 16A, any process in the learning process (S100') according to the second embodiment, in which is redundant with the learning process (S100) according to the first embodiment, is indicated with like reference numeral, and any redundant description thereof is omitted.

The learning process (S100') includes a process (S146, S146') for separating a travel area X into large areas by a predetermined criterion. The process (S146, S146') may be referred to as a large area separation process (S140', S146). The process (S146, S146') for separating the large area X1 is performed prior to a process (S156) for generating a large area label descriptor of a large area X1. The process (S146, S146') may be performed prior to the process (S156) for generating a large area label descriptor of the large area X1. The process (S146, S146') may be performed after the start of the node generation process (S130). The process (S146, S146') may be performed after the start of the small area separation process (S140, S140'), but may be performed prior to the process (S140, S140'). Some small areas out of the plurality of small areas may be grouped to be classified as one large area.

The learning process (S100') includes a process (S156) for generating a large area label descriptor based on a plurality of small area descriptors. In the process (S156), a plurality of small area label descriptors in each large area is classified into a plurality of groups. In the process (S156), small label descriptors generated in a large area are classified into a plurality of groups. In the process (S156), small area label descriptors in each large area may be classified into a plurality of groups by the predetermined superordinate classification rule. In the process (S156), a large area label descriptor representative of small area label descriptors classified into the same group is generated. In the process (S156), a large label descriptor is generated based on small area label descriptors that are classified into the same group by the predetermined superordinate label rule. The process (S156) may be lastly performed after the moving robot 100 finishes traveling.

The learning process (S100') may further include the process (S157) for generating a large area feature distribution based on a plurality of large area label descriptors. It would be sufficient if the process (S157) is performed prior to the process (S246) for comparing a large area feature distribution of each comparison subject large area and the recognition feature distribution.

Figure 16B:
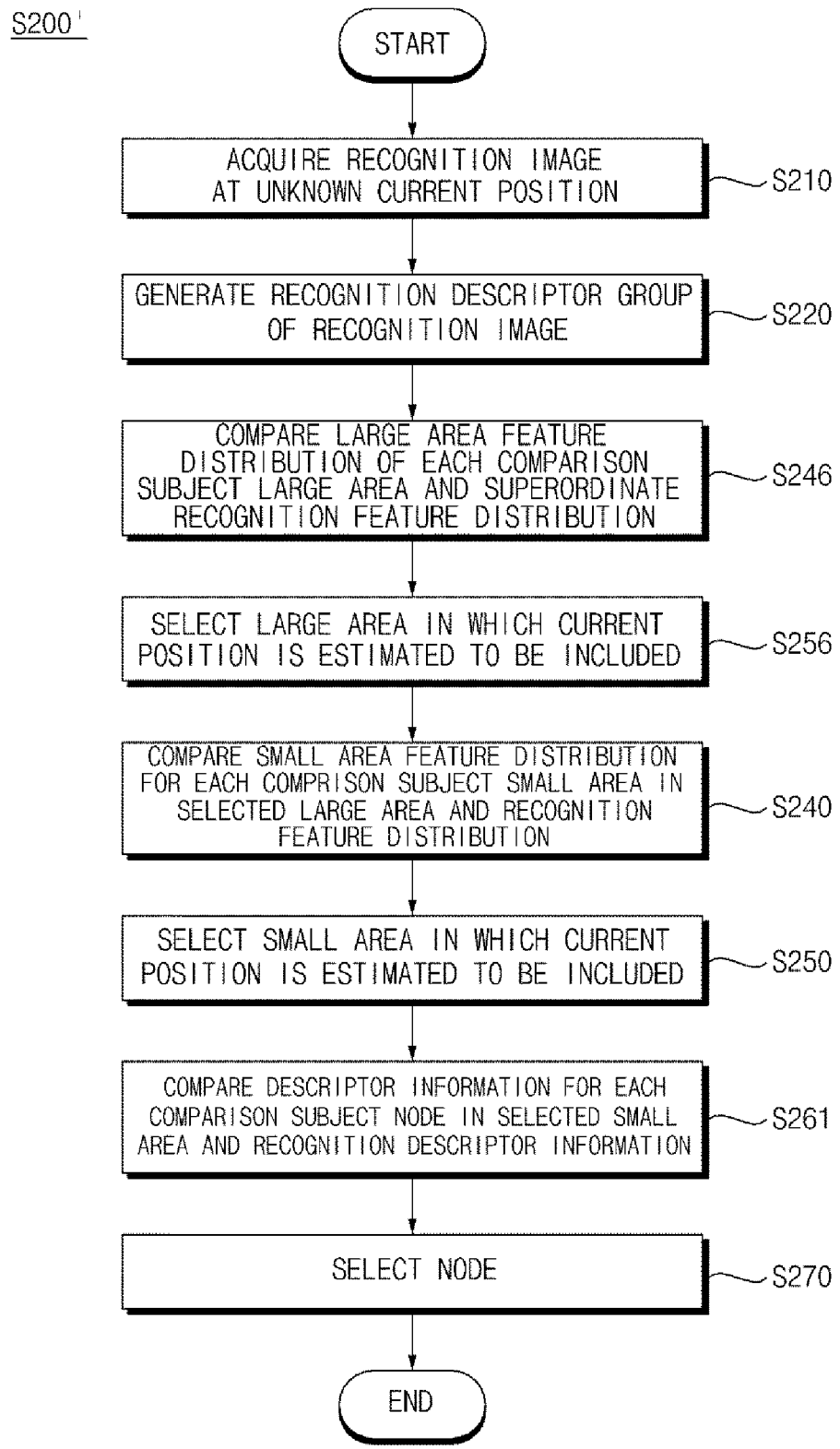

Referring to FIG. 16B, any process in the recognition process (S200') according to the second embodiment, redundant with the recognition process (S220) according to the first embodiment, is indicated with like reference numeral, and redundant description thereof is omitted.

The recognition process (S200') includes, after the process (S220), the process (S246) for comparing a plurality of large area label descriptors in each comparison subject large area and the plurality of recognition descriptors. In the process (S246), a large area feature distribution and a superordinate recognition feature distribution may be compared on the basis of each comparison subject large area.

The recognition process (S200') includes the process (S256) for selecting a large area in which an unknown current position is included among a plurality of large areas. Through the comparison process (S246), a large area with the highest similarity is selected (S256).

The recognition process (S200') includes the process (S240) that is performed after the process (S256). In the comparison process (S240), a comparison subject small area may be limited to a plurality of small area included in the large area selected in the large area selecting process (S256). Except for the facts that a plurality of small areas in a selected large area is a comparison subject and that the comparison process (s240) is performed after the process (S256), the comparison process (240) of the second embodiment is identical to the comparison process (S240) of the first embodiment.

The recognition process (s200') includes the processes (S250, S261, S270) that are performed after the comparison process (S240). The description about the processes (S250, S261, S270) are replaced with the description about the first embodiment.

Figure 33:
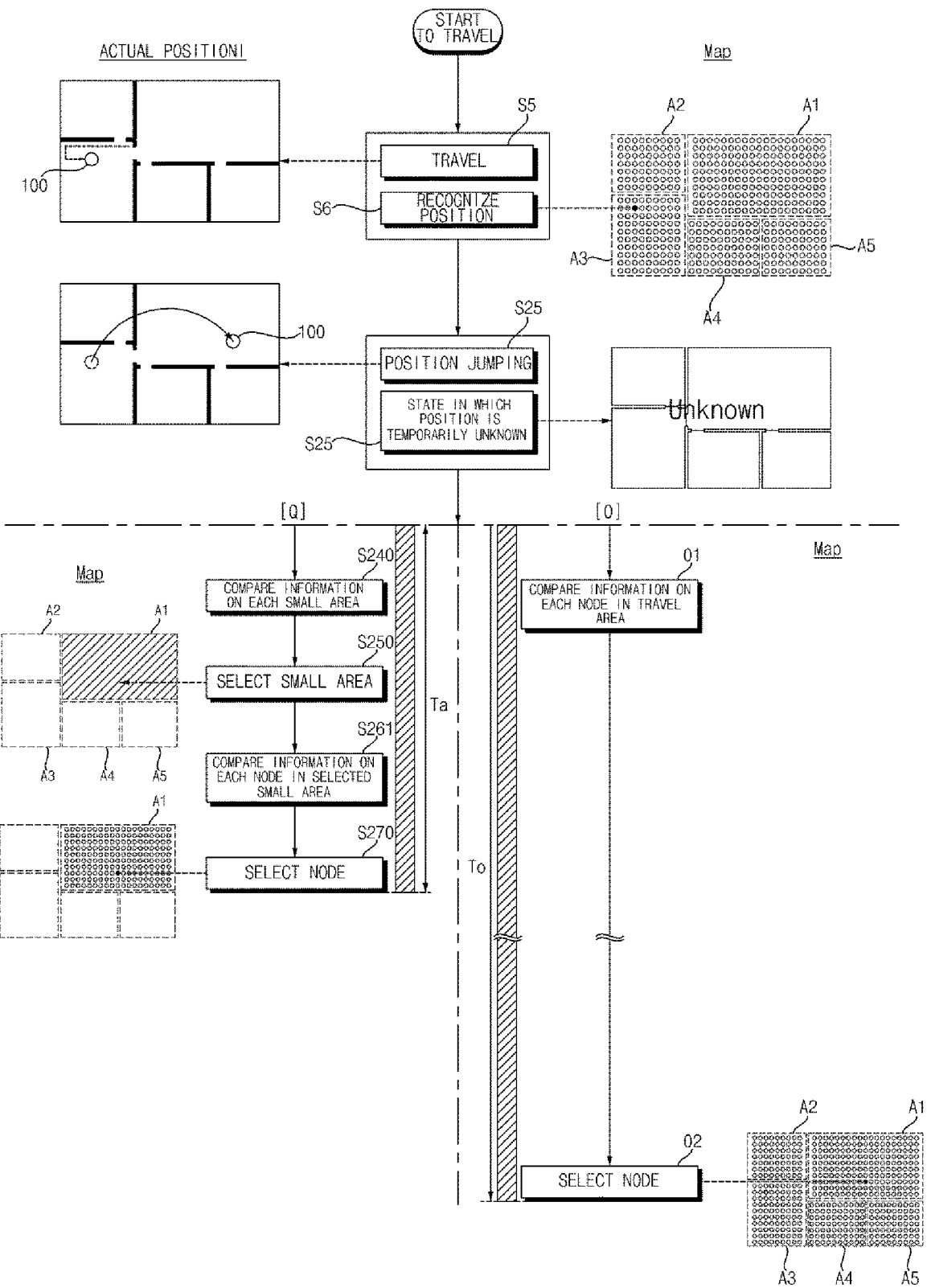
FIG. 33 are a flowchart and a drawing illustrating a scenario in which a position jumping event occurs in one plane, where a pre-stored map M1 is generated, and a position on the map M1 is recognized.

Referring to FIG. 33, a scenario according to the first embodiment is described as follows. The moving robot 100 travels on a floor in a residential area. (S5) The moving robot 100 has finished learning of the residential area and has a pre-stored map M1 of the residential area. An actual position of the moving robot 100 is any one point in a room in a residential area shown in FIG. 33. The moving robot 100 recognizes the current position (a node corresponding to a colored dot) on the map M1 through information on traveling prior to a position jumping event (S20). (S6) A room where the actual position is located on the map M1 corresponds to a small area A3.

At this point, a position jumping event occurs. (S20) For example, a user picks up the moving robot 100 in move and puts it to another room. In this case, the moving robot 100 is temporarily rendered into a position unknown state (in which a position on the map is not possible to be recognized). (S25)

In this case, the moving robot 100 acquires a recognition image at the unknown current position, and generates a plurality of recognition descriptors based on the recognition image.

According to a comparable example O, after acquisition of a recognition image, node information and recognition description information are compared on the basis of each node in a travel area (O1), and a node with the highest similarity is selected (O2). However, in this case, a plurality of nodes each needs to be compared with the recognition descriptor information, and thus, it takes a relatively long time (To).

According to a first embodiment Q, after acquisition of a recognition image, small area information (e.g., small area feature distribution) and recognition descriptor information (e.g., a recognition feature distribution) are compared on a per unit basis of a small area in a travel area (S240), and a small area A1 on the map, in which a current position is estimated to be included, is selected (S250). Next, node information and recognition descriptor information are compared with respect to each node in the selected small area A1 (S261), and a node in the small area A1 in which the current position is estimated to be included is selected (S270). In this case, the small area information may be generated before a position jumping event, and the number of nodes in charge of comparing the recognition image is remarkably reduced, and thus, a time Ta required to estimate the current position is relatively very short. In this scenario, only information on nodes within one of five small areas is compared with recognition descriptor information, and thus, the number of comparison subjects is reduced close to "(an area of the small area A1)/(a total area of the travel area) times as compared to the comparable example O. (about ⅕ times)

Figure 34:
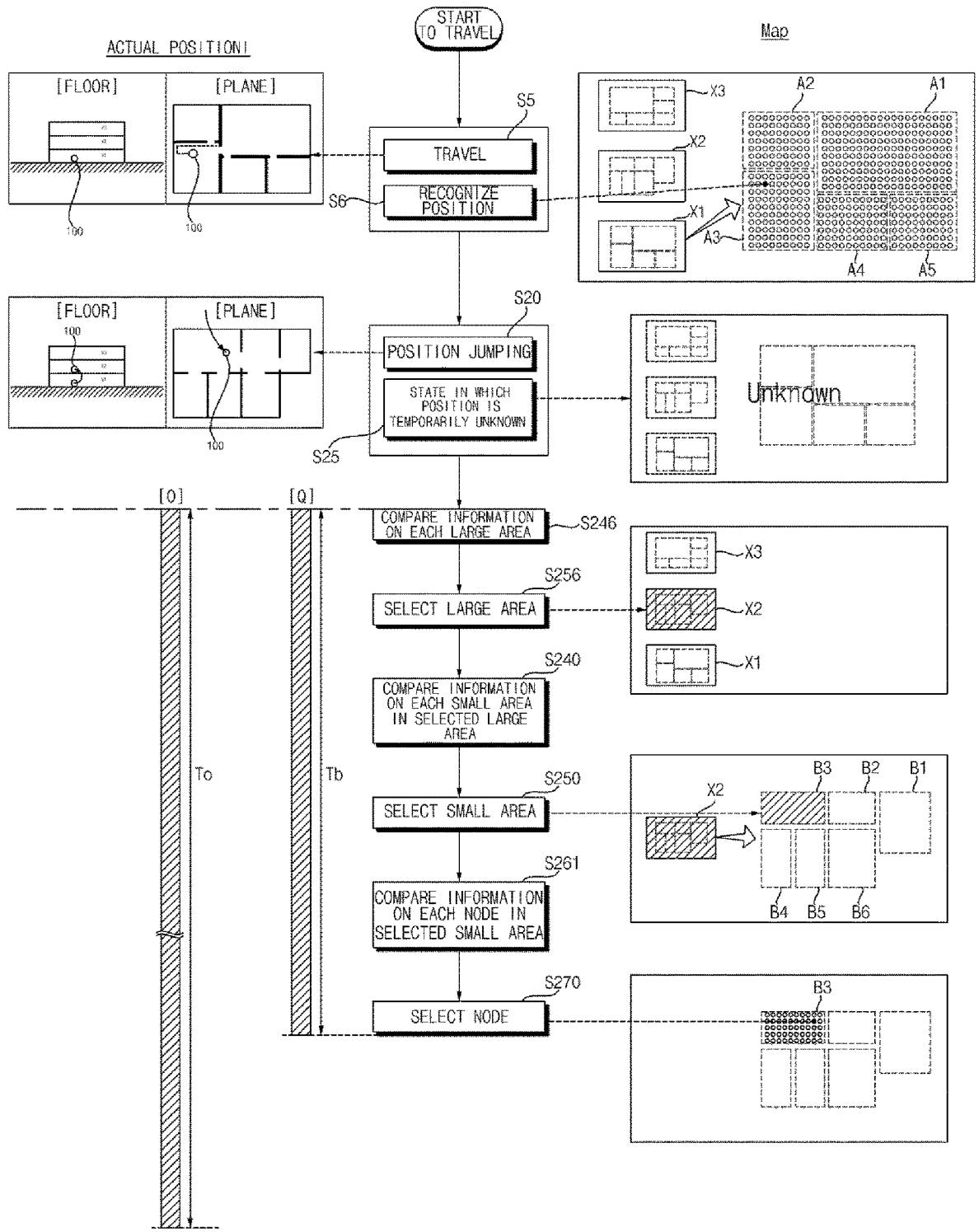
FIG. 34 are a flowchart and a drawing illustrating a scenario in which a position jumping event occurs between floors, where a pre-stored map M1 is generated, and a position on the map M1 is recognized.

Referring to FIG. 34, one scenario according to the second embodiment is described as follows. The moving robot 100 travels on a first floor of a three-story building. (S1) The moving robot 100 has finished learning of every floor of the three-story building, and has pre-stored maps for the respective floors. The moving robot 100 recognizes the three stories as three large areas X1, X2, and X3. The moving robot 100 has stored the respective map M1, M2, and M3 of the three large areas X1, X2, and X3. An actual position of the moving robot 100 is any one point in a room on the first floor shown in FIG. 34. The moving robot 100 recognizes the current location (a node corresponding to a colored dot). (S6) The first floor, in which the actual position is included, corresponds to the map M1 of the large area M1 among the maps M1, M2, and M3, and the room, in which the current position is included, corresponds to is a small area A3 in the large area X1.

At this point, a position jumping event occurs. (S20) For example, a user picks up the moving robot 100 in move and put it in another room in the second floor. In this case, the moving robot 100 is temporarily rendered into a position unknown state (a state in which a position on the map is not possible to be identified). (S25)

At this point, the moving robot 100 acquire a recognition image at the unknown current position, and generates a plurality of recognition descriptors based on the recognition image.

Although not illustrated in the drawings, according to the comparable example O, a node with the highest similarity is selected. However, in this case, a plurality of nodes each needs to be compared with recognition descriptor information, and thus, it takes a relatively long time To.

According to the second embodiment, after acquisition of a recognition image, large area information (e.g., a large area feature distribution) and recognition descriptor information (e.g., a superordinate recognition feature distribution) are compared with respect to each of large areas X1, X2, and X3 in the travel area X (S246), and the large area X2, in which the current position is estimated to be included, is selected (S256). Next, small area information (e.g., a small area feature distribution) and recognition descriptor information (e.g., a recognition feature distribution) are compared with respect to each of small areas B1, B2, B3, B4, B5, and B6 included in the selected large area X2 (S240), and the small area B3 on the map M2 of the large area X2, in which the current position is estimated to be included, is selected (S250). Next, node information and recognition descriptor information are compared with respect to each node in the selected small area B3 (S261), and a node in the small area A1, which is assumed to be the current position, is selected (S270). In this case, the large area information and the small area information may be generated prior to occurrence of a position jumping event, and the number of nodes in charge of comparing the recognition image is remarkably reduced, and thus, a time Tb required to estimate the current position is relatively very short. In this scenario, only information on three large areas, information on six small areas, and information on nodes in any one small area B3 are compared with recognition descriptor information, and thus, the number of comparison subjects is reduced close to "(an area of the small area B3)/(a total area of the large areas X1, X2, and X3) times as compared to the comparable example O. (about $\frac{1}{15}$ times)

What is claimed is:

1. A moving robot comprising:
   a travel drive unit configured to move a main body;
   an image acquisition unit configured to acquire images of surroundings; and a controller configured to recognize a current position as an unknown position, wherein the controller, recognizing the unknown position, is further configured to:
   separate a travel area into a plurality of small areas by a predetermined criterion;
   extract at least one recognition feature from an image acquired at the unknown position;
   generate at least one recognition descriptor corresponding to the at least one recognition feature; and
   compute small area feature distributions with respect to the at least one recognition descriptor based on a predetermined estimation rule and select a small area, of the plurality of small areas, in which the unknown position is included, and
   wherein the controller, when computing the small area feature distributions with respect to the at least one recognition descriptor, is further configured to:
   extract features from images acquired at a plurality of positions;
   generate descriptors corresponding to the respective features; and
   generate the respective small area feature distributions for the small areas based on the descriptors and a predetermined learning rule.

2. The moving robot of claim 1,
   wherein the predetermined learning rule comprises
   a predetermined classification rule for classifying the descriptors into a plurality of groups, and
   a predetermined label rule for converting ones of the descriptors included in a same one of the plurality of groups into label descriptors, and
   wherein the small area feature distributions for the small areas are generated based on at least one type of the label descriptors and a number of the label descriptors per type.

3. The moving robot of claim 1, wherein the predetermined estimation rule comprises:
   a predetermined conversion rule for generating at least one recognition feature distribution which is comparable with the small area feature distributions based on the at least one recognition descriptor; and
   a predetermined comparison rule for comparing the small area feature distributions with the at least one recognition feature distribution to calculate a similarity therebetween.

4. The moving robot of claim 1, wherein the controller is further configured to:
   separate the travel area into a plurality of large areas into which the plurality of small areas are grouped
   compute large area feature distributions for the plurality of large areas with respect to the at least one recognition descriptor based on a predetermined superordinate estimation rule to select a large area, of plurality of large areas, in which the unknown position is included; and
   compute ones of the small area feature distributions for ones of the plurality of small areas included in the selected large area with respect to the at least one recognition descriptor based on the predetermined estimation rule to select the small area in which the unknown position is included from among the ones of the plurality of small areas included in the selected large area.

5. The moving robot of claim 1, wherein the controller is further configured to select the unknown position from among a plurality of positions included in the selected small area.

6. The moving robot of claim 4, wherein the controller is further configured to:
   generate the large area feature distributions for the large areas by a predetermined superordinate learning rule.

7. The moving robot of claim 4,
   wherein the predetermined superordinate estimation rule comprises:
   a predetermined superordinate conversion rule for generating, based on the at least one recognition descriptor, a superordinate recognition feature distribution that is comparable with the large area feature distributions; and
   a predetermined superordinate comparison rule for comparing the large area feature distributions with the superordinate recognition feature distribution to calculate respective similarities therebetween, and
   wherein the predetermined estimation rule comprises:
   a predetermined conversion rule for generating, based on the at least one recognition descriptor, a recognition feature distribution that is comparable with the small area feature distribution; and
a predetermined comparison rule for comparing the small area feature distribution with the recognition feature distribution to calculate a similarity therebetween.

8. A moving robot comprising:
a travel drive unit configured to move a main body;
an image acquisition unit configured to acquire images of surroundings; and
a controller configured to recognize a current position as an unknown position,
wherein the controller, when recognizing the unknown position, is further configured to:
separate a travel area into a plurality of large areas by a predetermined criterion;
extract at least one recognition feature from an image acquired at the unknown position;
generate a recognition descriptor corresponding to the at least one recognition feature; and
compute large area feature distributions with respect to the at least one recognition descriptor based on a predetermined superordinate estimation rule and select a large area in which the unknown position is included,
wherein the controller, when computing the large area feature distributions, is further configured to:
extract features from images acquired from a plurality of positions,
generate descriptors corresponding to the respective features; and
generate the large area feature distributions for the large areas using a predetermined superordinate learning rule.

9. The moving robot of claim 8, wherein the controller is further configured to select one of a plurality of small areas included in the selected large area, and select the unknown position from among a plurality of positions in the selected small area.

10. The moving robot of claim 8,
wherein the descriptors are classified into a plurality of groups, and ones of the descriptors included in a same one of the plurality of groups are converted into label descriptors,
wherein the predetermined superordinate learning rule comprises:
a predetermined superordinate classification rule for classifying the label descriptors into a plurality of groups; and
a predetermined label rule for converting ones of the label descriptors included in a same group, of the plurality of groups, into superordinate representative descriptors, and
wherein the large area feature distributions for the large areas are generated based on at least one type of the large area label descriptors and a number of the large area label descriptors per type.

11. The moving robot of claim 8, wherein the predetermined superordinate estimation rule comprises:
a predetermined superordinate conversion rule for generating, based on the at least one recognition descriptor, a superordinate recognition feature distribution that is comparable with at least one of the large area feature distributions; and
a predetermined superordinate comparison rule for comparing one or more of the large area feature distributions with the superordinate recognition feature distribution to calculate a similarity therebetween.

12. A control method of a moving robot, the method comprising:
a learning process of learning a travel area to generate a map and separating the travel area into a plurality of small areas by a predetermined criterion; and
a recognition process of identifying a current position as an unknown position on the map,
wherein the recognition process comprises:
a recognition descriptor generation process of acquiring an image associated with the unknown position, extracting at least one recognition feature from the acquired image, and generating at least one recognition descriptor corresponding to the at least one recognition feature; and
a small area selection process of computing small feature distributions for the small areas with respect to the at least one recognition descriptor based on a predetermined estimation rule to select a small area, of the plurality of small areas, in which the unknown position is included, and
wherein the learning process includes:
a descriptor generation process that includes acquiring images at a plurality of positions, extracting features from the respective images, and generating descriptors corresponding to the respective features, and
a small area feature distribution generation process that includes generating the small area feature distributions for of the small areas based on the descriptors using a predetermined learning rule.

13. The control method of claim 12,
wherein the recognition process separates the travel area into a plurality of large areas, into which the plurality of small areas are grouped based on at least one predetermined criterion,
wherein the recognition process further includes, prior to the small area selection process, a large area selection process of computing large area feature distributions for the plurality of large areas with respect to the at least one recognition descriptor based on a predetermined superordinate estimation rule to select a large area, of the plurality of large areas, in which the unknown position is included, and
wherein the small area in which the unknown position is included is selected from among ones of the plurality of small areas included in the large area selected in the large area selection process.

14. The control method of claim 13, wherein the learning process comprises:
a large area feature distribution generation process that includes determining the large area feature distributions for the large areas by a predetermined superordinate learning rule based on the small area feature distributions.

15. A control method of a moving robot, comprising:
a learning process of learning a travel area to generate a map and separating the travel area into a plurality of large areas based on a predetermined criterion; and
a recognition process of identifying a current position as an unknown position on the map,
wherein the recognition process comprises:
a descriptor generation process of acquiring an image of the unknown position, extracting at least one recognition feature from the acquired image, and generating at least one recognition descriptor corresponding to the at least one recognition feature; and a large area selection process of computing large area feature distributions for the plurality of large areas with respect to the at least one recognition descriptor based on a predetermined superordinate estimation rule to select a large area, of the plurality of large areas, in which the unknown position is included, wherein the predetermined superordinate learning rule includes:

a predetermined superordinate classification rule for classifying descriptors of the large areas into a plurality of groups, and a predetermined label rule for converting ones of the descriptors included in a same group, of the plurality of groups, into superordinate representative descriptors, and wherein the large area feature distributions for the large areas are generated based on at least one type of the large area label descriptors and a number of large area label descriptors per type.

16. The moving robot of claim 1, wherein the descriptors are n-dimensional vectors having dimensional values that are indicative of respective degrees of change in pixels included in areas around corresponding ones of the features.

17. The moving robot of claim 2, wherein the descriptors and the at least one recognition descriptor are n-dimensional vectors, and wherein the predetermined classification rule is based on at least one distance between the n-dimensional vectors, and the predetermined label rule is based on an average of the n-dimensional vectors.

18. The moving robot of claim 2, wherein the small area feature distributions are generated based on respective scores that increase in proportion of the number of label descriptors per the at least one type in the small areas.

19. The moving robot of claim 3, wherein the predetermined learning rule includes a predetermined classification rule for classifying the descriptors into a plurality of groups, and a predetermined label rule for converting ones of the descriptors included in a same one of the plurality of groups into label descriptors, and wherein the recognition feature distribution is generated based on a recognition score which increases in proportion of the number of label descriptors converted by the predetermined conversion rule.

20. The control method of claim 12, wherein the descriptors are n-dimensional vectors having dimensional values that are indicative of respective degrees of change in pixels included in areas around corresponding ones of the features.

21. The control method of claim 12, wherein the descriptors and the at least one recognition descriptor are n-dimensional vectors, wherein the predetermined learning rule includes a predetermined classification rule for classifying the descriptors into a plurality of groups, and a predetermined label rule for converting ones of the descriptors included in a same one of the plurality of groups into label descriptors, wherein the small area feature distributions for the small areas are generated based on at least one type of the label descriptors and a number of the label descriptors per type, and wherein the predetermined classification rule is based on at least one distance between the n-dimensional vectors, and the predetermined label rule is based on an average of the n-dimensional vectors.

22. The control method of claim 12, wherein the predetermined learning rule includes a predetermined classification rule for classifying the descriptors into a plurality of groups, and a predetermined label rule for converting ones of the descriptors included in a same one of the plurality of groups into label descriptors, wherein the small area feature distributions for the small areas are generated based on at least one type of the label descriptors and a number of the label descriptors per type, and wherein the small area feature distributions are generated based on respective scores that increase in proportion of the number of label descriptors per the at least one type in the small areas.

* * * * *